US012238021B2

(12) United States Patent
Shi et al.

(10) Patent No.: US 12,238,021 B2
(45) Date of Patent: Feb. 25, 2025

(54) FREQUENCY DOMAIN RESOURCE ALLOCATION METHOD AND APPARATUS

(71) Applicant: HUAWEI TECHNOLOGIES CO., LTD., Guangdong (CN)

(72) Inventors: Hongzhe Shi, Shenzhen (CN); Liuliu Ji, Shanghai (CN); Haicun Hang, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 17/672,495

(22) Filed: Feb. 15, 2022

(65) Prior Publication Data

US 2022/0173851 A1    Jun. 2, 2022

Related U.S. Application Data

(63) Continuation of application No. PCT/CN2020/109385, filed on Aug. 14, 2020.

(30) Foreign Application Priority Data

Aug. 16, 2019   (CN) .......................... 201910760494.6

(51) Int. Cl.
*H04L 5/00* (2006.01)
*H04W 72/04* (2023.01)
(Continued)

(52) U.S. Cl.
CPC ....... *H04L 5/0037* (2013.01); *H04W 72/0453* (2013.01); *H04W 72/53* (2023.01)

(58) Field of Classification Search
CPC ................. H04L 5/0037; H04L 5/0007; H04L 5/0035; H04L 5/0039; H04L 5/0044;
(Continued)

(56) References Cited

U.S. PATENT DOCUMENTS 11,323,218 B2 *   5/2022   Kwak ................... H04B 7/0626
2013/0250906 A1 * 9/2013   Golitschek Edler Von
                                    Elbwart ............... H04L 27/261
                                                             370/330
(Continued)

FOREIGN PATENT DOCUMENTS

CN        108347776 A      7/2018
CN        108737040 A      11/2018
(Continued)

OTHER PUBLICATIONS

3GPP TS 38.214 V15.6.0 (Jun. 2019), "3rd Generation Partnership Project; Technical Specification Group Radio Access Network; NR; Physical layer procedures for data(Release 15)," Jun. 2019, 105 pages.

(Continued)

*Primary Examiner* — Hoang-Chuong Q Vu
(74) *Attorney, Agent, or Firm* — Fish & Richardson P.C.

(57) ABSTRACT

Example frequency domain resource allocation methods and apparatus are described. One example method includes determining M frequency domain resources according to a predetermined frequency domain resource allocation rule, and performing communication on one or more of the M frequency domain resources. Any two of the M frequency domain resources do not overlap. Each of the M frequency domain resources is associated with one piece of quasi-colocation (QCL) information, and any two of the M frequency domain resources are associated with different QCL information.

17 Claims, 31 Drawing Sheets

(51) Int. Cl.
*H04W 72/0453* (2023.01)
*H04W 72/53* (2023.01)

(58) Field of Classification Search
CPC ............... H04L 5/0092; H04L 5/0094; H04W 72/0453; H04W 72/53; H04W 72/23
See application file for complete search history.

(56) References Cited

U.S. PATENT DOCUMENTS

| | | | |
|---|---|---|---|
| 2019/0150118 A1 | 5/2019 | Nam et al. | |
| 2019/0372714 A1* | 12/2019 | Jiao | H04L 1/0071 |
| 2020/0267748 A1* | 8/2020 | Khoshnevisan | H04L 1/0023 |
| 2020/0275416 A1* | 8/2020 | Haghighat | H04B 7/0628 |
| 2020/0314881 A1* | 10/2020 | Bagheri | H04W 72/23 |
| 2020/0404667 A1* | 12/2020 | Khoshnevisan | H04W 72/23 |
| 2021/0045142 A1* | 2/2021 | Joseph | H04W 76/27 |
| 2021/0274479 A1* | 9/2021 | Wei | H04W 72/23 |
| 2022/0167321 A1* | 5/2022 | Zhang | H04L 5/0044 |
| 2023/0217429 A1* | 7/2023 | Faxér | H04L 5/0094 370/329 |

FOREIGN PATENT DOCUMENTS

| | | |
|---|---|---|
| CN | 108809609 A | 11/2018 |
| CN | 109937597 A | 6/2019 |
| EP | 3544219 A1 | 9/2019 |
| WO | 2018082705 A1 | 5/2018 |
| WO | 2018127027 A1 | 7/2018 |
| WO | 2018174641 A2 | 9/2018 |

OTHER PUBLICATIONS

Huawei, HiSilicon, "Evaluation results for multi-TRP/panel transmission," 3GPP TSG RAN WG1 Meeting #97, R1-1906036, Reno, USA, May 13-17, 2019, 12 pages.

Huawei, HiSilicon, "Summary of Evaluation Results for Multi-TRP transmission with Enhanced Reliability," 3GPP TSG RAN WG1 meeting #96b, R1-1907707, Reno, USA, May 13-17, 2019, 41 pages.

PCT International Search Report and Written Opinion issued in International Application No. PCT/CN2020/109385 on Nov. 18, 2020, 17 pages (with English translation).

Office Action in Chinese Appln. No. 201910760494.6, dated Apr. 27, 2023, 11 pages.

Office Action issued in Indian Application No. 202247011068 on Jul. 11, 2022, 6 pages.

Extended European Search Report issued in European Application No. 20853802.5 on Oct. 17, 2022, 8 pages.

Huawei, HiSilicon, "Summary of Evaluation Results for Multi-TRP Transmission with Enhanced Reliability," 3GPP TSG RAN WG1 Meeting #96bis, R1-1907707, Reno, USA, May 13-17, 2019, 42 pages.

Office Action in Indian Appln. No. 202247011068, mailed on Apr. 25, 2024, 2 pages.

* cited by examiner (a)

(b)

FREQUENCY DOMAIN RESOURCE ALLOCATION METHOD AND APPARATUS

CROSS-REFERENCE TO RELATED APPLICATIONS

This application is a continuation of International Application No. PCT/CN2020/109385, filed on Aug. 14, 2020, which claims priority to Chinese Patent Application No. 201910760494.6, filed on Aug. 16, 2019. The disclosures of the aforementioned applications are hereby incorporated by reference in their entireties.

TECHNICAL FIELD

This application relates to the field of communications technologies, and in particular, to a frequency domain resource allocation method and apparatus.

BACKGROUND

In new radio (new radio, NR), an allocated frequency domain resource may be indicated to a terminal device by using a frequency domain resource allocation (frequency domain resource allocation, FD-RA) indication field in downlink control information (downlink control information, DCI).

To improve spectrum utilization, in an NR system, a plurality of cells in a network may be deployed in a same frequency band. In this case, when the terminal device is located at a cell edge, communication of the terminal device may be interfered with by a signal sent by a neighboring cell of a serving cell. To resolve this problem, a multipoint transmission technology can be used to effectively avoid interference and improve a user rate. "Multipoint" is a plurality of transmission reception points (transmission reception point, TRP). The plurality of TRPs may perform coordination by exchanging information, to avoid interference.

To support frequency domain resource allocation in multipoint transmission, a relatively common practice is as follows: An FD-RA indication field in a same piece of DCI is used to indicate resources scheduled by different TRPs, and the terminal device determines, based on a preset rule and the resources indicated by using the FD-RA indication field in the DCI, a resource scheduled by each of the different TRPs. In a possible implementation, the preset rule is an odd/even allocation principle. To be specific, a resource block (resource block, RB) with an odd number is allocated to a TRP 1, and an RB with an even number is allocated to a TRP 2, as shown in the example in (a) in FIG. 1. In another possible implementation, the preset rule is balanced allocation of first and second halves. To be specific, RBs with the first half of numbers are allocated to a TRP 1, and RBs with the second half of the numbers are allocated to a TRP 2, as shown in the example in (b) in FIG. 1. Both of the two frequency domain resource allocation manners may cause signal received quality of the terminal device to deteriorate.

SUMMARY

Embodiments of this application provide a frequency domain resource allocation method and apparatus, to ensure signal received quality of a terminal device.

To achieve the foregoing objective, the embodiments this application provide the following technical solutions.

According to a first aspect, a frequency domain resource allocation method is provided, and includes: A terminal device determines M frequency domain resources according to a predetermined frequency domain resource allocation rule, and receives data on one or more of the M frequency domain resources. Any two of the M frequency domain resources do not overlap. Each of the M frequency domain resources is associated with one piece of QCL information, and any two of the M frequency domain resources are associated with different QCL information. The frequency domain resource allocation rule is performing frequency domain resource allocation in a unit of a frequency domain resource allocation unit. A minimum granularity of the frequency domain resource allocation unit is x consecutive RBs. The consecutive RBs are consecutive VRBs or consecutive PRBs. x is a PRG size. M is an integer greater than 1. According to the method provided in the first aspect, PRBs in a same PRG can be prevented from being allocated to different TRPs. That is, it is ensured that data on the PRBs in the same PRG is precoded by using a same transmit precoding matrix, to be consistent with a related stipulation (to be specific, the data on the PRBs in the PRG needs to be precoded by using the same transmit precoding matrix) in a communications protocol. In addition, for the data on the PRBs in the same PRG, the terminal device may demodulate multi-stream data by using a same channel equalization matrix, to ensure signal received quality of the terminal device.

In a possible implementation, the frequency domain resource allocation unit is predefined, or is indicated by using signaling.

In a possible implementation, the frequency domain resource allocation unit is an RBG, a PRG, or an interleaving resource unit. In this possible implementation, the PRBs in the same PRG can be prevented from being allocated to the different TRPs.

In a possible implementation, the frequency domain resource allocation unit is y consecutive RBs, y is k times x, and k is a positive integer. In this possible implementation, the PRBs in the same PRG can be prevented from being allocated to the different TRPs.

In a possible implementation, that a terminal device determines M frequency domain resources according to a predetermined frequency domain resource allocation rule includes: determining, by the terminal device, an $m^{th}$ frequency domain resource in the M frequency domain resources, where the $m^{th}$ frequency domain resource includes an $(Mi+m)^{th}$ frequency domain resource allocation unit in N frequency domain resource allocation units included in predetermined bandwidth of the terminal device, N is a positive integer, m is an integer greater than 0 and less than or equal to M, and i=0, 1, . . . , or $$\left\lceil \frac{N}{M} \right\rceil - 1.$$

In this possible implementation, a plurality of frequency domain resources can be discretely distributed in scheduled bandwidth as much as possible, to obtain a better frequency domain diversity gain.

In a possible implementation, a granularity of the frequency domain resource allocation unit corresponds to a transmission scheme.

In a possible implementation, in a first transmission scheme, downlink data transmitted on different frequency domain resources in the M frequency domain resources corresponds to different parts of a TB, and the frequency domain resource allocation unit is the RBG; or in a second transmission scheme, downlink data transmitted on the M frequency domain resources corresponds to M TBs, the M TBs are same TBs, and the frequency domain resource allocation unit is the PRG. In this possible implementation, the terminal device may select the frequency domain resource allocation unit based on an actual transmission scheme, thereby improving scheduling flexibility of the terminal device and strengthening support for different transmission schemes.

In a possible implementation, in a first transmission scheme, downlink data transmitted on different frequency domain resources in the M frequency domain resources corresponds to different parts of a TB, and the consecutive RBs are the consecutive PRBs; or in a second transmission scheme, downlink data transmitted on the M frequency domain resources corresponds to M TBs, the M TBs are same TBs, and the consecutive RBs are the consecutive VRBs. In this possible implementation, the terminal device may select the frequency domain resource allocation unit based on an actual transmission scheme, thereby improving scheduling flexibility of the terminal device and strengthening support for different transmission schemes.

In a possible implementation, when the PRG size is configured as wideband, x is $$\left\lceil \frac{W}{M} \right\rceil,$$

and W is a quantity of RBs included in the predetermined bandwidth of the terminal device.

According to a second aspect, a frequency domain resource allocation method is provided, and includes: A network device determines predetermined bandwidth of a terminal device, and allocates M frequency domain resources according to a predetermined frequency domain resource allocation rule and based on the predetermined bandwidth. Any two of the M frequency domain resources do not overlap. Each of the M frequency domain resources is associated with one piece of QCL information, and any two of the M frequency domain resources are associated with different QCL information. The frequency domain resource allocation rule is performing frequency domain resource allocation in a unit of a frequency domain resource allocation unit. A minimum granularity of the frequency domain resource allocation unit is x consecutive RBs. The consecutive RBs are consecutive VRBs or consecutive PRBs. x is a PRG size. M is an integer greater than 1. According to the method provided in the second aspect, the M frequency domain resources may be resources respectively allocated to M TRPs. In this case, PRBs in a same PRG can be prevented from being allocated to different TRPs. That is, it is ensured that data on the PRBs in the same PRG is precoded by using a same transmit precoding matrix, to be consistent with a related stipulation (to be specific, the data on the PRBs in the PRG needs to be precoded by using the same transmit precoding matrix) in a communications protocol. In addition, for the data on the PRBs in the same PRG, the terminal device may demodulate multi-stream data by using a same channel equalization matrix, to ensure signal received quality of the terminal device.

In a possible implementation, the frequency domain resource allocation unit is predefined, or is indicated by using signaling.

In a possible implementation, the frequency domain resource allocation unit is an RBG, a PRG, or an interleaving resource unit. In this possible implementation, the PRBs in the same PRG can be prevented from being allocated to the different TRPs.

In a possible implementation, the frequency domain resource allocation unit is y consecutive RBs, y is k times x, and k is a positive integer. In this possible implementation, the PRBs in the same PRG can be prevented from being allocated to the different TRPs.

In a possible implementation, that a network device allocates M frequency domain resources according to a predetermined frequency domain resource allocation rule and based on the predetermined bandwidth includes: allocating, by the network device, an $(Mi+m)^{th}$ frequency domain resource allocation unit in N frequency domain resource allocation units included in the predetermined bandwidth to an $m^{th}$ frequency domain resource in the M frequency domain resources, where N is a positive integer, m is an integer greater than 0 and less than or equal to M, and i=0, 1, . . . , or $$\left\lceil \frac{N}{M} \right\rceil - 1.$$

In this possible implementation, a plurality of frequency domain resources can be discretely distributed in scheduled bandwidth as much as possible, to obtain a better frequency domain diversity gain.

In a possible implementation, a granularity of the frequency domain resource allocation unit corresponds to a transmission scheme.

In a possible implementation, in a first transmission scheme, downlink data transmitted on different frequency domain resources in the M frequency domain resources corresponds to different parts of a TB, and the frequency domain resource allocation unit is the RBG; or in a second transmission scheme, downlink data transmitted on the M frequency domain resources corresponds to M TBs, the M TBs are same TBs, and the frequency domain resource allocation unit is the PRG. In this possible implementation, the frequency domain resource allocation unit may be selected based on an actual transmission scheme, thereby improving scheduling flexibility and strengthening support for different transmission schemes.

In a possible implementation, in a first transmission scheme, downlink data transmitted on different frequency domain resources in the M frequency domain resources corresponds to different parts of a TB, and the consecutive RBs are the consecutive PRBs; or in a second transmission scheme, downlink data transmitted on the M frequency domain resources corresponds to M TBs, the M TBs are same TBs, and the consecutive RBs are the consecutive VRBs. In this possible implementation, the frequency domain resource allocation unit may be selected based on an actual transmission scheme, thereby improving scheduling flexibility and strengthening support for different transmission schemes.

In a possible implementation, when the PRG size is configured as wideband, x is $$\left\lceil \frac{W}{M} \right\rceil,$$

and W is a quantity of RBs included in the predetermined bandwidth of the terminal device.

According to a third aspect, a frequency domain resource allocation apparatus is provided, and includes a processing unit and a communications unit. The processing unit is configured to determine M frequency domain resources according to a predetermined frequency domain resource allocation rule, where any two of the M frequency domain resources do not overlap, each of the M frequency domain resources is associated with one piece of QCL information, any two of the M frequency domain resources are associated with different QCL information, the frequency domain resource allocation rule is performing frequency domain resource allocation in a unit of a frequency domain resource allocation unit, a minimum granularity of the frequency domain resource allocation unit is x consecutive RBs, x is a PRG size, the consecutive RBs are consecutive VRBs or consecutive PRBs, and M is an integer greater than 1. The communications unit is configured to receive data on one or more of the M frequency domain resources.

In a possible implementation, the frequency domain resource allocation unit is predefined, or is indicated by using signaling.

In a possible implementation, the frequency domain resource allocation unit is an RBG, a PRG, or an interleaving resource unit.

In a possible implementation, the frequency domain resource allocation unit is y consecutive RBs, y is k times x, and k is a positive integer.

In a possible implementation, the processing unit is specifically configured to determine an $m^{th}$ frequency domain resource in the M frequency domain resources, where the $m^{th}$ frequency domain resource includes an $(Mi+m)^{th}$ frequency domain resource allocation unit in N frequency domain resource allocation units included in predetermined bandwidth of the apparatus, N is a positive integer, m is an integer greater than 0 and less than or equal to M, and i=0, 1, . . . , or $$\left\lceil \frac{N}{M} \right\rceil - 1.$$

In a possible implementation, a granularity of the frequency domain resource allocation unit corresponds to a transmission scheme.

In a possible implementation, in a first transmission scheme, downlink data transmitted on different frequency domain resources in the M frequency domain resources corresponds to different parts of a TB, and the frequency domain resource allocation unit is the RBG; or in a second transmission scheme, downlink data transmitted on the M frequency domain resources corresponds to M TBs, the M TBs are same TBs, and the frequency domain resource allocation unit is the PRG.

In a possible implementation, in a first transmission scheme, downlink data transmitted on different frequency domain resources in the M frequency domain resources corresponds to different parts of a TB, and the consecutive RBs are the consecutive PRBs; or in a second transmission scheme, downlink data transmitted on the M frequency domain resources corresponds to M TBs, the M TBs are same TBs, and the consecutive RBs are the consecutive VRBs.

In a possible implementation, when the PRG size is configured as wideband, x is $$\left\lceil \frac{W}{M} \right\rceil,$$

and W is a quantity of RBs included in the predetermined bandwidth of the frequency domain resource allocation apparatus.

In a possible implementation, the frequency domain resource allocation apparatus is a terminal device, a chip, or a chip system.

When the apparatus is the terminal device, the processing unit may be a processor, and the communications unit may be a communications interface, a transceiver, or an input/output interface. Optionally, the transceiver may be a transceiver circuit. Optionally, the input/output interface may be an input/output circuit.

When the apparatus is the chip or the chip system, the communications unit may be a communications interface, an input/output interface, an interface circuit, an output circuit, an input circuit, a pin, a related circuit, or the like on the chip or the chip system. The processing unit may be a processor, a processing circuit, a logic circuit, or the like.

According to a fourth aspect, a frequency domain resource allocation apparatus is provided, and includes a determining unit and an allocation unit.

The determining unit is configured to determine predetermined bandwidth of a terminal device.

The allocation unit is configured to allocate M frequency domain resources according to a predetermined frequency domain resource allocation rule and based on the predetermined bandwidth, where any two of the M frequency domain resources do not overlap, each of the M frequency domain resources is associated with one piece of QCL information, any two of the M frequency domain resources are associated with different QCL information, the frequency domain resource allocation rule is performing frequency domain resource allocation in a unit of a frequency domain resource allocation unit, a minimum granularity of the frequency domain resource allocation unit is x consecutive RBs, x is a PRG size, the consecutive RBs are consecutive VRBs or consecutive PRBs, and M is an integer greater than 1.

In a possible implementation, the frequency domain resource allocation unit is predefined, or is indicated by using signaling.

In a possible implementation, the frequency domain resource allocation unit is an RBG, a PRG, or an interleaving resource unit.

In a possible implementation, the frequency domain resource allocation unit is y consecutive RBs, y is k times x, and k is a positive integer.

In a possible implementation, the allocation unit is specifically configured to allocate an $(Mi+m)^{th}$ frequency domain resource allocation unit in N frequency domain resource allocation units included in the predetermined bandwidth to an $m^{th}$ frequency domain resource in the M frequency domain resources, where N is a positive integer, m is an integer greater than 0 and less than or equal to M, and i=0, 1, . . . , or $$\left\lceil \frac{N}{M} \right\rceil - 1.$$

In a possible implementation, a granularity of the frequency domain resource allocation unit corresponds to a transmission scheme.

In a possible implementation, in a first transmission scheme, downlink data transmitted on different frequency domain resources in the M frequency domain resources corresponds to different parts of a TB, and the frequency domain resource allocation unit is the RBG; or in a second transmission scheme, downlink data transmitted on the M frequency domain resources corresponds to M TBs, the M TBs are same TBs, and the frequency domain resource allocation unit is the PRG.

In a possible implementation, in a first transmission scheme, downlink data transmitted on different frequency domain resources in the M frequency domain resources corresponds to different parts of a TB, and the consecutive RBs are the consecutive PRBs; or in a second transmission scheme, downlink data transmitted on the M frequency domain resources corresponds to M TBs, the M TBs are same TBs, and the consecutive RBs are the consecutive VRBs.

In a possible implementation, when the PRG size is configured as wideband, x is $$\left\lceil \frac{W}{M} \right\rceil,$$

and W is a quantity of RBs included in the predetermined bandwidth of the terminal device.

In a possible implementation, the frequency domain resource allocation apparatus is a network device, a chip, or a chip system.

When the apparatus is the network device, the determining unit and the allocation unit may be processing units, and may further be processors.

When the apparatus is the chip or the chip system, the determining unit and the allocation unit may be processing units, processors, processing circuits, logic circuits, or the like.

According to a fifth aspect, a frequency domain resource allocation method is provided, and includes: determining M frequency domain resources, where M is an integer greater than 1, any two of the M frequency domain resources do not overlap, each of the M frequency domain resources is associated with one piece of QCL information, and any two of the M frequency domain resources are associated with different QCL information; and sending or receiving data on one or more of the M frequency domain resources, where when a PRG size is 2 or 4, the M frequency domain resources are determined by using a PRG as a frequency domain resource allocation unit; or when a PRG size is wideband, the M frequency domain resources are determined by using $$\left\lceil \frac{W}{M} \right\rceil$$

PRBs as a frequency domain resource allocation unit, where W is a quantity of PRBs included in predetermined bandwidth, and W is an integer greater than 1.

In a possible implementation, when the PRG size is 2 or 4, M=2, a first frequency domain resource in the M frequency domain resources includes a PRG whose index is an even number, and a second frequency domain resource in the M frequency domain resources includes a PRG whose index is an odd number.

In a possible implementation, when the PRG size is 2 or 4, the M frequency domain resources are obtained by dividing scheduled bandwidth of a terminal device, and the scheduled bandwidth is bandwidth including a PRB used for data transmission.

In a possible implementation, when the PRG size is 2 or 4, that the M frequency domain resources are determined by using a PRG as a frequency domain resource allocation unit includes: determining an $m^{th}$ frequency domain resource in the M frequency domain resources, where the $m^{th}$ frequency domain resource includes an $(Mi+m)^{th}$ frequency domain resource allocation unit in N frequency domain resource allocation units included in scheduled bandwidth of a terminal device, the scheduled bandwidth is bandwidth including a PRB used for data transmission, N is a positive integer, m is an integer greater than 0 and less than or equal to M, and i=0, 1, . . . , or $$\left\lceil \frac{N}{M} \right\rceil - 1.$$

In a possible implementation, when the PRG size is the wideband, an $m^{th}$ frequency domain resource in the M frequency domain resources includes a $$\left(\left\lceil \frac{W}{M} \right\rceil (m-1) + 1\right)^{th}$$

PRB to a $$\left(\left\lceil \frac{W}{M} \right\rceil m\right)^{th}$$

PRB in the predetermined bandwidth, an $M^{th}$ frequency domain resource in the M frequency domain resources includes a remaining PRB in the predetermined bandwidth, and m is an integer greater than 0 and less than M.

In a possible implementation, M=2, a first frequency domain resource in the M frequency domain resources includes the first $$\left\lceil \frac{W}{M} \right\rceil$$

PRBs in the predetermined bandwidth, and a second frequency domain resource in the M frequency domain resources includes the last $$\left\lfloor \frac{W}{M} \right\rfloor$$

PRBs in the predetermined bandwidth.

In a possible implementation, the predetermined bandwidth is scheduled bandwidth of a terminal device, and the scheduled bandwidth is bandwidth including a PRB used for data transmission.

In a possible implementation, when the PRG size is 2 or 4, the M frequency domain resources are determined according to a predetermined frequency domain resource allocation rule by using the PRG as the frequency domain resource allocation unit; or when the PRG size is the wideband, the M frequency domain resources are determined based on the W PRBs included in the predetermined bandwidth and according to a predetermined frequency domain resource allocation rule.

According to a sixth aspect, a frequency domain resource allocation apparatus is provided, and includes a processing unit and a communications unit. The processing unit is configured to determine M frequency domain resources, where M is an integer greater than 1, any two of the M frequency domain resources do not overlap, each of the M frequency domain resources is associated with one piece of QCL information, and any two of the M frequency domain resources are associated with different QCL information. The communications unit is configured to send or receive data on one or more of the M frequency domain resources, where when a PRG size is 2 or 4, the processing unit is specifically configured to determine the M frequency domain resources by using a PRG as a frequency domain resource allocation unit; or when a PRG size is wideband, the processing unit is specifically configured to determine the M frequency domain resources by using $$\left\lceil \frac{W}{M} \right\rceil$$

PRBs as a frequency domain resource allocation unit, where W is a quantity of PRBs included in predetermined bandwidth, and W is an integer greater than 1.

In a possible implementation, when the PRG size is 2 or 4, M=2, a first frequency domain resource in the M frequency domain resources includes a PRG whose index is an even number, and a second frequency domain resource in the M frequency domain resources includes a PRG whose index is an odd number.

In a possible implementation, when the PRG size is 2 or 4, the M frequency domain resources are obtained by dividing scheduled bandwidth of a terminal device, and the scheduled bandwidth is bandwidth including a PRB used for data transmission.

In a possible implementation, when the PRG size is 2 or 4, the processing unit is specifically configured to: determine an $m^{th}$ frequency domain resource in the M frequency domain resources, where the $m^{th}$ frequency domain resource includes an $(Mi+m)^{th}$ frequency domain resource allocation unit in N frequency domain resource allocation units included in scheduled bandwidth of a terminal device, the scheduled bandwidth is bandwidth including a PRB used for data transmission, N is a positive integer, m is an integer greater than 0 and less than or equal to M, and i=0, 1, . . . , or $$\left\lceil \frac{N}{M} \right\rceil - 1.$$

In a possible implementation, when the PRG size is the wideband, an $m^{th}$ frequency domain resource in the M frequency domain resources includes a $$\left(\left\lceil \frac{W}{M} \right\rceil (m-1)+1\right)^{th}$$

PRB to a $$\left(\left\lceil \frac{W}{M} \right\rceil m\right)^{th}$$

PRB in the predetermined bandwidth, an $M^{th}$ frequency domain resource in the M frequency domain resources includes a remaining PRB in the predetermined bandwidth, and m is an integer greater than 0 and less than M.

In a possible implementation, M=2, a first frequency domain resource in the M frequency domain resources includes the first $$\left\lceil \frac{W}{M} \right\rceil$$

PRBs in the predetermined bandwidth, and a second frequency domain resource in the M frequency domain resources includes the last $$\left\lfloor \frac{W}{M} \right\rfloor$$

PRBs in the predetermined bandwidth.

In a possible implementation, the predetermined bandwidth is scheduled bandwidth of a terminal device, and the scheduled bandwidth is bandwidth including a PRB used for data transmission.

In a possible implementation, when the PRG size is 2 or 4, the M frequency domain resources are determined according to a predetermined frequency domain resource allocation rule by using the PRG as the frequency domain resource allocation unit; or when the PRG size is the wideband, the M frequency domain resources are determined based on the W PRBs included in the predetermined bandwidth and according to a predetermined frequency domain resource allocation rule.

In a possible implementation, the frequency domain resource allocation apparatus is the terminal device, and the communications unit is specifically configured to receive the data on the one or more of the M frequency domain resources.

In a possible implementation, the frequency domain resource allocation apparatus is a network device, and the communications unit is specifically configured to send the data on the one or more of the M frequency domain resources.

According to a seventh aspect, a frequency domain resource allocation apparatus is provided, and includes a processor. The processor is connected to a memory. The memory is configured to store a computer-executable instruction. The processor executes the computer-executable instruction stored in the memory, to implement any method provided in the first aspect. The memory and the processor may be integrated together, or may be independent devices. If the memory and the processor are independent devices, the memory may be located inside the frequency domain resource allocation apparatus, or may be located outside the frequency domain resource allocation apparatus.

In a possible implementation, the processor includes a logic circuit, and further includes an input interface. The input interface is configured to perform a receiving action in the corresponding method, for example, receive data on one or more of M frequency domain resources.

In a possible implementation, the frequency domain resource allocation apparatus further includes a communications interface and a communications bus. The processor, the memory, and the communications interface are connected by using the communications bus. The communications interface is configured to perform sending and receiving actions in the corresponding method. The communications interface may also be referred to as a transceiver. Optionally, the communications interface includes at least a receiver. In this case, the receiver is configured to perform a receiving action in the corresponding method, for example, receive data on one or more of M frequency domain resources.

In a possible implementation, the frequency domain resource allocation apparatus is a terminal device or a chip in a terminal device.

According to an eighth aspect, a frequency domain resource allocation apparatus is provided, and includes a processor. The processor is connected to a memory. The memory is configured to store a computer-executable instruction. The processor executes the computer-executable instruction stored in the memory, to implement any method provided in the second aspect. The memory and the processor may be integrated together, or may be independent devices. If the memory and the processor are independent devices, the memory may be located inside the frequency domain resource allocation apparatus, or may be located outside the frequency domain resource allocation apparatus.

In a possible implementation, the processor includes a logic circuit, and further includes an output interface. The output interface is configured to perform a sending action in the corresponding method, for example, send an allocated frequency domain resource to another device.

In a possible implementation, the frequency domain resource allocation apparatus further includes a communications interface and a communications bus. The processor, the memory, and the communications interface are connected by using the communications bus. The communications interface is configured to perform sending and receiving actions in the corresponding method. The communications interface may also be referred to as a transceiver. Optionally, the communications interface includes at least a transmitter. In this case, the transmitter is configured to perform a sending action in the corresponding method, for example, send an allocated frequency domain resource to another device.

In a possible implementation, the frequency domain resource allocation apparatus is a terminal device or a chip in a terminal device.

According to a ninth aspect, a frequency domain resource allocation apparatus is provided, and includes a processor. The processor is connected to a memory. The memory is configured to store a computer-executable instruction. The processor executes the computer-executable instruction stored in the memory, to implement any method provided in the third aspect. The memory and the processor may be integrated together, or may be independent devices. If the memory and the processor are independent devices, the memory may be located inside the frequency domain resource allocation apparatus, or may be located outside the frequency domain resource allocation apparatus.

In a possible implementation, the processor includes a logic circuit, and further includes an input interface and an output interface. The input interface is configured to perform a receiving action in the corresponding method, for example, receive data in one or more of M frequency domain resources, and the output interface is configured to perform a sending action in the corresponding method.

In a possible implementation, the frequency domain resource allocation apparatus further includes a communications interface and a communications bus. The processor, the memory, and the communications interface are connected by using the communications bus. The communications interface is configured to perform sending and receiving actions in the corresponding method. The communications interface may also be referred to as a transceiver. Optionally, the communications interface includes a receiver and a transmitter. In this case, the receiver is configured to perform a receiving action in the corresponding method, for example, receive data on one or more of M frequency domain resources, and the transmitter is configured to perform a sending action in the corresponding method.

In a possible implementation, the frequency domain resource allocation apparatus is a terminal device or a chip in a terminal device. In another possible implementation, the frequency domain resource allocation apparatus is a network device or a chip in a network device.

According to a tenth aspect, a frequency domain resource allocation apparatus is provided, and includes a processor and a communications interface. The communications interface is configured to input and/or output information. The processor is configured to execute a computer-executable instruction, so that the apparatus implements any method provided in the first aspect.

According to an eleventh aspect, a frequency domain resource allocation apparatus is provided, and includes a processor and a communications interface. The communications interface is configured to input and/or output information. The processor is configured to execute a computer-executable instruction, so that the apparatus implements any method provided in the second aspect.

According to a twelfth aspect, a frequency domain resource allocation apparatus is provided, and includes a processor and a communications interface. The communications interface is configured to input and/or output information. The processor is configured to execute a computer-executable instruction, so that the apparatus implements any method provided in the third aspect.

According to a thirteenth aspect, a communications system is provided, and includes the frequency domain resource allocation apparatus provided in the third aspect and the frequency domain resource allocation apparatus provided in the fourth aspect, the frequency domain resource allocation apparatus provided in the seventh aspect and the frequency domain resource allocation apparatus provided in the eighth aspect, or the frequency domain resource allocation apparatus provided in the tenth aspect and the frequency domain resource allocation apparatus provided in the eleventh aspect.

According to a fourteenth aspect, a computer-readable storage medium is provided, and includes an instruction. When the instruction is run on a computer, the computer is enabled to perform any method according to the first aspect, the second aspect, or the third aspect.

According to a fifteenth aspect, a computer program product including an instruction is provided. When the instruction is run on a computer, the computer is enabled to perform any method according to the first aspect, the second aspect, or the third aspect.

For a technical effect brought by any implementation of the third to the fifteenth aspects, refer to a technical effect brought by a corresponding implementation of the first aspect or the second aspect. Details are not described herein again.

It should be noted that, various possible implementations of any one of the foregoing aspects may be combined on a premise that the solutions are not contradictory.

DESCRIPTION OF EMBODIMENTS

In the description of this application, unless otherwise specified, "/" means "or". For example, A/B may represent A or B. The term "and/or" in this specification describes only an association relationship between associated objects and represents that three relationships may exist. For example, A and/or B may represent the following three cases: Only A exists, both A and B exist, and only B exists. In addition, "at least one" refers to one or more, and "a plurality of" refers to two or more. Words such as "first" and "second" do not limit a quantity and an execution sequence, and the words such as "first" and "second" do not indicate a definite difference.

It should be noted that, in this application, the word such as "exemplary" or "for example" is used to represent giving an example, an illustration, or a description. Any embodiment or design scheme described as "exemplary" or "for example" in this application should not be explained as being more preferred or having more advantages than another embodiment or design scheme. Exactly, use of the word such as "exemplary" or "for example" is intended to present a related concept in a specific manner.

Figure 1:
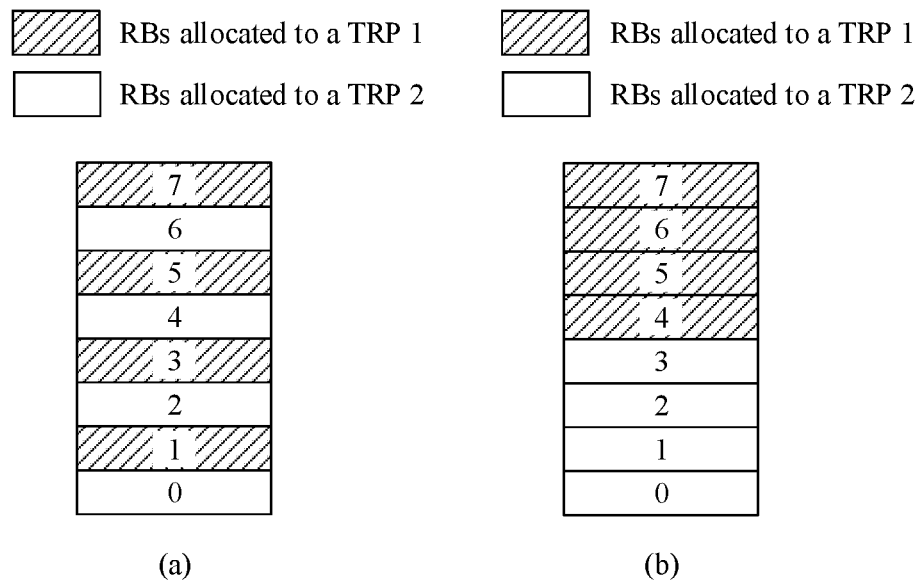
FIG. 1 is a schematic diagram of frequency domain resource allocation.
Figure 2:
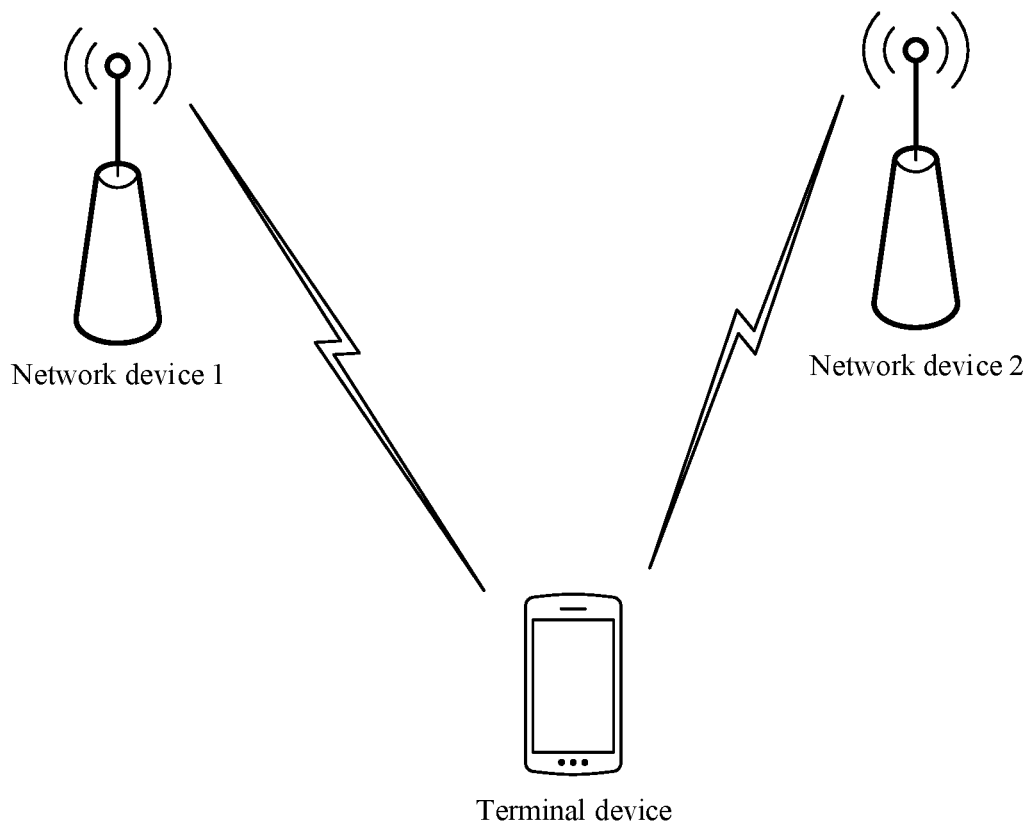
FIG. 2 is a schematic diagram of a network architecture according to an embodiment of this application.

A communications system to which technical solutions provided in this application are applicable may include a plurality of network devices and at least one terminal device, and the terminal device may communicate with the plurality of network devices. Referring to FIG. 2, the terminal device may be in a coordinated transmission state of the plurality of network devices (for example, a network device 1 and a network device 2). The plurality of network devices may all send signaling and downlink data to the terminal device. On the contrary, the terminal device may also send uplink data to the plurality of network devices. Ideal backhaul (ideal backhaul) may be performed between the network devices. That is, there is basically no interaction delay between the network devices. Therefore, coordinated transmission between the plurality of network devices and the terminal device may be scheduled by using a same piece of DCI. For example, one of the network devices sends, to the terminal device, DCI for scheduling data of the plurality of network devices.

The communications system in embodiments of this application includes but is not limited to a long term evolution (long term evolution, LTE) system, a fifth generation (5th-generation, 5G) system, an NR system, a future evolved system, or a plurality of convergent communications systems. The 5G system may be a non-standalone (non-standalone, NSA) 5G system or a standalone (standalone, SA) 5G system.

The network device in the embodiments of this application is an entity that is on a network side and that is configured to send a signal, receive a signal, or send a signal and receive a signal. The network device may be an apparatus that is deployed in a radio access network (radio access network, RAN) and that provides a wireless communication function for the terminal device, for example, may be a TRP, a base station, and control nodes in various forms (for example, a network controller and a radio controller (for example, a radio controller in a cloud radio access network (cloud radio access network, CRAN) scenario)). Specifically, the network device may be macro base stations, micro base stations (also referred to as small cells), relay stations, access points (access point, AP), or the like in various forms, or may be an antenna panel of a base station. The control node may be connected to a plurality of base stations, and configure resources for a plurality of terminal devices within coverage of the plurality of base stations. In systems for which different radio access technologies are used, names of a device having a function of a base station may be different. For example, the device may be referred to as an evolved NodeB (evolved NodeB, eNB or eNodeB) in the LTE system, or may be referred to as a next generation node base station (next generation node base station, gNB) in the 5G system or the NR system. A specific name of the base station is not limited in this application. The network device may alternatively be a network device in a future evolved public land mobile network (public land mobile network, PLMN) or the like.

In some deployments, the network device may include a centralized unit (centralized unit, CU) and a distributed unit (Distributed Unit, DU). The network device may further include an active antenna unit (active antenna unit, AAU). The CU implements some functions of the network device, and the DU implements some functions of the network device. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer eventually becomes information at the PHY layer, or is converted from information at the PHY layer. Therefore, in such an architecture, higher layer signaling such as RRC layer signaling or PDCP layer signaling may also be considered as being sent by the DU or sent by the DU and the AAU. It may be understood that the network device may be a device including one or more of a CU node, a DU node, and an AAU node. In addition, the CU may be classified as a network device in the RAN, or the CU may be classified as a network device in a core network (core network, CN). This is not limited herein.

The terminal device in the embodiments of this application is an entity that is on a user side and that is configured to receive a signal, send a signal, or receive a signal and send a signal. The terminal device is configured to provide one or more of a voice service and a data connectivity service for a user. The terminal device may also be referred to as user equipment (user equipment, UE), a terminal, an access terminal, a subscriber unit, a subscriber station, a mobile station, a remote station, a remote terminal, a mobile device, a user terminal, a wireless communications device, a user agent, or a user apparatus. The terminal device may be a mobile station (mobile station, MS), a subscriber unit (subscriber unit), a drone, an internet of things (internet of things, IoT) device, a station (station, ST) in a wireless local area network (wireless local area networks, WLAN), a cellular phone (cellular phone), a smartphone (smart phone), a cordless phone, a wireless data card, a tablet computer, a session initiation protocol (session initiation protocol, SIP) phone, a wireless local loop (wireless local loop, WLL) station, a personal digital assistant (personal digital assistant, PDA) device, a laptop computer (laptop computer), a machine type communication (machine type communication, MTC) terminal, a handheld device having a wireless communication function, a computing device or another processing device connected to a wireless modem, a vehicle-mounted device, or a wearable device (which may also be referred to as a wearable intelligent device). The terminal device may alternatively be a terminal device in a next-generation communications system, for example, a terminal device in the 5G system, a terminal device in the future evolved PLMN, or a terminal device in the NR system.

The technical solutions provided in the embodiments of this application can be applied to a plurality of communications scenarios such as a machine to machine (machine to machine, M2M) scenario, a macro-micro communication scenario, an enhanced mobile broadband (enhanced mobile broadband, eMBB) scenario, an ultra-reliable and low-latency communication (ultra-reliable & low latency communication, URLLC) scenario, an internet of vehicles scenario, and a massive machine-type communications (massive machine type communication, mMTC) scenario.

A network architecture and a service scenario that are described in the embodiments of this application are intended to describe the technical solutions in the embodiments of this application more clearly, and do not constitute a limitation to the technical solutions provided in the embodiments of this application. A person of ordinary skill in the art may know that with evolution of the network architecture and emergence of a new service scenario, the technical solutions provided in the embodiments of this application are also applicable to a similar technical problem.

To make the embodiments of this application clearer, the following briefly describes concepts and some content that are related to the embodiments of this application.

1. Quasi Co-Location (Quasi Colocation, QCL) Relationship

Quasi co-location may also be referred to as quasi co-location. Signals corresponding to antenna ports that have a QCL relationship have a same parameter, a parameter of one antenna port may be used to determine a parameter of another antenna port that has a QCL relationship with the antenna port, two antenna ports have a same parameter, or a parameter difference between two antenna ports is less than a threshold. The parameter may include one or more of the following: a delay spread (delay spread), a Doppler spread (Doppler spread), a Doppler shift (Doppler shift), an average delay (average delay), an average gain, and a spatial receive parameter (spatial Rx parameters). The spatial receive parameter may include one or more of the following: an angle of arrival (angle of arrival, AOA), an average AOA, an AOA spread, an angle of departure (angle of departure, AOD), an average AOD, an AOD spread, a receive antenna spatial correlation parameter, a transmit antenna spatial correlation parameter, a transmit beam, a receive beam, and a resource indicator.

The foregoing angles may be decomposition values at different dimensions or a combination of decomposition values at different dimensions. The antenna ports are antenna ports having different antenna port numbers, antenna ports that have a same antenna port number and that are used to send or receive information at different time points, on different frequencies, and/or on different code domain resources, and/or antenna ports that have different antenna port numbers and that are used to send or receive information at different time points, on different frequencies, and/or on different code domain resources. The resource indicator may include a channel state information reference signal (channel state information reference signal, CSI-RS) resource indicator, a sounding reference signal (sounding reference signal, SRS) resource indicator, a synchronization signal/physical broadcast channel block (synchronous signal/physical broadcast channel block, which may be referred to as an SS/PBCH block for short, or may be referred to as an SSB for short) resource indicator, a resource indicator of a preamble sequence transmitted on a physical random access channel (physical random access channel, PRACH), or a demodulation reference signal (demodulation reference signal, DMRS) resource indicator, and is used to indicate a beam on a resource.

In an NR protocol, the QCL relationship may be classified into the following four types based on different parameters:

type A (type A): the Doppler shift, the Doppler spread, the average delay, and the delay spread;

type B (type B): the Doppler shift and the Doppler spread;

type C (type C): the Doppler shift and the average delay; and type D (type D): the spatial receive parameter.

QCL of type D, namely, QCL defined based on the spatial receive parameter, is used to indicate different beams. The beams have a same spatial feature, and may be received by using a same receive beam. In a protocol, the beams may be specifically represented by using identifiers of various signals, for example, a CSI-RS resource index, an SSB index, an SRS resource index, and a tracking reference signal (tracking reference signal, TRS) resource index.

2. First Transmission Scheme and Second Transmission Scheme

In frequency division multiplexing (frequency division multiplexing, FDM) transmission mode, two transmission schemes are included. To distinguish between the two transmission schemes, the two transmission schemes are denoted as a first transmission scheme and a second transmission scheme respectively. The following briefly describes the first transmission scheme and the second transmission scheme by using an example in which two network devices (for example, two TRPs) separately send first data and second data to a terminal device.

First Transmission Scheme:

The first transmission scheme is a transmission scheme in which different parts of a same piece of data are sent to the terminal device. In this case, the first data and the second data each are a part of the same piece of data. For example, the first data is the first 400 bits of 1000-bit data, and the second data is the last 600 bits of the 1000-bit data. A piece of data may be considered as a codeword, and a codeword may be considered to be generated by a transport block (transport block, TB). In other words, the first data and the second data each carry partial information of a TB. It may be understood that a codeword includes the first data and the second data, and the first data and the second data correspond to a redundancy version (redundancy version, RV).

In the first transmission scheme, it is assumed that 1000-bit data is obtained by performing channel coding on a 400-bit TB, and the 1000-bit data needs to be allocated to two TRPs for transmission. To improve transmission efficiency, the 1000-bit data may be allocated to the two TRPs based on current resource load of the two TRPs. For example, 400 bits may be allocated to a TRP with high load, and 600 bits may be allocated to a TRP with low load. To adapt to the current load of the two TRPs, the first transmission scheme needs to correspond to a more flexible frequency domain resource allocation manner.

The first transmission scheme may also be referred to as an FDM transmission scheme A or an FDM scheme 2a.

Second Transmission Scheme:

The second transmission scheme is a transmission scheme in which a plurality of pieces of same data are sent to the terminal device. In this case, the first data and the second data are same data. The same data indicates that the first data and the second data carry same TB information. For example, the first data corresponds to a TB, the second data also corresponds to a TB, and the two TBs are same TBs.

This means that codewords corresponding to the first data and the second data may be generated by a same TB, or may be separately generated by the two same TBs. The first data and the second data each carry all information of the TB. It may be understood that the first data and the second data each correspond to a codeword and an RV. RVs respectively corresponding to the first data and the second data may be the same or may be different.

In the second transmission scheme, 1000-bit data of two different RV versions may be separately obtained by performing channel coding on a same 400-bit TB. The 1000-bit data is mapped to time-frequency resources corresponding to different TRPs. To ensure that modulation and coding schemes (modulation and coding scheme, MCS) are the same or approximate, the resources of the different TRPs also need to be the same or approximate. Therefore, the second transmission scheme needs to correspond to a more balanced frequency domain resource allocation manner.

The second transmission scheme may also be referred to as an FDM transmission scheme B or an FDM scheme 2b.

In descriptions of this specification, content of a TB, a codeword, and data is explained herein together. A network device first receives a TB from a higher layer. Then the TB undergoes a series of physical layer procedures, including cyclic redundancy check (cyclic redundancy check, CRC) attachment, code block (code block, CB) cutting, and CB-based CRC attachment. Then, the TB is sent to a coding module by using a CB as a coding unit, and a rate matching process is performed on the TB. An RV may be added in the rate matching process. CBs that come from the coding module may be then spliced into a string of bit stream. The bit stream is a codeword in a conventional sense. The codeword becomes a modulated symbol through modulation, and the modulated symbol is mapped to a time-frequency resource of a physical channel. The modulated symbol mapped to the time-frequency resource of the physical channel is referred to as data for short. Therefore, generally, there is a one-to-one correspondence between a TB and a codeword, and only one RV can be added to one codeword. In the embodiments of this application, when data sent by the two TRPs is distinguished, the first data and the second data are used for description. In this context, data may alternatively be replaced with a TB or a codeword.

3. Multipoint Transmission Technology

A multipoint transmission technology is a technology in which a plurality of TRPs transmit data. In the multipoint transmission technology, the plurality of TRPs may cooperatively send a downlink signal to a user, and/or cooperatively receive an uplink signal of a user.

The multipoint transmission technology is mainly classified into joint transmission (Joint transmission, JT), dynamic point selection (dynamic point selection, DPS), dynamic cell selection (dynamic cell selection, DCS), coordinated beamforming (coordinated beam forming, CB), coordinated scheduling (coordinated scheduling, CS), and the like.

Figure 3:
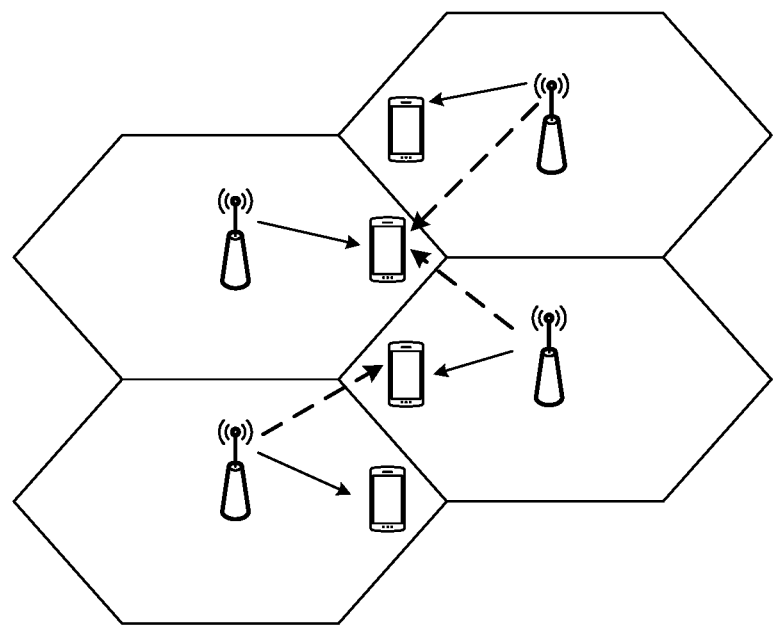
FIG. 3 is a schematic diagram of a coordinated multipoint transmission scenario according to an embodiment of this application.
Figure 3:
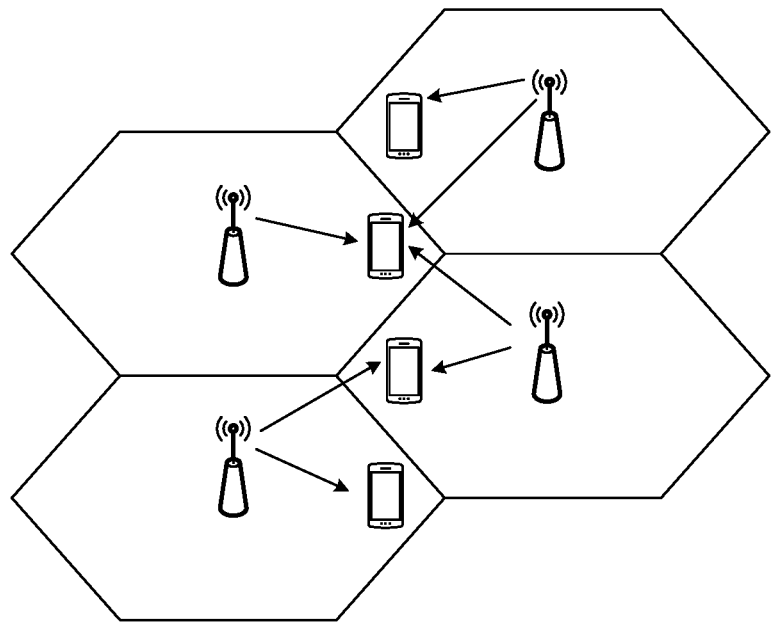

Multipoint transmission in this application is mainly a joint transmission (or referred to as coordinated multipoint transmission) scenario. A transmission rate of a terminal device at a cell edge can be improved through joint transmission of the plurality of TRPs. For example, in a non-joint transmission scenario, referring to (a) in FIG. 3, when a terminal device is located at a cell edge, communication of the terminal device is interfered with by a signal sent by a neighboring cell of a serving cell. In (a) in FIG. 3 and (b) in FIG. 3, a solid line represents useful data generated for a terminal device, and a dashed line represents interference to a terminal device. In the joint transmission scenario, referring to (b) in FIG. 3, a plurality of TRPs jointly send data to a terminal device, and the terminal device receives a plurality of pieces of useful data. Therefore, a signal sent by a neighboring cell of a serving cell not only causes no interference to the terminal device, but also can increase the transmission rate of the terminal device at the cell edge.

4. Coordinated Multipoint Data Transmission

In 5G and a future evolved communications technology, URLLC is one of important service types. In a URLLC service, a data throughput is always no longer a main measurement indicator. In comparison, a low bit error rate and a low delay become most critical indicators. In the multipoint transmission technology, there is channel diversity between channels of the plurality of TRPs. Reliability of a communications link can be improved by sending data by the plurality of TRPs. Therefore, the multipoint transmission technology may be used to enhance reliability of the URLLC service.

Figure 4:
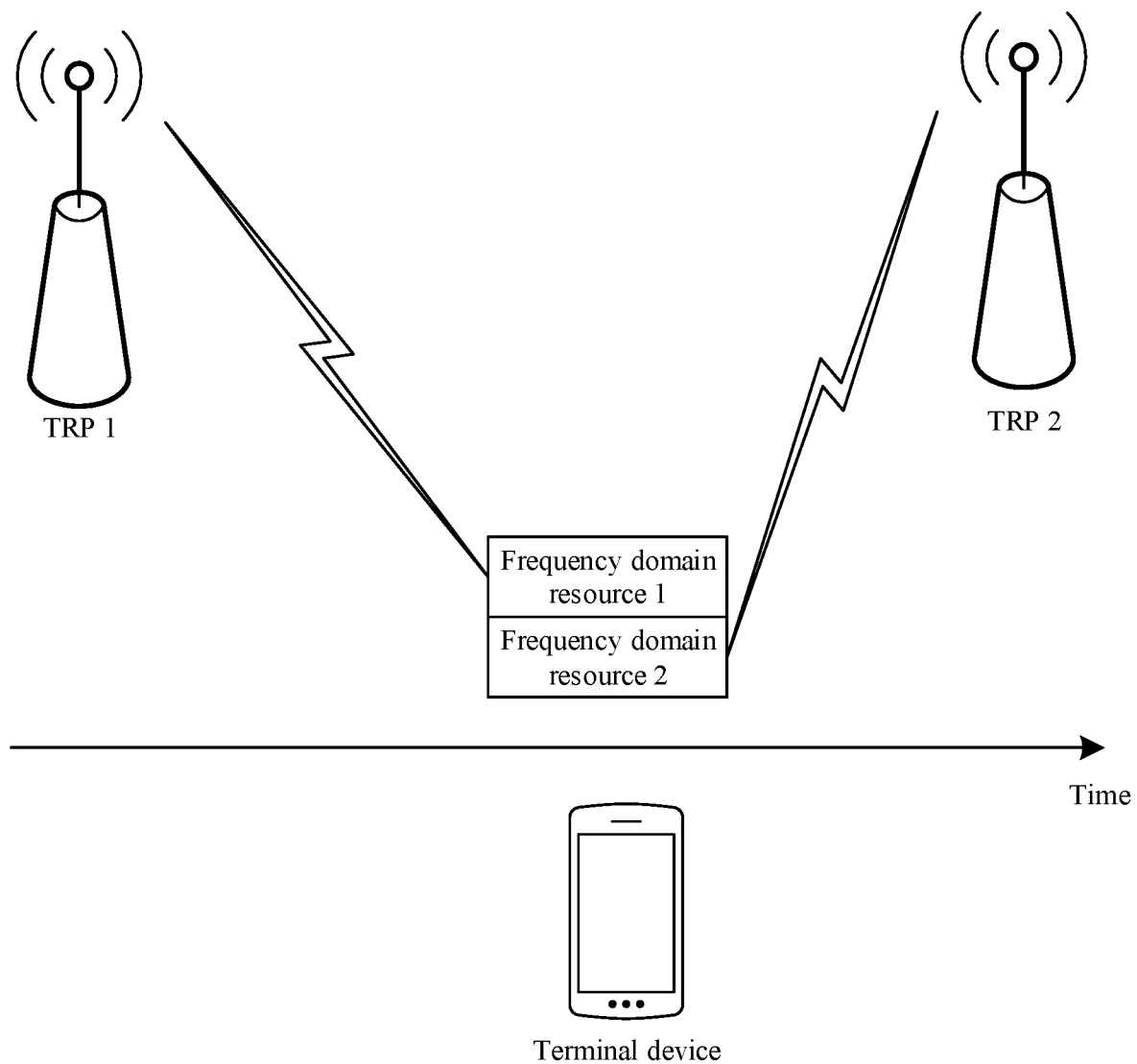
FIG. 4 is a schematic diagram of communication between TRPs and a terminal device according to an embodiment of this application.

Specifically, the plurality of TRPs may send data to a terminal device on different channels in a frequency division manner. For example, referring to FIG. 4, the terminal device is in a joint transmission scenario of a TRP 1 and a TRP 2, and the TRP 1 and the TRP 2 are located in different directions of the terminal device. The TRP 1 and the TRP 2 may respectively send data to the same terminal device on a frequency domain resource 1 and a frequency domain resource 2 by using the first transmission scheme or the second transmission scheme. When the first transmission scheme is used, a coding gain brought by a relatively low code rate may be enjoyed. When the second transmission scheme is used, an extra coding gain may be brought by performing soft combination on the terminal device. In addition, spatial diversity gains brought by the two TRPs may cause a quite low probability that channels of the two TRPs are both in channel deep fading, thereby improving data transmission reliability.

5. System Bandwidth

In a wireless communications system, system bandwidth may also be referred to as a carrier frequency resource or a component carrier (component carrier, CC). The system bandwidth may be a segment of consecutive frequency domain resources. A network device may allocate a segment of frequency domain resources in the system bandwidth to a terminal device, so that the network device and the terminal device can communicate with each other by using the allocated frequency domain resources.

6. Bandwidth Part (Bandwidth Part, BWP)

A BWP may also be referred to as a carrier bandwidth part (carrier bandwidth part). In frequency domain, the BWP includes a positive integer quantity of consecutive resource units, for example, includes a positive integer quantity of consecutive subcarriers, resource blocks (resource block, RB), or resource block groups (RB group, RBG). The BWP may be a downlink BWP or an uplink BWP. The uplink BWP is used by a terminal device to send a signal to a network device, and the downlink BWP is used by the network device to send a signal to the terminal device. In the embodiments of this application, the positive integer quantity may be one, two, three, or more. This is not limited in the embodiments of this application.

A plurality of BWPs may be configured for the terminal device. For each BWP, a parameter set (numerology) of the BWP may be independently configured through preconfiguration or by sending signaling by the network device to the terminal device. Numerologies of different BWPs may be the same or may be different. The numerology may be defined by using but not limited to one or more of the following parameter information: a subcarrier spacing, a cyclic prefix (cyclic prefix, CP), information about a time unit, BWP bandwidth, and the like. For example, the numerology may be defined by using the subcarrier spacing and the CP.

7. RB

An RB is one of the most basic resource units. In frequency domain, the RB may include a positive integer quantity of, for example, 6 or 12, subcarriers. A definition of the RB may be further extended to a time domain. For example, the RB includes a positive integer quantity of time domain symbols in time domain. For example, the RB includes 12 subcarriers in frequency domain, and includes 7 or 14 orthogonal frequency division multiplexing (orthogonal frequency division multiplexing, OFDM) symbols in time domain.

Figure 5:
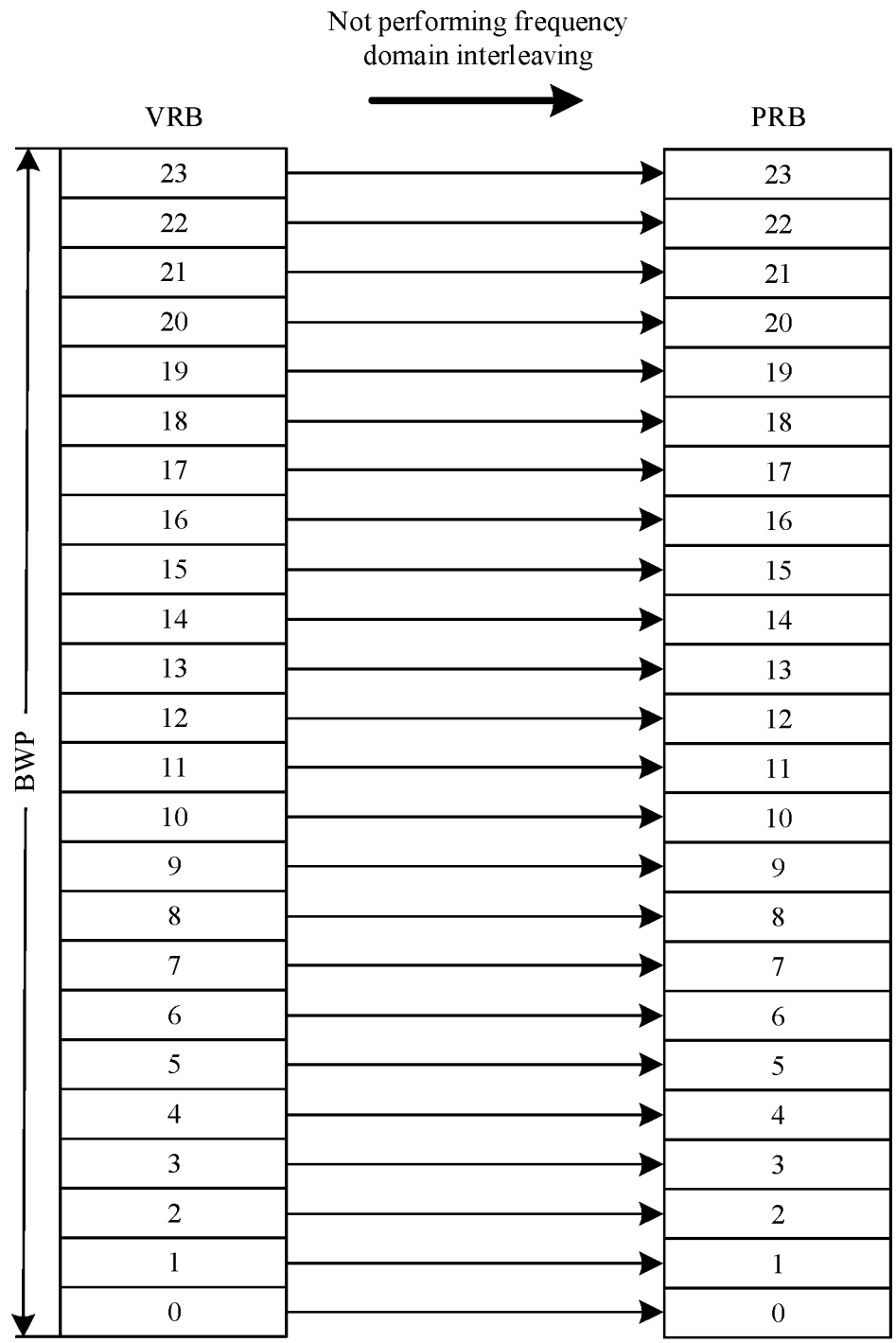
FIG. 5 is a schematic diagram of performing frequency domain interleaving on VRBs and PRBs according to an embodiment of this application.
Figure 6:
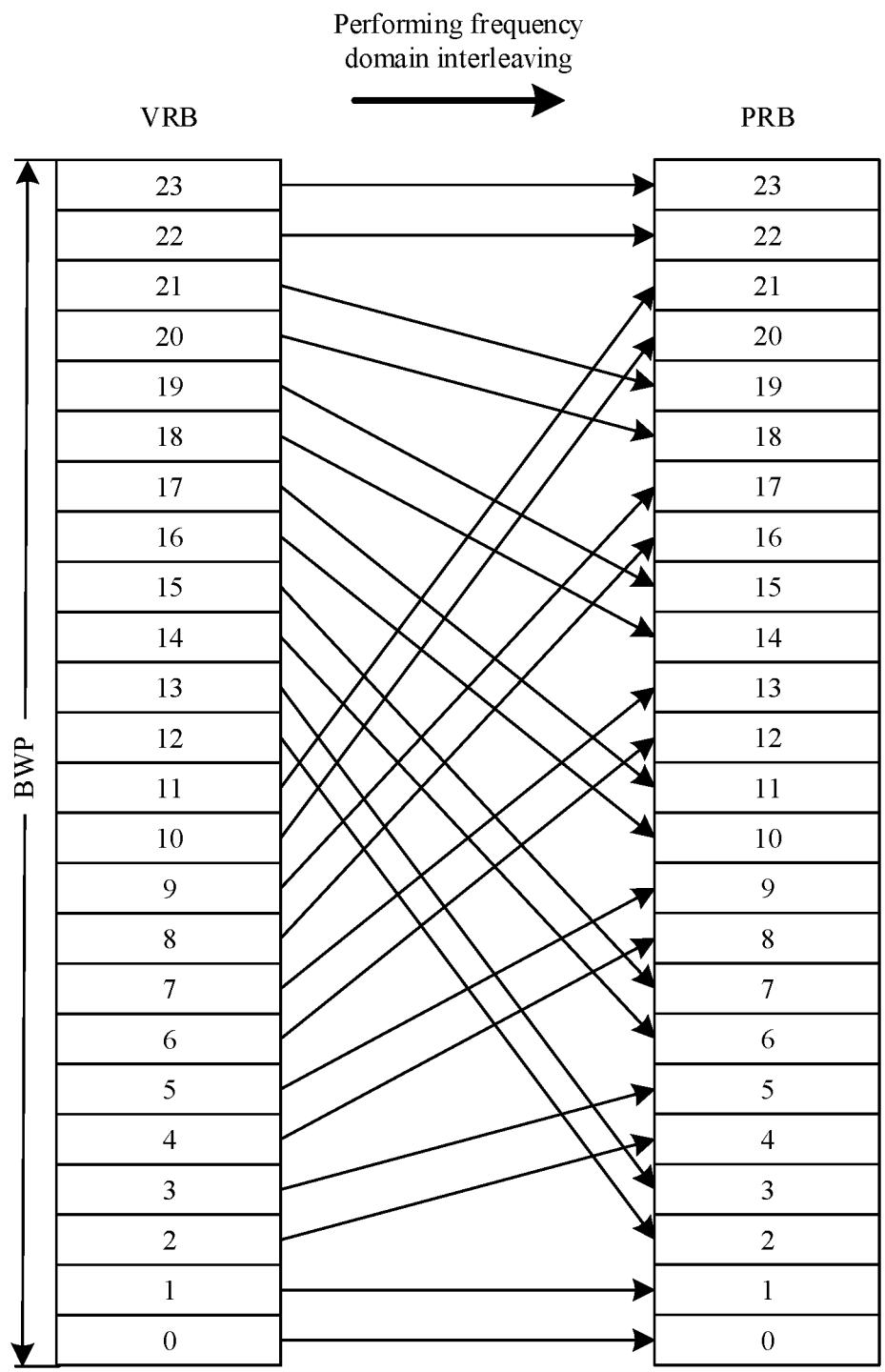
FIG. 6 is a schematic diagram of not performing frequency domain interleaving on VRBs and PRBs according to an embodiment of this application.

When a frequency domain resource is allocated, the RB may be further classified as a physical resource block (physical resource block, PRB) or a virtual resource block (virtual resource block, VRB). When the frequency domain resource is allocated by using an FD-RA indication field in DCI, the frequency domain resource indicated by using the FD-RA indication field is VRBs, and data is also first mapped to the VRBs. A next step is mapping from the VRBs to PRBs. In this step, if there is no frequency domain interleaving, numbers of the VRBs correspond one-to-one to numbers of the PRBs. For example, data on a VRB numbered n is mapped to a PRB numbered n, for example, referring to FIG. 5. If frequency domain interleaving is performed, numbers of the VRBs and the PRBs may be mapped in a staggered manner in current BWP bandwidth. For example, data on a VRB numbered n may be mapped to a PRB numbered n+K, for example, referring to FIG. 6. Herein, n is an integer greater than or equal to 0, and K is an integer. For a specific interleaving rule, refer to the prior art. Details are not described herein.

Unless otherwise specified, the RB in the embodiments of this application may be a VRB or a PRB. If the RB is described together with other information, whether the RB is the VRB or the PRB may be determined based on a specific scenario. For example, when an RBG is described, unless otherwise specified, the RBG includes a plurality of consecutive VRBs by default. For another example, when a PRG is described, unless otherwise specified, the PRG includes a plurality of consecutive PRBs by default.

8. Resource Block Group (Resource Block Groups, RBG)

An RBG includes a group of consecutive VRBs. A quantity of the VRBs included in the RBG is an RBG size (RBG size). For example, if the RBG size is 2, the RBG includes two consecutive VRBs. Currently, the RBG size in the NR protocol may be 2, 4, 8, 16, or the like.

For a terminal device, the RBG size may be determined based on an RBG configuration and BWP bandwidth. Currently, two RBG configurations are predefined in the NR standard. In an RBG configuration 1, candidate values of the RBG size are 2, 4, 8, and 16. In an RBG configuration 2, candidate values of the RBG size are 4, 8, and 16. A network device may indicate an RBG configuration in each BWP to the terminal device by using a higher layer signaling parameter rbg-Size.

For example, for a relationship between the RBG size and both the RBG configuration and the BWP bandwidth, refer to Table 1. The BWP bandwidth is a quantity of RBs included in a BWP.

TABLE 1

| BWP bandwidth | RBG configuration 1 | RBG configuration 2 |
|---|---|---|
| 1-36 | 2 | 4 |
| 37-72 | 4 | 8 |
| 73-144 | 8 | 16 |
| 145-275 | 16 | 16 |

9. Quantity and Sizes of RBGs in a BWP

Figure 7:
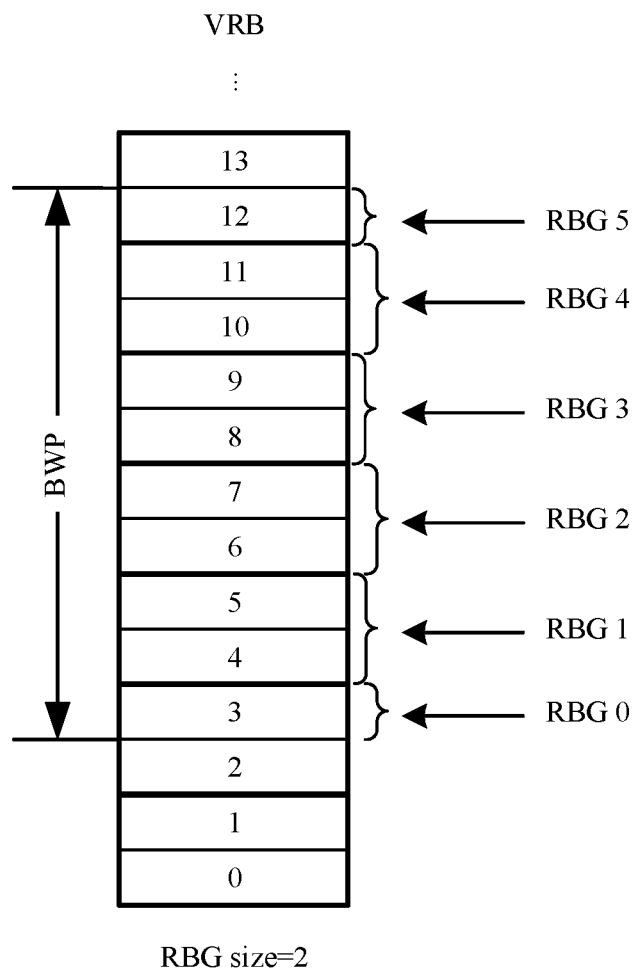
FIG. 7 is a schematic diagram of distribution of RBGs in a BWP according to an embodiment of this application.

RBGs are obtained through division based on system bandwidth. To be specific, the first RBG includes P start RBs in the system bandwidth, and so on. P is an RBG size. Specifically, as shown in FIG. 7, when P=2, starting from an RB 0, each RBG includes two RBs, where the RB 0 is an RB having a smallest number in the system bandwidth.

A BWP is a segment of consecutive frequency domain resources defined by using a start RB (namely, the first RB) and an RB length. Both the start RB and an end RB in the BWP may be any RB in the system bandwidth. Therefore, one part of RBs in an RBG to which the start RB or the end RB belongs may be located inside the BWP, and the other part of the RBs may be located outside the BWP. For example, as shown in FIG. 7, the start RB in the BWP is an RB 3, and an RB 2 and the RB 3 originally belong to a same RBG. However, the RB 3 is inside the BWP, and the RB 2 is outside the BWP. The end RB of the BWP is an RB 12, and the RB 12 and an RB 13 originally belong to a same RBG. However, the RB 3 is inside the BWP, and the RB 13 is outside the BWP.

Therefore, a quantity and sizes of RBGs in the BWP are calculated by using a method as follows:

The total quantity of RBGs included in the BWP is $N_{RBG} = \lceil (N_{BWP}^{size} + (N_{BWP}^{start} \bmod P))/P \rceil$, where $N_{BWP}^{size}$ is a quantity of RBs included in the BWP, $N_{BWP}^{start}$ is a number of the start RB in the BWP in the system bandwidth, mod is a modulo function, and P is the RBG size.

A size of the first RBG (which is numbered 0) is $RBG_0^{size} = P - N_{BWP}^{start} \bmod P$. For the last RBG (which is numbered $N_{RBG}-1$), if $(N_{BWP}^{size} + N_{BWP}^{start}) \bmod P > 0$, a size of the last RBG is $RBG_{last}^{size} = (N_{BWP}^{size} + N_{BWP}^{start}) \bmod P$; or if $(N_{BWP}^{size} + N_{BWP}^{start}) \bmod P = 0$, a size of the last RBG is $RBG_{last}^{size} = P$. Sizes of remaining RBGs are all P.

$N_{RBG}$ RBGs included in the BWP are numbered from 0 to $N_{RBG}-1$, or may be numbered from 1 to $N_{RBG}$, or may be numbered in another manner. In this specification, numbering from 0 to $N_{RBG}-1$ is used as an example for description.

For example, referring to FIG. 7, the number of the start RB in the BWP in the system bandwidth is 3, the RBG size is 2, and the BWP includes 10 RBs. In this case, the quantity of RBGs included in the BWP is $N_{RBG} = \lceil (N_{BWP}^{size} + (N_{BWP}^{start} \bmod P))/P \rceil = \lceil (10+(3 \bmod 2))/2 \rceil = 6$. A size of the first RBG (namely, an RBG 0) is $RBG_0^{size} = P - N_{BWP}^{start} \bmod P = 2 - 3 \bmod 2 = 1$. A size of the last RBG (namely, an RBG 5) is $RBG_{last}^{size} = (N_{BWP}^{size} + N_{BWP}^{start}) \bmod P = (10+3) \bmod 2 = 1$. The sizes of the remaining RBGs are all 2.

10. Precoding Resource Group (Precoding Resource Group, PRG)

A PRG includes a plurality of consecutive PRBs, and data on PRBs in each PRG is precoded by using a same transmit precoding matrix. A quantity of the PRBs included in the PRG may be referred to as a PRG size (PRG size). Currently, in the NR protocol, the PRG size may be 2, 4, or wideband (wideband).

In addition, a terminal device may assume that a network device sends data on PRBs in a same PRG by using a same transmit precoding matrix.

PRGs are also obtained through division based on the system bandwidth. Therefore, a quantity of PRGs in a BWP and sizes of the PRGs are calculated by using a method similar to the method for calculating the quantity of RBGs in the BWP and the sizes of the RBGs, provided that P in the formula is replaced with the PRG size. Details are not described herein again.

11. Interleaving Resource Unit

An interleaving resource unit is a resource unit on which frequency domain interleaving is performed, namely, RB bundles. The RB bundles may be specifically VRB bundles or PRB bundles. The interleaving resource unit includes a plurality of consecutive RBs. A quantity of the RBs included in the interleaving resource unit is referred to as an interleaving resource unit size (namely, a bundle size). For example, an optional value of the bundle size is 2 or 4.

When VRBs are mapped to PRBs through frequency domain interleaving, mapping is performed in a unit of the interleaving resource unit. To be specific, when consecutive VRBs included in the interleaving resource unit are mapped to PRBs, a consecutive state is also maintained.

Interleaving resource units are also obtained through division based on the system bandwidth. Therefore, a quantity of interleaving resource units in a BWP and sizes of the interleaving resource units are calculated by using a method similar to the method for calculating the quantity of RBGs in the BWP and the sizes of the RBGs, provided that P in the formula is replaced with the bundle size. Details are not described herein again.

12. Measurement Bandwidth

Before data transmission, a network device sends a CSI-RS to a terminal device, and the terminal device performs channel measurement based on the received CSI-RS and feeds back channel state information (channel state information, CSI) to the network device. The CSI may include a precoding matrix indicator (precoding matrix indicator, PMI), a channel quality indicator (channel quality indicator, CQI), a rank indicator (rank indication, RI), and the like. Before performing channel measurement, the network device configures a CSI-RS resource for the terminal device, and configures a reporting format and measurement bandwidth. The configured measurement bandwidth may be wideband (namely, an entire BWP), or may be a subband (subband). When the configured measurement bandwidth is the wideband, the terminal device reports a piece of CSI after performing channel measurement on the entire measurement bandwidth (namely, the BWP). When the configured measurement bandwidth is a measurement subband, it means that the entire measurement bandwidth is divided into a plurality of measurement subbands, and a piece of CSI may be reported for each measurement subband. For a relationship between a size of the measurement subband and BWP bandwidth, refer to Table 2. The size of the measurement subband is a quantity of RBs included in the measurement subband.

TABLE 2

| BWP bandwidth | Size of a measurement subband |
|---|---|
| <24 | None |
| 24-72 | 4 and 8 |
| 73-144 | 8 and 16 |
| 145-275 | 16 and 32 |

Measurement subbands for channel measurement are also obtained through division based on the system bandwidth. Therefore, a quantity of measurement subbands in the BWP and sizes of the measurement subbands are calculated by using a method similar to the method for calculating the quantity of RBGs in the BWP and the sizes of the RBGs, provided that P in the formula is replaced with the size of the measurement subband. Details are not described herein again.

13. Existing Frequency Domain Resource Allocation Type

There are two existing frequency domain resource allocation types: type 0 (Type 0) and type 1 (Type 1).

In frequency domain resource allocation type 0, an FD-RA indication field in DCI includes a bitmap (bitmap), and one bit in the bitmap is used to indicate, to a terminal device, whether an RBG is allocated for data transmission. A length of the bitmap is equal to a quantity (denoted as $N_{RBG}$) of RBGs in a range of the BWP, to flexibly indicate transmission bandwidth at a granularity of an RBG. Based on the example shown in FIG. 7, the bitmap may include six bits, and one of the six bits is used to indicate whether one of six RBGs is allocated for data transmission. In addition, in some cases, a system may configure a dynamic indication bit to indicate whether type 0 or type 1 is used for FD-RA. In this case, the indication bit is used as a most significant bit (most significant bit, MSB) and is placed at the beginning of the entire bitmap. That is, in this case, a length of the FD-RA indication field is $N_{RBG}+1$.

Figure 8:
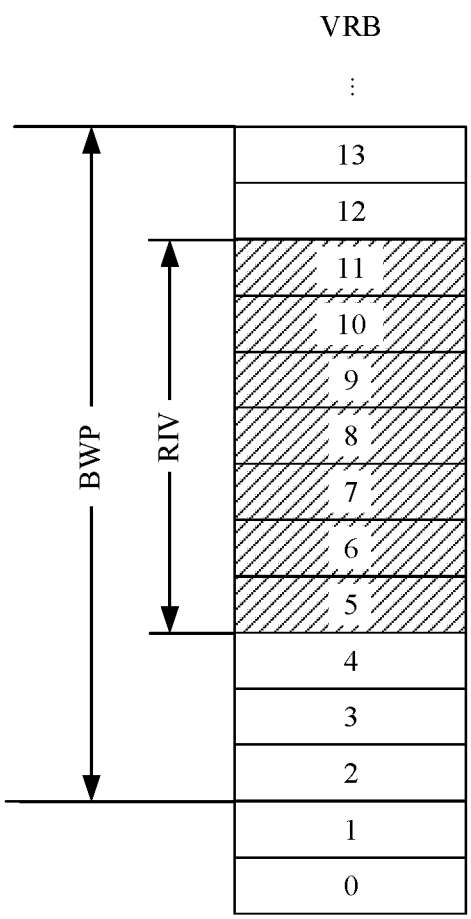
FIG. 8 is a schematic diagram of a frequency domain resource indicated by using an RIV according to an embodiment of this application.

In frequency domain resource allocation type 1, the FD-RA indication field includes a resource indication value (resource indication value, RIV). The RIV is a value calculated based on a determined formula, and a start VRB number and a length of consecutive VRBs are input into the formula. The RIV value varies through calculation based on a different combination of the start VRB number and the length of the consecutive VRBs. In type 1, the RIV is used to indicate a segment of consecutive VRBs. For example, refer to FIG. 8. A resource indicated by the using RIV may be a VRB 5 to a VRB 11.

To support multipoint transmission, a frequency domain resource allocated to the terminal device may need to be divided into a plurality of resources, and the plurality of resource are separately allocated to different TRPs for scheduling. According to the existing frequency domain resource allocation manners mentioned in the background, resources in a PRG may be allocated to different TRPs. The TRPs in coordination are usually located in different directions of a same terminal device, and channels from the TRPs to the terminal device are different. Therefore, based on a channel measurement result, the different TRPs usually use different transmit precoding matrices to send data. However, the terminal device always considers by default that data on PRBs in a same PRG is sent after being precoded by using a same transmit precoding matrix. Therefore, the terminal device also uses a same channel equalization matrix to demodulate multi-stream data. In this case, an assumption of a transmitting party is inconsistent with that of a receiving party. Consequently, the transmit precoding matrices do not match the channel equalization matrix, and signal received quality deteriorates.

To resolve the problem, an embodiment of this application provides a frequency domain resource allocation method.

Figure 9:
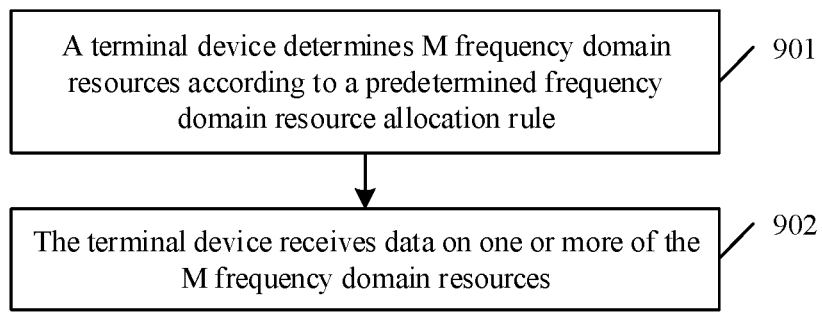
FIG. 9 and FIG. 10 each are a flowchart of a frequency domain resource allocation method according to an embodiment of this application.

For a terminal device, referring to FIG. 9, the method includes the following steps.

901: The terminal device determines M frequency domain resources according to a predetermined frequency domain resource allocation rule, where M is an integer greater than 1.

During specific implementation of step 901, the terminal device may determine the M frequency domain resources according to the predetermined frequency domain resource allocation rule and based on predetermined bandwidth. For a specific description of frequency domain resource allocation, refer to the following description.

902: The terminal device receives data on one or more of the M frequency domain resources.

Figure 10:
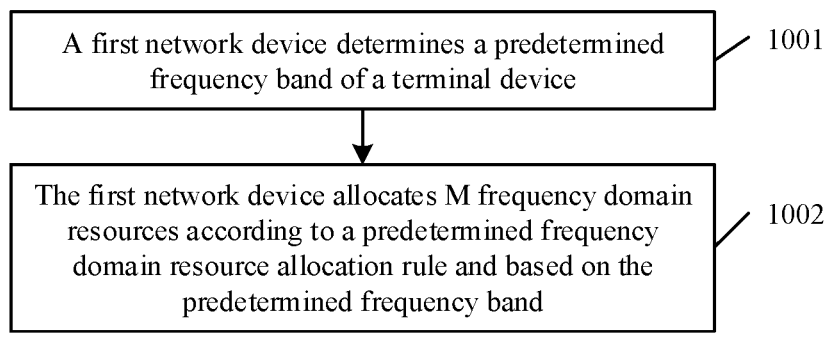

For a network device (denoted as a first network device), referring to FIG. 10, the frequency domain resource allocation method includes the following steps.

1001: The first network device determines the predetermined bandwidth of the terminal device.

1002: The first network device allocates the M frequency domain resources according to the predetermined frequency domain resource allocation rule and based on the predetermined bandwidth.

After step 1002, the first network device may perform different actions in different scenarios. The following provides specific descriptions.

Scenario 1: M TRPs of the first network device cooperatively send data to the terminal device.

In the scenario 1, for example, the first network device may be a base station, and the TRP may be an antenna panel of the base station.

In the scenario 1, the M TRPs correspond one-to-one to the M frequency domain resources. After step 1002, the first network device may send data to the terminal device by using frequency domain resources respectively corresponding to the M TRPs. The first network device may send data to the terminal device in first transmission mode by using the M TRPs, or may send data to the terminal device in second transmission mode by using the M TRPs.

Scenario 2: M network devices that do not include the first network device cooperatively send data to the terminal device.

In the scenario 2, the first network device may have a centralized scheduling function. The first network device and the M network devices may all be base stations, or may all be TRPs.

In the scenario 2, the M network devices correspond one-to-one to the M frequency domain resources. After step 1002, the first network device sends information about the corresponding frequency domain resources to the M network devices, and the M network devices send data to the terminal device on the corresponding frequency domain resources. The M network devices may send data to the terminal device in first transmission mode, or may send data to the terminal device in second transmission mode.

Scenario 3: M network devices including the first network device cooperatively send data to the terminal device.

In the scenario 3, the first network device may be a network device having a centralized scheduling function in the M network devices. The M network devices may all be base stations, or may all be TRPs.

In the scenario 3, the M network devices correspond one-to-one to the M frequency domain resources. After step 1002, the first network device sends information about corresponding frequency domain resources to M−1 network devices other than the first network device in the M network devices, and the M network devices send data to the terminal device on the corresponding frequency domain resources. The M network devices may send data to the terminal device in first transmission mode, or may send data to the terminal device in second transmission mode.

The following describes in detail a specific process of the foregoing frequency domain resource allocation.

In the foregoing frequency domain resource allocation method, the terminal device may determine the M frequency domain resources according to the predetermined frequency domain resource allocation rule and based on the predetermined bandwidth. Correspondingly, the first network device may allocate the M frequency domain resources according to the predetermined frequency domain resource allocation rule and based on the predetermined bandwidth. Any two of the M frequency domain resources do not overlap. Each of the M frequency domain resources is associated with one piece of QCL information. Any two of the M frequency domain resources are associated with different QCL information. For example, each of two frequency domain resources in (a) in FIG. 11 may correspond to one piece of QCL information, and the two frequency domain resources correspond to different QCL information. In (b) in FIG. 11, each of three frequency domain resources may correspond to one piece of QCL information, and all the three frequency domain resources correspond to different QCL information. Quantities of RBs included in different frequency domain resources in the M frequency domain resources may be the same or may be different. For example, in (b) in FIG. 11, a quantity of RBs included in a first frequency domain resource is the same as a quantity of RBs included in a second frequency domain resource, and the quantity of RBs included in the first frequency domain resource is different from a quantity of RBs included in a third frequency domain resource.

Figure 11:
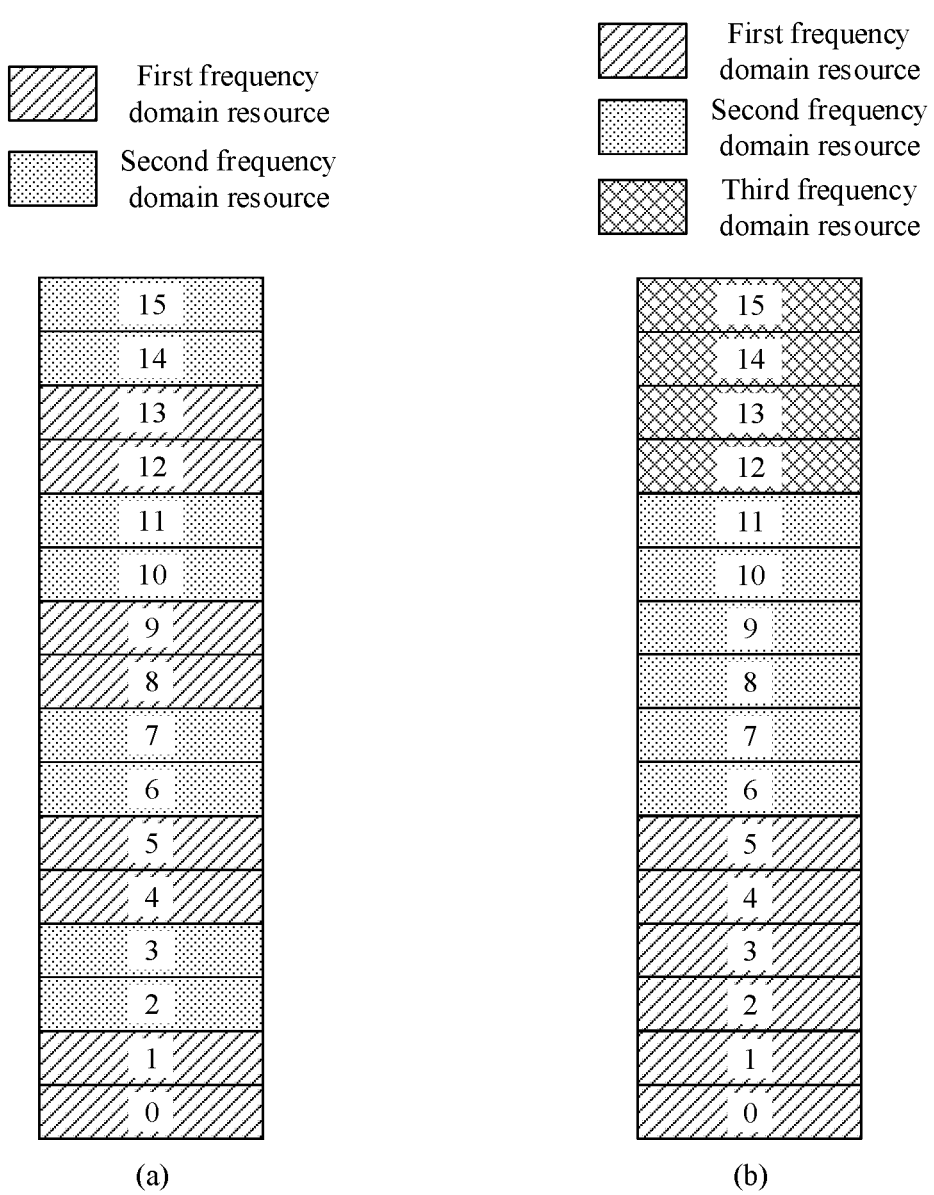
FIG. 11 is a schematic diagram of frequency domain resource allocation according to an embodiment of this application.

The predetermined frequency domain resource allocation rule may be preset, configured for the terminal device by using signaling, or specified in a protocol. A method for obtaining the predetermined frequency domain resource allocation rule by the terminal device is not limited in this application. The frequency domain resource allocation rule may be an alternate allocation rule. To be specific, starting from a start RB in the predetermined bandwidth, RBs are sequentially allocated to the first frequency domain resource to an $M^{th}$ frequency domain resource in a unit of a frequency domain resource allocation unit in ascending order of RB numbers. If there are remaining frequency domain resource allocation units after RBs are allocated to the $M^{th}$ frequency domain resource, the remaining frequency domain resource allocation units are further sequentially allocated to the first frequency domain resource to the $M^{th}$ frequency domain resource, and so on. For example, referring to (a) in FIG. 11, for example, frequency domain resource allocation is performed in a unit of two consecutive RBs starting from an RB 0. In this case, the RB 0 and an RB 1 are allocated to a first frequency domain resource, and an RB 2 and an RB 3 are allocated to a second frequency domain resource, an RB 4 and an RB 5 are also allocated to the first frequency domain resource, an RB 6 and an RB 7 are also allocated to the second frequency domain resource, and so on. In this case, not all RBs included in a frequency domain resource are consecutive. That is, some RBs are consecutive, and some RBs are non-consecutive. For another example, referring to (b) in FIG. 11, for example, frequency domain resource allocation is performed in a unit of six consecutive RBs starting from an RB 0, where the RB 0 to an RB 5 are allocated to the first frequency domain resource, an RB 6 to an RB 11 are allocated to the second frequency domain resource, and an RB 12 to an RB 15 are allocated to the third frequency domain resource. In this case, all RBs included in any frequency domain resource are consecutive. It may be understood that a frequency domain resource allocation method in (a) in FIG. 11 is the same as a frequency domain resource allocation method in (b) in FIG. 11. That is, frequency domain resource allocation is performed alternately. A reason why frequency domain resource allocation results are different is that granularities of a frequency domain resource allocation unit are different. In (a) in FIG. 11, frequency domain resource allocation is performed in a unit of two consecutive RBs, and in (b) in FIG. 11, frequency domain resource allocation is performed in a unit of six consecutive RBs. The alternate allocation rule described above may also be referred to as a comb allocation rule, a staggered allocation rule, or an interleaving allocation rule. A name of the allocation rule is not limited in this embodiment of this application.

As described above, when frequency domain resources are allocated to a plurality of TRPs, to ensure that PRBs in a same PRG are not simultaneously allocated to different TRPs, this application proposes a minimum granularity of a frequency domain resource allocation unit. The minimum granularity is x consecutive RBs (consecutive VRBs or consecutive PRBs). A value of x is a PRG size. It should be understood that the PRG size is a configurable value. Therefore, the minimum granularity of the frequency domain resource unit also varies with the PRG size.

Optionally, in addition to the minimum granularity, a granularity of the frequency domain resource allocation unit may be another granularity, for example, an RBG and an interleaving resource unit below. For details, refer to related descriptions below. However, when the granularity of the frequency domain resource allocation unit is the another granularity, the granularity cannot be less than the minimum granularity, to be specific, cannot be less than the PRG size.

It should be understood that, when the PRG size is configured as wideband, the wideband herein no longer refers to entire predetermined bandwidth, but refers to one frequency domain resource. That is, the terminal device may assume, because the PRG size is configured as the wideband, that a TRP uses a same transmit precoding matrix on any one of M frequency domain resources.

Frequency domain resource allocation is performed in the predetermined bandwidth, and the predetermined bandwidth may be a BWP, system bandwidth, or scheduled bandwidth.

When predetermined bandwidth is different, frequency domain resource allocation processes are also different. The following separately describes the frequency domain resource allocation processes by using a case 1 (where the predetermined bandwidth is the BWP), a case 2 (where the predetermined bandwidth is the system bandwidth), and a case 3 (where the predetermined bandwidth is the scheduled bandwidth).

Case 1: The predetermined bandwidth is the BWP.

In the case 1, frequency domain resource allocation may be based on all frequency domain resources in the BWP. To be specific, frequency domain resource allocation starts from the first frequency domain resource allocation unit in the BWP and ends at the last frequency domain resource allocation unit in the BWP.

In the case 1, when the PRG size is not configured as the wideband, the value of x is the same as the PRG size. For example, when the PRG size is configured as 2, x is 2. When the PRG size is configured as 4, x is 4. In this case, the frequency domain resource allocation unit may be an RBG, a PRG, an interleaving resource unit, y (where y is k times x, and k is a positive integer) consecutive RBs, or a measurement subband for channel measurement. Similar to RBGs, frequency domain resource allocation units are also obtained through division based on system bandwidth. Therefore, a quantity of frequency domain resource allocation units in the BWP and sizes of the frequency domain resource allocation units are calculated by using a method similar to the method for calculating the quantity of RBGs in the BWP and the sizes of the RBGs.

Specifically, if a size of a frequency domain resource allocation unit is denoted as Q, a total quantity of frequency domain resource allocation units included in a BWP is $N = \lceil (N_{BWP}^{size} + (N_{BWP}^{start} \bmod Q))/Q \rceil$, where $N_{BWP}^{size}$ is a quantity of RBs included in the BWP, $N_{BWP}^{start}$ is a number of a start RB in the BWP in the system bandwidth, and mod is a modulo function.

A size of the first frequency domain resource allocation unit (which is numbered 0) is $Q - N_{BWP}^{start} \bmod Q$. For the last frequency domain resource allocation unit (which is numbered N−1), if $(N_{BWP}^{size} + N_{BWP}^{start}) \bmod Q > 0$, a size of the last frequency domain resource allocation unit is $(N_{BWP}^{size} + N_{BWP}^{start}) \bmod Q$; or if $(N_{BWP}^{size} + N_{BWP}^{start}) \bmod Q = 0$, a size of the last frequency domain resource allocation unit is Q. Sizes of remaining frequency domain resource allocation units are all Q.

Figure 11A:
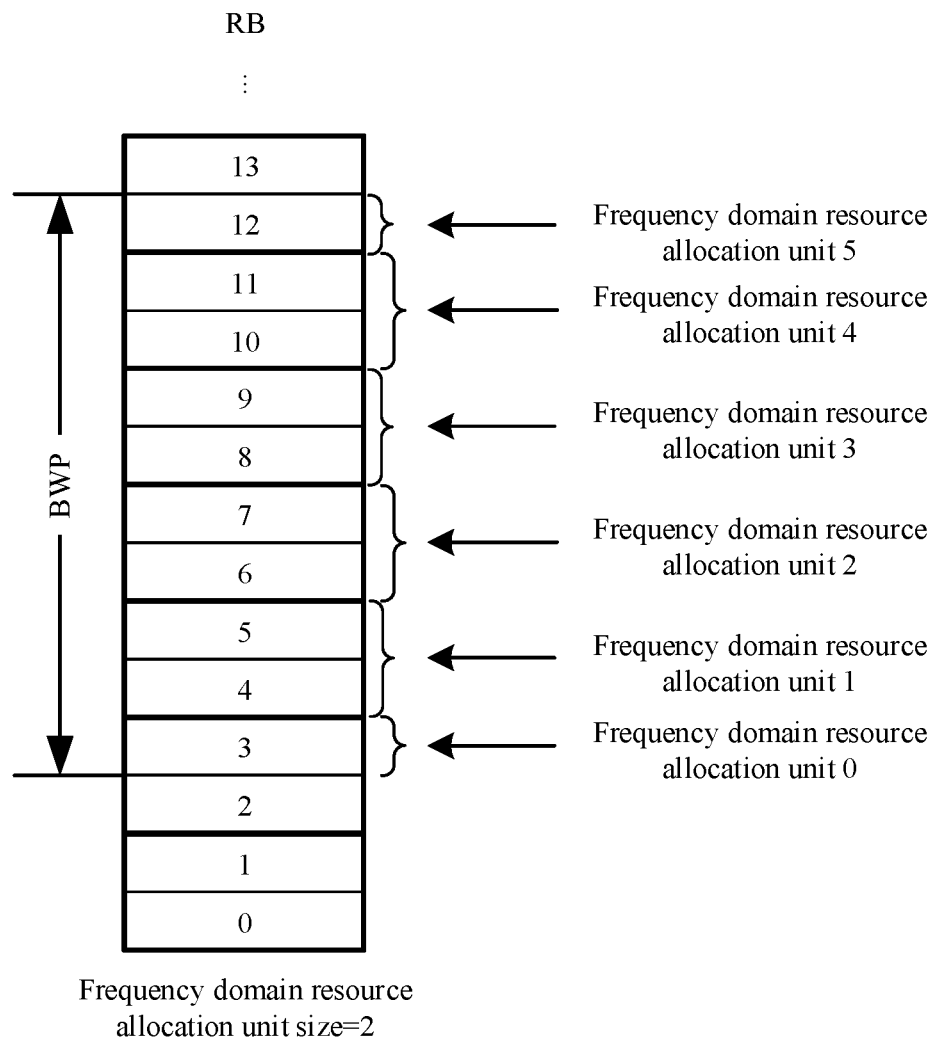
FIG. 11A and FIG. 12 each are a schematic diagram of distribution of frequency domain resource allocation units in a BWP according to an embodiment of this application.

The N frequency domain resource allocation units included in the BWP are numbered from 0 to N−1, or may be numbered from 1 to N, or may be numbered in another manner. In this specification, numbering from 0 to N−1 is used as an example for description. For example, referring to FIG. 11A, a number of a start RB in a BWP in system bandwidth is 3, a size of a frequency domain resource allocation unit is 2, and the BWP includes 10 RBs. In this case, a quantity of frequency domain resource allocation units included in the BWP is $N = \lceil (N_{BWP}^{size} + (N_{BWP}^{start} \bmod Q))/Q \rceil = \lceil (10 + (3 \bmod 2))/2 \rceil = 6$. A size of the first frequency domain resource allocation unit (namely, a frequency domain resource allocation unit 0) is $Q - N_{BWP}^{start} \bmod Q = 2 - 3 \bmod 2 = 1$. A size of the last frequency domain resource allocation unit (namely, a frequency domain resource allocation unit 5) is $(N_{BWP}^{size} + N_{BWP}^{start}) \bmod Q = (10 + 3) \bmod 2 = 1$. Sizes of remaining frequency domain resource allocation units are all 2.

In the case 1, when the PRG size is configured as the wideband, x is $$\left\lceil \frac{W}{M} \right\rceil,$$

and W is a quantity of RBs included in a BWP of the terminal device. In this case, a frequency domain resource allocation unit may be x consecutive RBs. In other words, when an RB is a PRB, and the PRG size is the wideband, the M frequency domain resources are determined by using $$\left\lceil \frac{W}{M} \right\rceil$$

PRBs as the frequency domain resource allocation unit.

Specifically, when the PRG size is the wideband, an $m^{th}$ frequency domain resource in the M frequency domain resources includes a $$\left(\left\lceil \frac{W}{M} \right\rceil (m-1) + 1\right)^{th}$$

RB to a $$\left(\left\lceil \frac{W}{M} \right\rceil m\right)^{th}$$

PRB in the BWP, and an $M^{th}$ frequency domain resource in the M frequency domain resources includes a remaining PRB in the BWP, where m is an integer greater than 0 and less than M.

$$\left\lceil \frac{W}{M} \right\rceil (m-1) \text{ is } \left\lceil \frac{W}{M} \right\rceil * (m-1), \left\lceil \frac{W}{M} \right\rceil m \text{ is } \left\lceil \frac{W}{M} \right\rceil * m,$$

and "*" refers to "multiply".

Figure 12:
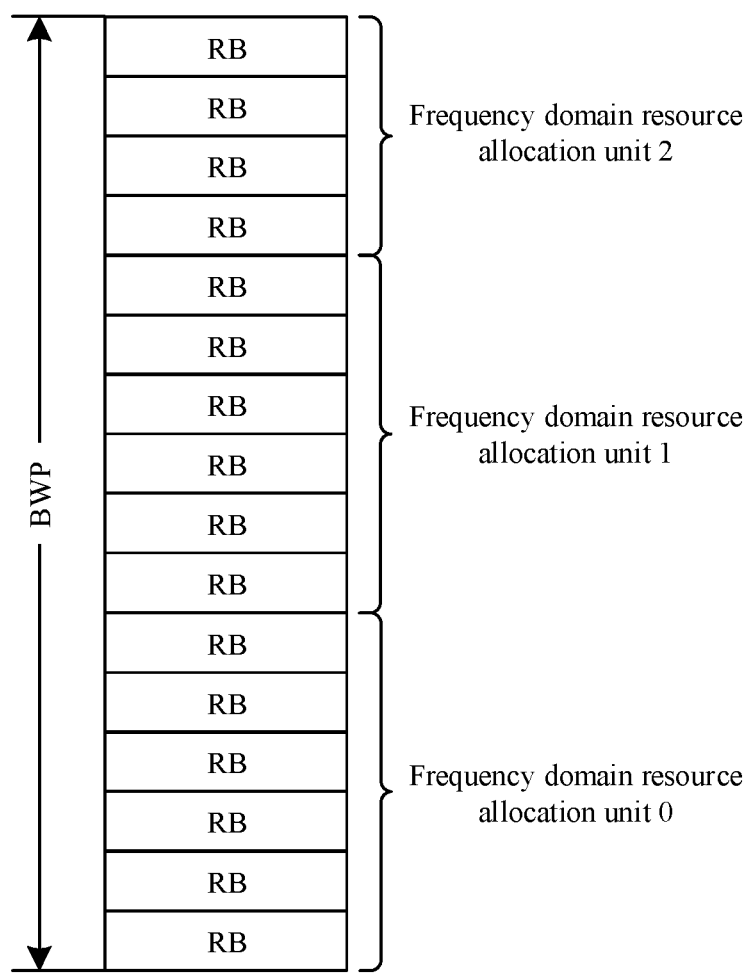

In this case, frequency domain resource allocation units are obtained through division based on the BWP. Starting from a start RB of the BWP, every x consecutive RBs are a frequency domain resource allocation unit. Because W is not necessarily an integer multiple of M, a size of the last frequency domain resource allocation unit may be less than x. For example, assuming that the BWP includes 16 RBs and M=3, x=6. Referring to FIG. 12, the BWP may include three frequency domain resource allocation units, where sizes of a frequency domain resource allocation unit 0 and a frequency domain resource allocation unit 1 are both 6, and a size of a frequency domain resource allocation unit 2 is 4.

In the case 1, a frequency domain resource allocation method may be as follows: The terminal device determines the $m^{th}$ frequency domain resource in the M frequency domain resources, where the $m^{th}$ frequency domain resource includes an $(Mi+m)^{th}$ frequency domain resource allocation unit in N frequency domain resource allocation units included in the BWP of the terminal device. Correspondingly, the first network device allocates the $(Mi+m)^{th}$ frequency domain resource allocation unit in the N frequency domain resource allocation units included in the BWP of the terminal device to the $m^{th}$ frequency domain resource in the M frequency domain resources. N is a positive integer, m is an integer greater than 0 and less than or equal to M, and i=0, 1, . . . , or $$\left\lceil \frac{N}{M} \right\rceil - 1.$$

In this alternate frequency domain resource allocation method, a plurality of frequency domain resources can be discretely distributed on the BWP as much as possible, to obtain a better frequency domain diversity gain. Mi refers to M*i.

Figure 13:
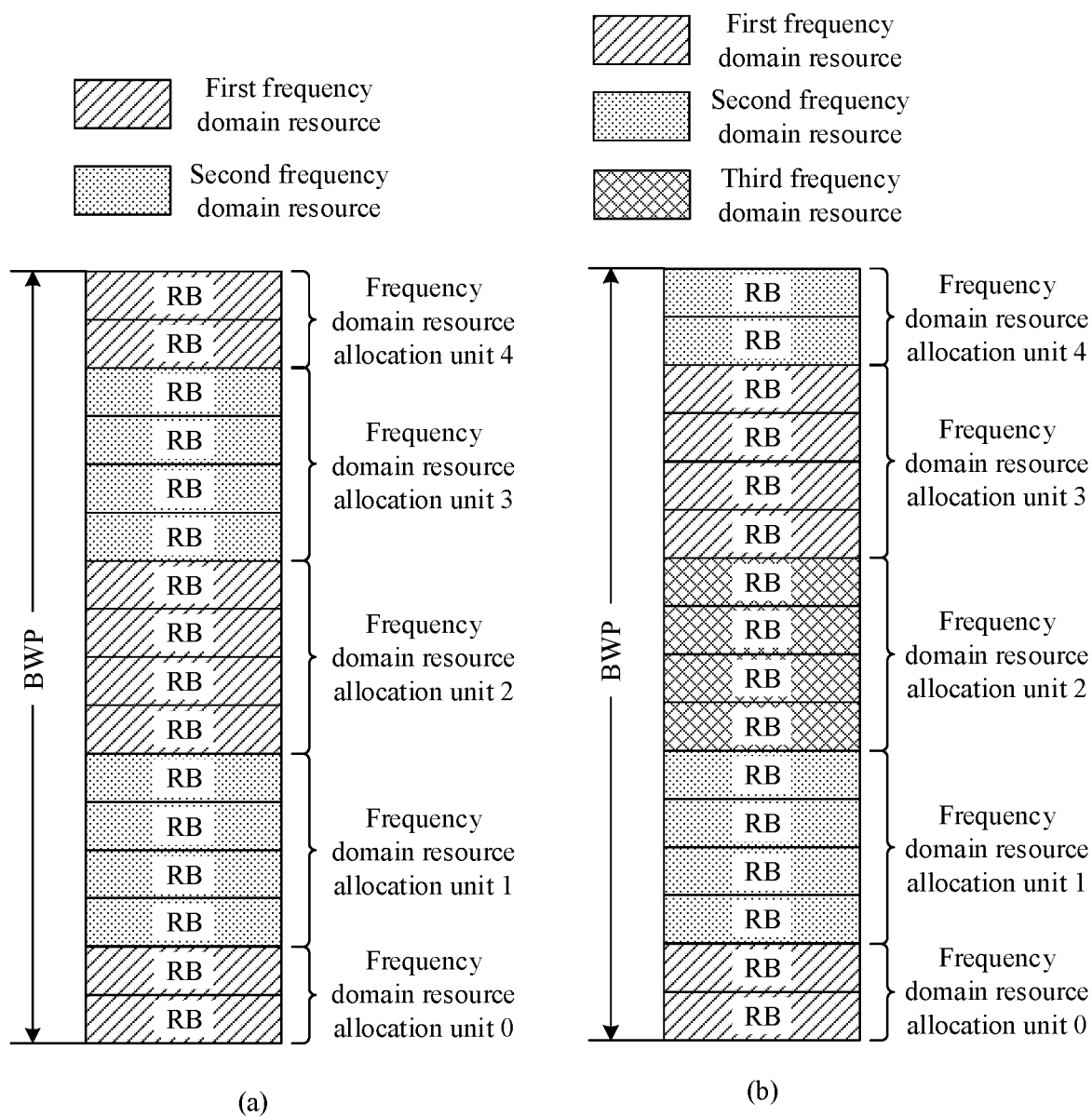
FIG. 13 to FIG. 20 each are a schematic diagram of frequency domain resource allocation according to an embodiment of this application.

For example, refer to (a) in FIG. 13 and (b) in FIG. 13. The BWP includes five frequency domain resource allocation units. If M=2, refer to (a) in FIG. 13. In the five frequency domain resource allocation units, a frequency domain resource allocation unit 0, a frequency domain resource allocation unit 2, and a frequency domain resource allocation unit 4 are a first frequency domain resource, and a frequency domain resource allocation unit 1 and a frequency domain resource allocation unit 3 are a second frequency domain resource. If M=3, refer to (b) in FIG. 13. In the five frequency domain resource allocation units, a frequency domain resource allocation unit 0 and a frequency domain resource allocation unit 3 are a first frequency domain resource, a frequency domain resource allocation unit 1 and a frequency domain resource allocation unit 4 are a second frequency domain resource, and a frequency domain resource allocation unit 2 is a third frequency domain resource.

When frequency domain resource allocation types are different, frequency domain resource allocation units are also different. The following describes frequency domain resource allocation processes corresponding to different frequency domain resource allocation units by using a case 1.1 (where a frequency domain resource allocation type is type 0) and a case 1.2 (where a frequency domain resource allocation type is type 1) as examples.

Case 1.1: Type 0.

The case 1.1 may be further divided into the following cases 1.1.1 and 1.1.2.

Case 1.1.1: The PRG size is not configured as the wideband.

In this case, there may be the following four types of frequency domain resource allocation units.

(1) PRG

Figure 14:
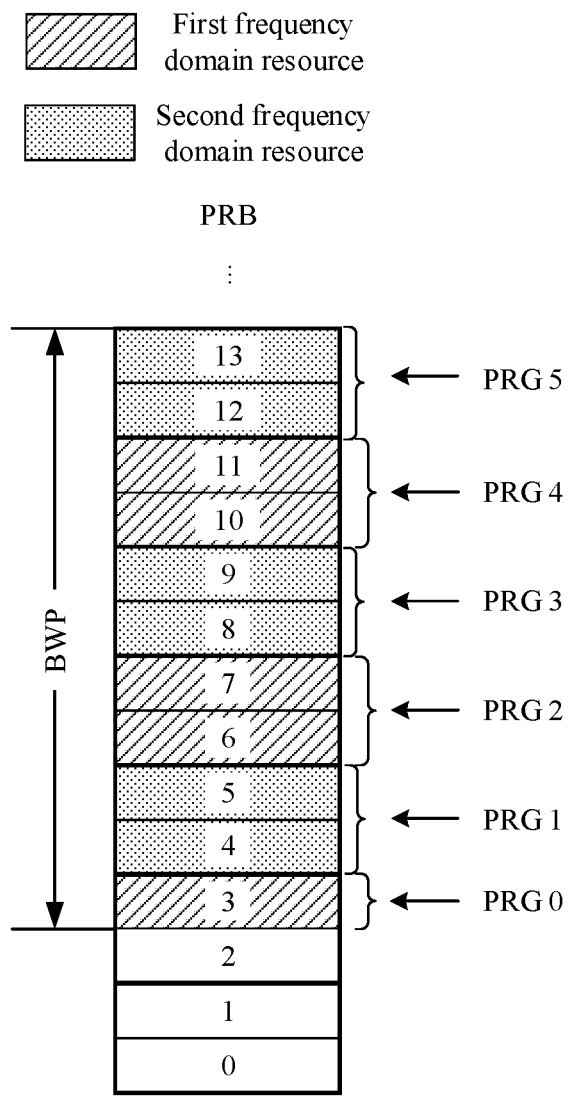

For example, it is assumed that PRG size=2, and M=2. Referring to FIG. 14, in a PRG 0 to a PRG 5, the PRG 0, the PRG 2, and the PRG 4 form a first frequency domain resource, and the PRG 1, the PRG 3, and the PRG 5 form a second frequency domain resource.

(2) RBG

It should be noted that the PRG size is always less than or equal to an RBG size, and the RBG size may be an integer multiple of the PRG size.

When the frequency domain resource allocation unit is an RBG and RBG size=PRG size, a frequency domain resource allocation process is similar to that when the frequency domain resource allocation unit is a PRG, and obtained allocation results are also the same. A difference lies only in that the former functions in a VRB domain, but the latter functions in a PRB field.

Figure 15:
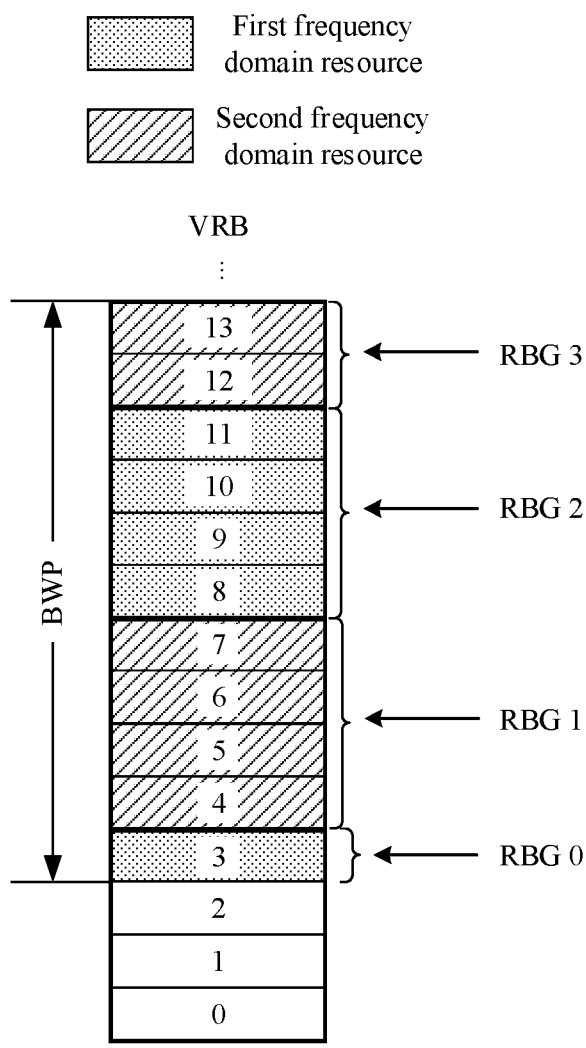

When the frequency domain resource allocation unit is an RBG and RBG size>PRG size, for example, it is assumed that RBG size=4, PRG size=2, and M=2. Referring to FIG. 15, in an RBG 0 to an RBG 3, a first frequency domain resource includes the RBG 0 and the RBG 2, a second frequency domain resource includes the RBG 1 and the RBG 3.

If the frequency domain resource allocation unit is an RBG, the foregoing frequency domain resource allocation method may also be considered as that the $m^{th}$ frequency domain resource determined by the terminal device includes a frequency domain resource corresponding to an $(Mi+m)^{th}$ bit in a bitmap. For example, when M=2, the terminal device may determine a frequency domain resource corresponding to an even-numbered bit in the bitmap as a frequency domain resource, and determine a frequency domain resource corresponding to an odd-numbered bit in the bitmap as another frequency domain resource.

(3) y Consecutive RBs

The RB herein may be a VRB, or may be a PRB.

y may be equal to a PRG size or an RBG size. When y=PRG size, a frequency domain resource allocation process is similar to that when the frequency domain resource allocation unit is a PRG, and obtained allocation results are also the same. When y=RBG size, a frequency domain resource allocation process is similar to that when the frequency domain resource allocation unit is an RBG, and obtained allocation results are also the same.

Figure 16:
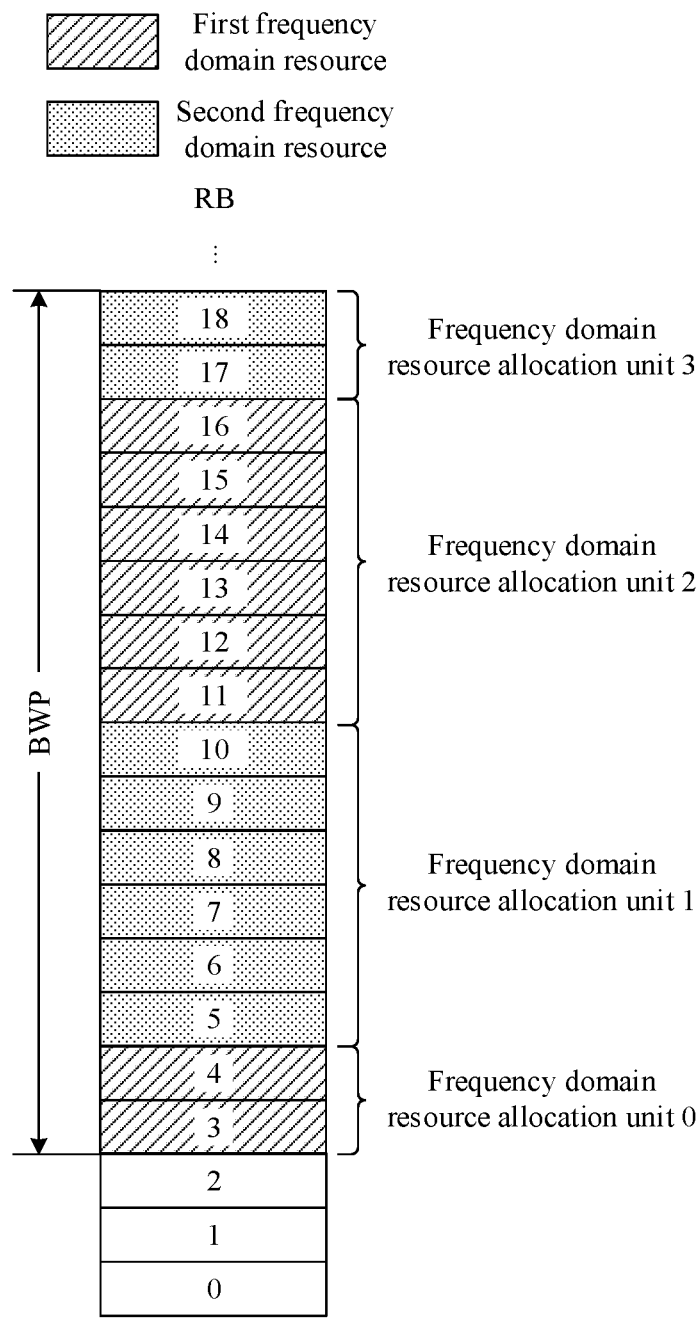

Alternatively, y may not be equal to the PRG size or the RBG size. For example, when PRG size=2 and RBG size=4, y may be equal to 6, 8, or the like. It is assumed that y=6 and M=2. Referring to FIG. 16, six consecutive RBs are one frequency domain resource allocation unit. In this case, in a frequency domain resource allocation unit 0 to a frequency domain resource allocation unit 3, a first frequency domain resource includes the frequency domain resource allocation unit 0 and the frequency domain resource allocation unit 2, and a second frequency domain resource includes a frequency domain resource allocation unit 1 and a frequency domain resource allocation unit 3.

(4) Measurement Subband for Channel Measurement

In this case, a frequency domain resource allocation process may function in a VRB domain, or may function in a PRB domain.

When a frequency domain resource allocation unit is a measurement subband for channel measurement, a frequency domain resource allocation process is similar to a frequency domain resource allocation process in which the frequency domain resource allocation unit is an RBG, a PRG, and y consecutive RBs. For example, if a scenario is that the measurement subband includes four VRBs, an example of frequency domain resource allocation in this scenario may be obtained by replacing the RBG in FIG. 15 with the measurement subband. For details, refer to the foregoing description for understanding. Details are not described again.

A measurement subband for channel measurement may be determined based on a measurement subband configured for latest CSI reporting. When the frequency domain resource allocation unit is the measurement subband, it can be ensured that any measurement subband that has undergone channel measurement feedback is completely allocated to a network device (for example, a TRP), thereby simplifying measurement burden of the terminal device. For example, if different measurement subbands are allocated to different network devices before channel measurement, the terminal device only needs to perform channel measurement for one network device. Otherwise, the terminal device may need to separately perform a plurality of times of channel measurement on all the network devices.

Case 1.1.2: The PRG size is configured as the wideband.

In the case 1.1.2, a frequency domain resource allocation process may function in a VRB domain or may function in a PRB domain.

In the case 1.1.2, a frequency domain resource allocation unit is x consecutive RBs, and frequency domain resource allocation units are obtained through division based on a BWP. For example, based on the example shown in FIG. 12, assuming that M=2, in the three frequency domain resource allocation units in the BWP, a first frequency domain resource includes the frequency domain resource allocation unit 0 and the frequency domain resource allocation unit 2, and a second frequency domain resource includes the frequency domain resource allocation unit 1.

In the case 1.1.2, data on all of one frequency domain resource is precoded by using a same transmit precoding matrix. Correspondingly, for data on PRBs in a same PRG, the terminal device demodulates multi-stream data by using a same channel equalization matrix.

Case 1.2: Type 1

The case 1.2 may be further divided into the following cases 1.2.1 and 1.2.2.

Case 1.2.1: The PRG size is not configured as the wideband.

In this case, there may be the following four types of frequency domain resource allocation units.

(1) PRG

When the frequency domain resource allocation unit is a PRG, a frequency domain resource allocation process is the same as that in the case 1.1.1 in which the frequency domain resource allocation unit is a PRG. Refer to the foregoing description. Details are not described again. In this case, frequency domain interleaving may be performed between VRBs and PRBs, or frequency domain interleaving may not be performed between VRBs and PRBs.

(2) y Consecutive RBs

When the frequency domain resource allocation unit is y consecutive RBs, a frequency domain resource allocation process is the same as that in the case 1.1.1 in which the frequency domain resource allocation unit is y consecutive RBs. Refer to the foregoing description. Details are not described again. In this case, frequency domain interleaving may be performed between VRBs and PRBs, or frequency domain interleaving may not be performed between VRBs and PRBs.

(3) Measurement Subband for Channel Measurement

When the frequency domain resource allocation unit is a measurement subband for channel measurement, a frequency domain resource allocation process is the same as that in the case 1.1.1 in which the frequency domain resource allocation unit is a measurement subband for channel measurement. Refer to the foregoing description. Details are not described again. In this case, frequency domain interleaving may be performed between VRBs and PRBs, or frequency domain interleaving may not be performed between VRBs and PRBs.

(4) Resource Interleaving Unit

In this case, frequency domain interleaving is performed between VRBs and the PRBs. It can be learned from the foregoing description that resource interleaving units may be VRB bundles or PRB bundles.

Figure 17:
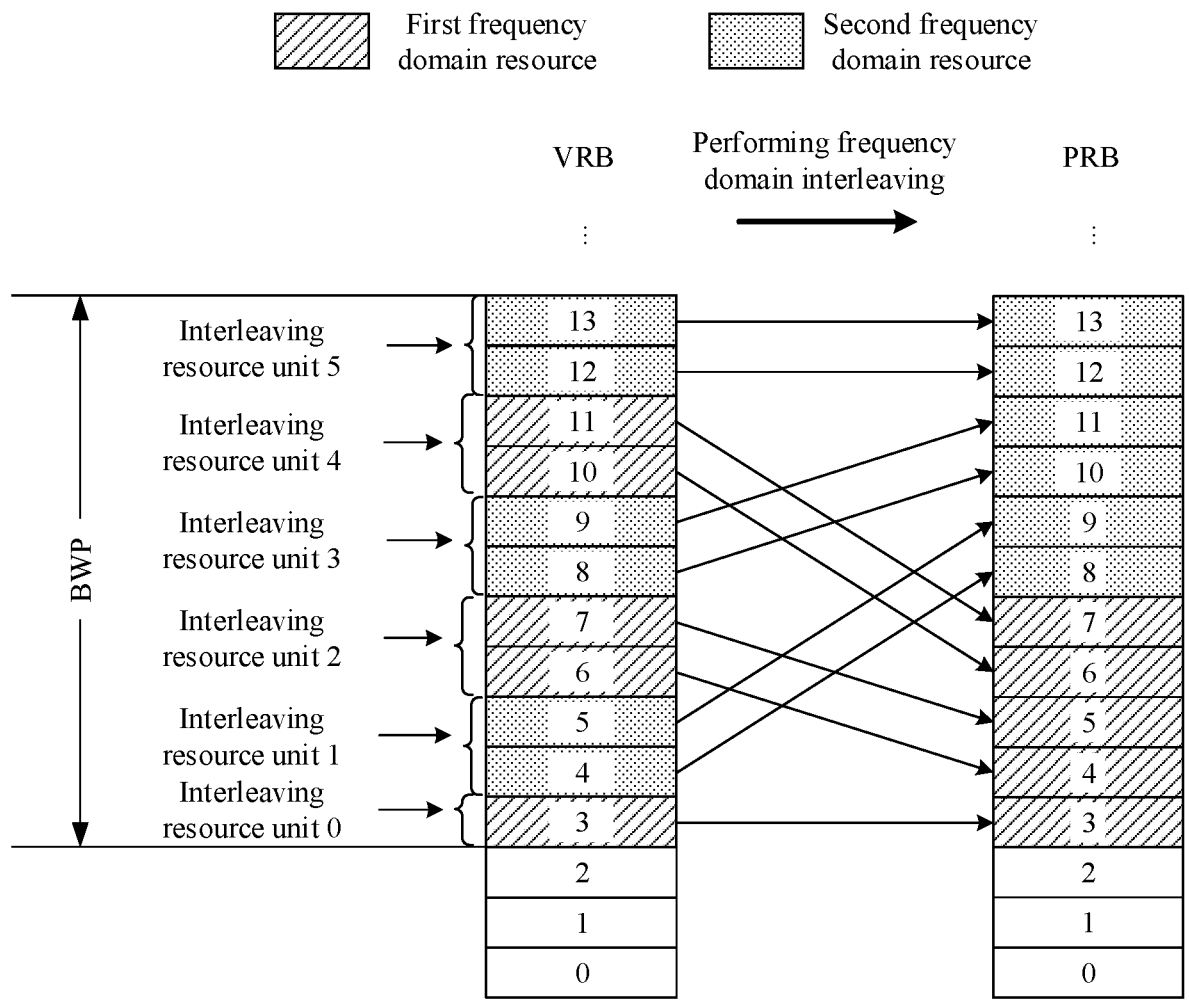
Figure 18:
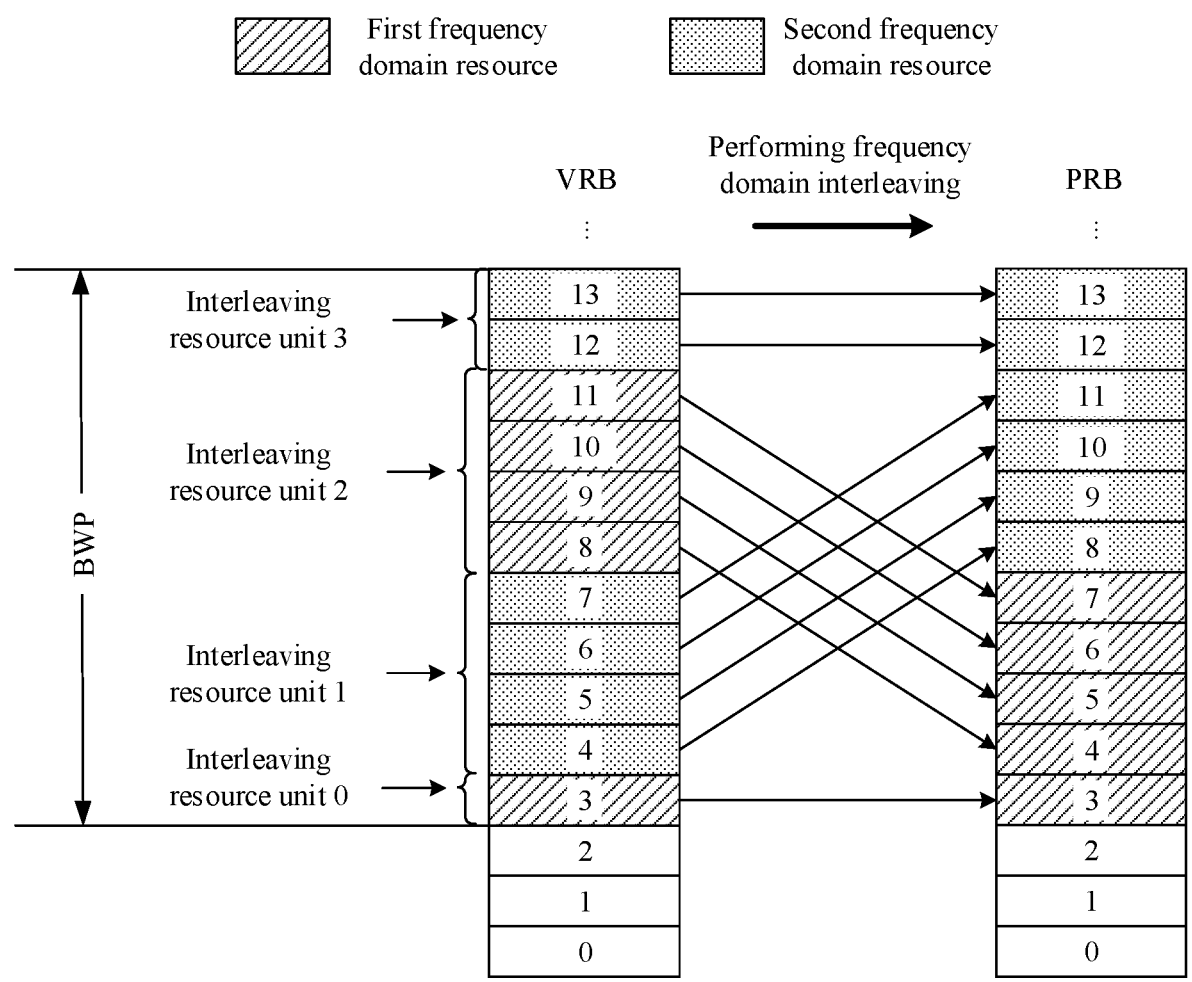

When resource interleaving units are VRB bundles, assuming that bundle size=2 and M=2, referring to FIG. 17, in an interleaving resource unit 0 to an interleaving resource unit 5, a first frequency domain resource includes the interleaving resource unit 0, the interleaving resource unit 2, and the interleaving resource unit 4, and a second frequency domain resource includes the interleaving resource unit 1, the interleaving resource unit 3, and the interleaving resource unit 5. For PRBs to which the interleaving resource units are mapped, refer to FIG. 17. Assuming that bundle size=4 and M=2, referring to FIG. 18, in an interleaving resource unit 0 to an interleaving resource unit 3, a first frequency domain resource includes the interleaving resource unit 0 and the interleaving resource unit 2, and a second frequency domain resource includes the interleaving resource unit 1 and the interleaving resource unit 3. For PRBs to which the interleaving resource units are mapped, refer to FIG. 18.

Figure 19:
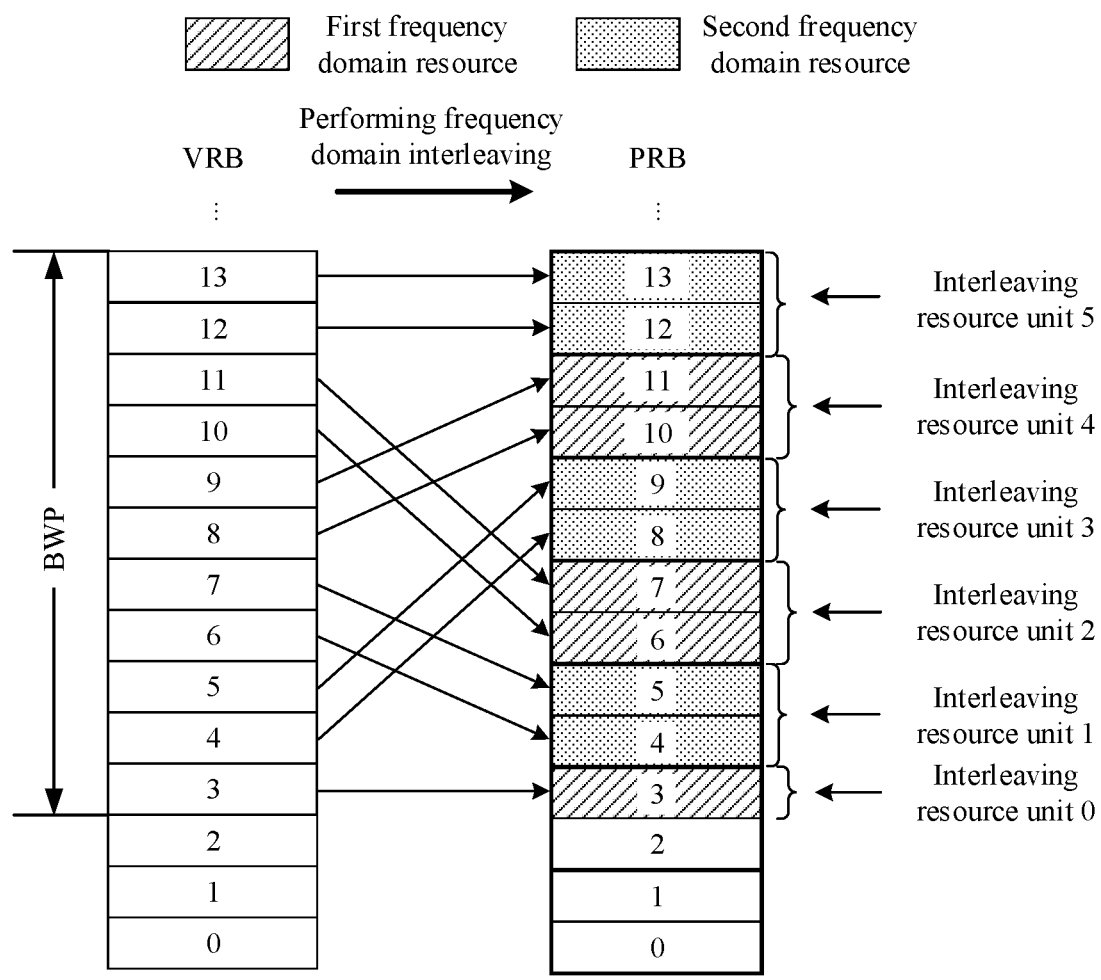
Figure 20:
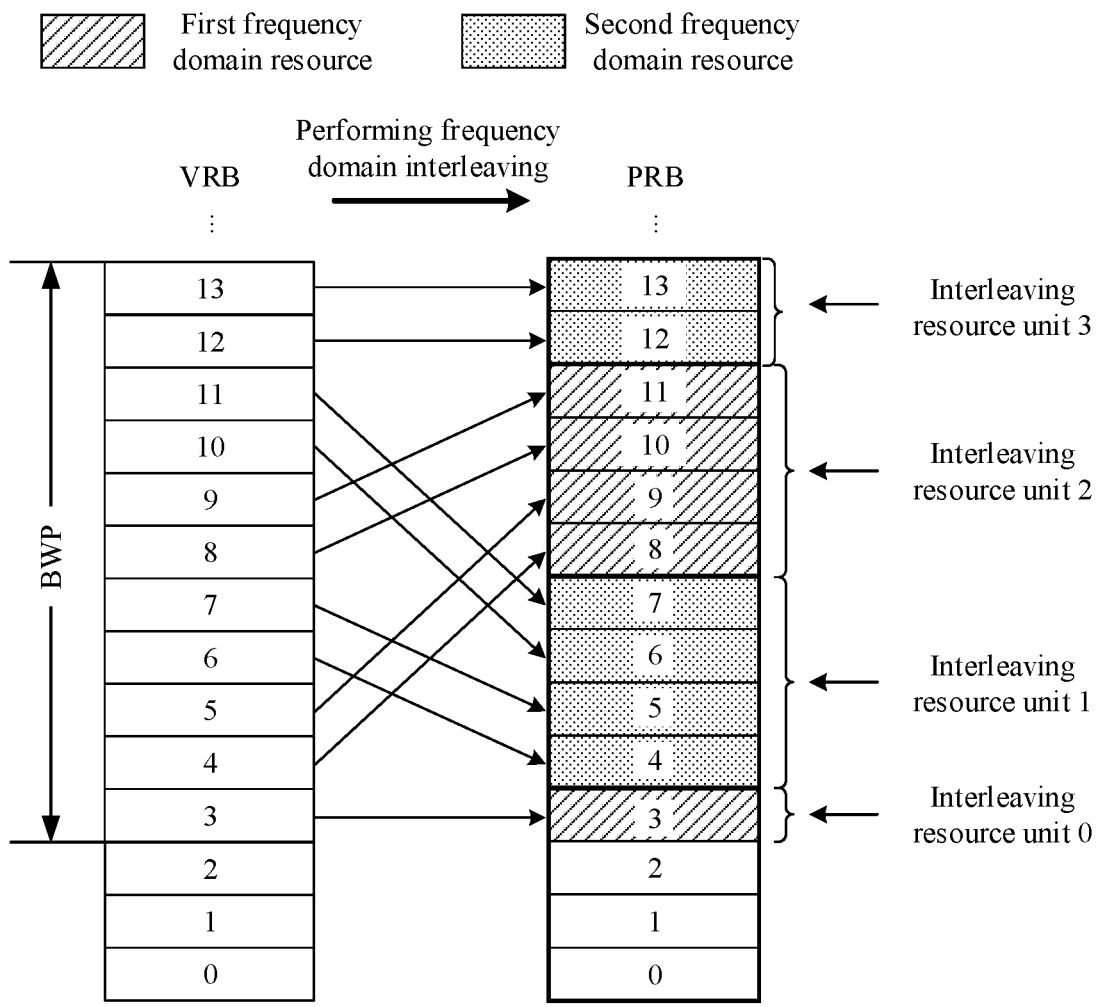

When resource interleaving units are PRB bundles, assuming that bundle size=2 and M=2, referring to FIG. 19, in an interleaving resource unit 0 to an interleaving resource unit 5, a first frequency domain resource includes the interleaving resource unit 0, the interleaving resource unit 2, and the interleaving resource unit 4, and a second frequency domain resource includes the interleaving resource unit 1, the interleaving resource unit 3, and the interleaving resource unit 5. Assuming that bundle size=4 and M=2, referring to FIG. 20, in an interleaving resource unit 0 to an interleaving resource unit 3, a first frequency domain resource includes the interleaving resource unit 0 and the interleaving resource unit 2, and a second frequency domain resource includes the interleaving resource unit 1 and the interleaving resource unit 3.

Case 1.2.2: The PRG size is configured as the wideband.

A frequency domain resource allocation process in the case 1.2.2 is the same as that in the case 1.1.2. Refer to the foregoing description. Details are not described again.

In the case 1, not all frequency domain resources allocated by the first network device or the terminal device are necessarily allocated for data transmission, and a specific frequency domain resource used for data transmission further needs to be indicated by using a bitmap or an RIV in DCI. In this case, network devices (for example, the M network devices) send data on a frequency domain resource that is in the M frequency domain resources and that is allocated for data transmission. Correspondingly, the terminal device receives the data on the frequency domain resource that is in the M frequency domain resources and that is allocated for data transmission. For example, referring to FIG. 15, it is assumed that a frequency domain resource allocated to a TRP 1 is the RBG 0 and the RBG 2, and a frequency domain resource allocated to a TRP 2 is the RBG 1 and the RBG 3. If frequency domain resources that are allocated for data transmission and that are indicated by a bitmap in DCI are the RBG 1 and the RBG 2, for the TRP 1, the TRP 1 may communicate with the terminal device on the RBG 2, and for the TRP 2, the TRP 2 may communicate with the terminal device on the RBG 1. The frequency domain resource allocation method in the case 1 may be understood as pre-allocating frequency domain resources. To be specific, once the terminal device determines BWP bandwidth, the terminal device may determine the M frequency domain resources, and then determine, by using a specific value such as a bitmap or an RIV, frequency domain resources on which data is to be transmitted. An implementation process of the frequency domain resource allocation method is relatively simple, and complexity is relatively low.

Case 2: The predetermined bandwidth is the system bandwidth.

When the predetermined bandwidth is the system bandwidth, the frequency domain resource allocation method may be the method in the BWP, provided that a corresponding parameter of the BWP is replaced with a corresponding parameter of the system bandwidth. For example, when a quantity of frequency domain resource allocation units in the system bandwidth is calculated, a quantity of RBs in the BWP is replaced with a quantity of RBs in the system bandwidth, and the number of the start RB in the BWP in the system bandwidth is replaced with a number of a start RB in the system bandwidth. Therefore, for a resource allocation process in the case 2, refer to the case 1 for understanding. Details are not described again.

Case 3: The predetermined bandwidth is the scheduled bandwidth.

The scheduled bandwidth is bandwidth including a frequency domain resource that is scheduled for the terminal device and that is used for data transmission. In the case 3, frequency domain resource allocation may be based on all frequency domain resources in the scheduled bandwidth. To be specific, frequency domain resource allocation starts from the first frequency domain resource allocation unit in the scheduled bandwidth and ends at the last frequency domain resource allocation unit in the scheduled bandwidth.

When frequency domain resource allocation types are different, determining of the scheduled bandwidth is also different. The following describes frequency domain resource allocation processes corresponding to the different frequency domain resource allocation types by using a case 3.1 (where a frequency domain resource allocation type is type 0) and a case 3.2 (where a frequency domain resource allocation type is type 1) as examples.

Case 3.1: Type 0.

Figure 21:
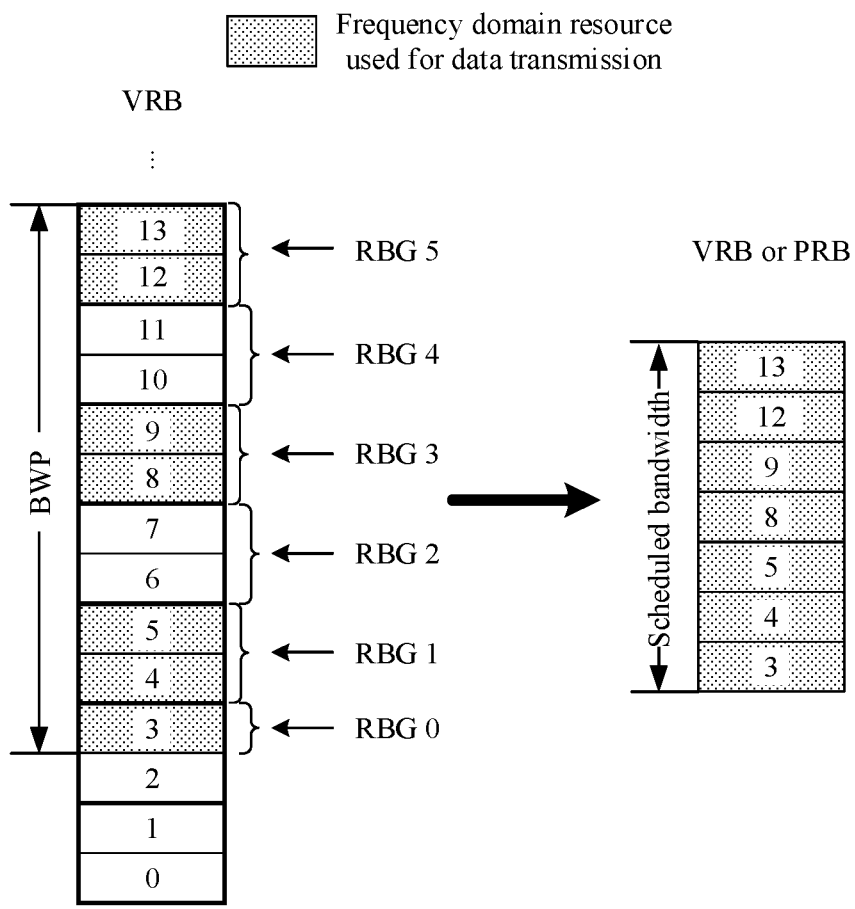
FIG. 21 is a schematic diagram of scheduled bandwidth when a frequency domain resource allocation type is type 0 according to an embodiment of this application.

In the case 3.1, the scheduled bandwidth is bandwidth including a VRB that is indicated by using a bitmap and that is used for data transmission or bandwidth including a PRB to which a VRB that is indicated by using a bitmap and that is used for data transmission is mapped. The VRB that is indicated by using the bitmap and that is used for data transmission includes at least one RBG. For example, referring to FIG. 21, if a bitmap includes six bits, the six bits are respectively used to indicate whether an RBG 0 to an RBG 5 are allocated for data transmission. If that one bit is set to 1 indicates that a corresponding RBG is allocated for data transmission, and a value of the six bits is 110101, the RBG 0, the RBG 1, the RBG 3, and the RBG 5 are allocated for data transmission. In this case, the scheduled bandwidth is bandwidth including RBs, namely, an RB 3, an RB 4, an RB 5, an RB 8, an RB 9, an RB 12, and an RB 13, corresponding to the RBG 0, the RBG 1, the RBG 3, and the RBG 5.

When the PRG size is not configured as the wideband, a frequency domain resource allocation unit may be an RBG, a PRG, y consecutive RBs, or a measurement subband for channel measurement. Similar to RBGs, frequency domain resource allocation units are also obtained through division based on system bandwidth. A quantity of frequency domain resource allocation units in the scheduled bandwidth and sizes of the frequency domain resource allocation units are calculated by using a method similar to the method for calculating the quantity of frequency domain resource allocation units in the BWP and the sizes of the frequency domain resource allocation units, provided that a value of Q is set to a size of the frequency domain resource allocation unit in this scenario, a quantity of RBs in the BWP is replaced with a quantity of RBs in the scheduled bandwidth, and the number of the start RB in the BWP in the system bandwidth is replaced with a number of a start RB in the scheduled bandwidth in the system bandwidth. For example, based on the scheduled bandwidth shown in FIG. 21, referring to FIG. 22, if a size of a frequency domain resource allocation unit is 2, there are four frequency domain resource allocation units in the scheduled bandwidth.

When the PRG size is configured as the wideband, x is $$\left\lceil \frac{W}{M} \right\rceil,$$

and W is a quantity of RBs included in the scheduled bandwidth of the terminal device. In this case, a frequency domain resource allocation unit may be x consecutive RBs. In other words, when an RB is a PRB, and the PRG size is the wideband, the M frequency domain resources are determined by using $$\left\lceil \frac{W}{M} \right\rceil$$

PRBs as the frequency domain resource allocation unit.

Specifically, when the PRG size is the wideband, the $m^{th}$ frequency domain resource in the M frequency domain resources includes a $$\left(\left\lceil \frac{W}{M} \right\rceil (m-1) + 1\right)^{th}$$

PRB to a $$\left(\left\lceil \frac{W}{M} \right\rceil m\right)^{th}$$

PRB in the scheduled bandwidth, and an $M^{th}$ frequency domain resource in the M frequency domain resources includes a remaining PRB in the scheduled bandwidth, where m is an integer greater than 0 and less than M.

$$\left\lceil \frac{W}{M} \right\rceil (m-1) \text{ is } \left\lceil \frac{W}{M} \right\rceil *(m-1), \text{ and } \left\lceil \frac{W}{M} \right\rceil m$$

refers to $$\left\lceil \frac{W}{M} \right\rceil *m.$$

Figure 23:
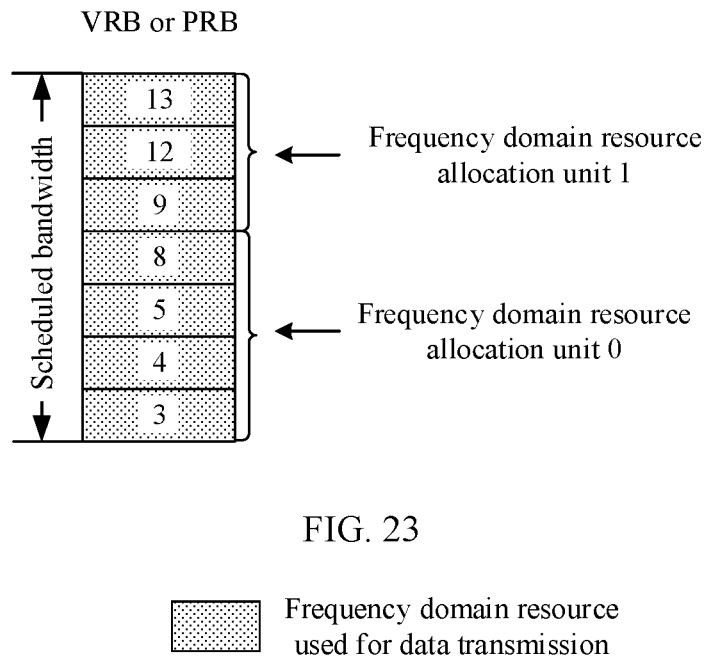

In this case, frequency domain resource allocation units are obtained through division based on the scheduled bandwidth. Starting from a start RB in the scheduled bandwidth, every x consecutive RBs are a frequency domain resource allocation unit. Because W is not necessarily an integer multiple of M, a size of the last frequency domain resource allocation unit may be less than x. For example, based on the scheduled bandwidth shown in FIG. 21, if M=2, x=4. Referring to FIG. 23, the scheduled bandwidth may include two frequency domain resource allocation units. A size of a frequency domain resource allocation unit 0 is 4, and a size of a frequency domain resource allocation unit 1 is 3.

In a case 3.1, the frequency domain resource allocation method may be as follows: The terminal device determines an $m^{th}$ frequency domain resource in the M frequency domain resources, where the $m^{th}$ frequency domain resource includes an $(Mi+m)^{th}$ frequency domain resource allocation unit in N frequency domain resource allocation units included in the scheduled bandwidth of the terminal device. Correspondingly, the first network device allocates the $(Mi+n)^{th}$ frequency domain resource allocation unit in the N frequency domain resource allocation units included in the scheduled bandwidth of the terminal device to the $m^{th}$ frequency domain resource in the M frequency domain resources. N is a positive integer, m is an integer greater than 0 and less than or equal to M, and i=0, 1, . . . , or $$\left\lceil \frac{N}{M} \right\rceil - 1.$$

In this alternate frequency domain resource allocation method, a plurality of frequency domain resources can be discretely distributed on the scheduled bandwidth as much as possible, to obtain a better frequency domain diversity gain.

Figure 22:
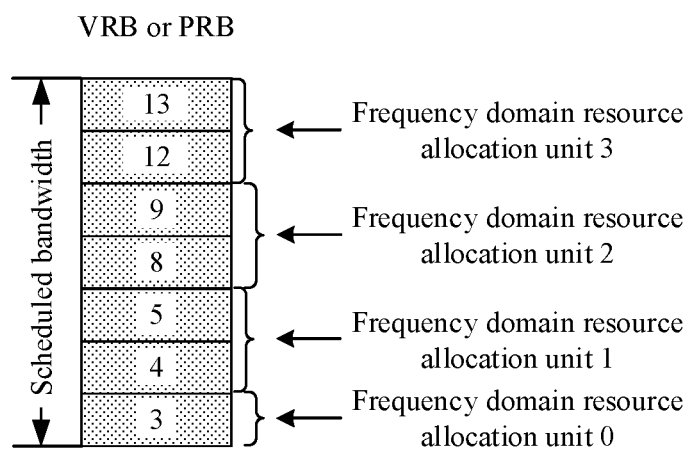
FIG. 22 and FIG. 23 each are a schematic diagram of distribution of frequency domain resource allocation units in scheduled bandwidth when a frequency domain resource allocation type is type 0 according to an embodiment of this application.

For example, based on the scheduled bandwidth shown in FIG. 22, the four frequency domain resource allocation units are included. If M=2, in the four frequency domain resource allocation units, a frequency domain resource allocation unit 0 and a frequency domain resource allocation unit 2 are a first frequency domain resource, and a frequency domain resource allocation unit 1 and a frequency domain resource allocation unit 3 are a second frequency domain resource.

The case 3.1 may be further divided into the following cases 3.1.1 and 3.1.2.

Case 3.1.1: The PRG size is not configured as the wideband.

In the case 3.1.1, a frequency domain resource allocation unit may be a PRG, an RBG, y consecutive RBs, or a measurement subband for channel measurement. A specific frequency domain resource allocation process is similar to that in the case 1.1.1, and a difference lies only in that the frequency domain resource allocation process herein functions in the scheduled bandwidth, but the frequency domain resource allocation process in the case 1.1.1 functions in the BWP. For details, refer to the case 1.1.1 for understanding. Details are not described again.

Case 3.1.2: The PRG size is configured as the wideband.

In the case 3.1.2, a frequency domain resource allocation unit is x consecutive RBs, and frequency domain resource allocation units are obtained through division based on scheduled bandwidth. A specific frequency domain resource allocation process is similar to that in the case 1.1.2, and a difference lies only in that the frequency domain resource allocation process herein functions in the scheduled bandwidth, but the frequency domain resource allocation process in the case 1.1.2 functions in the BWP. For details, refer to the case 1.1.2 for understanding. Details are not described again.

Case 3.2: Type 1

The case 3.2 may be further divided into cases 3.2.1 and 3.2.2.

Case 3.2.1: The scheduled bandwidth is bandwidth including consecutive VRBs indicated by an RIV.

In the case 3.2.1, frequency domain interleaving may be performed between VRBs and PRBs, or frequency domain interleaving may not be performed between VRBs and PRBs.

Figure 24:
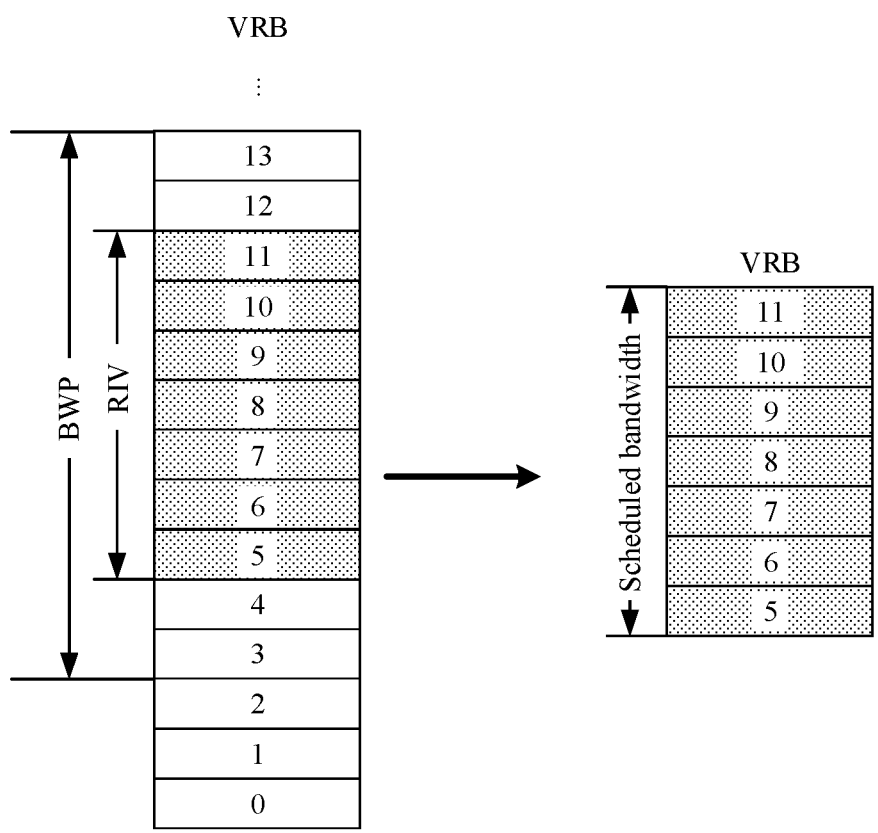
FIG. 24 is a schematic diagram of scheduled bandwidth when a frequency domain resource allocation type is type 1 according to an embodiment of this application.

For example, referring to FIG. 24, if frequency domain resources indicated by RIV are a VRB 5 to a VRB 11, the scheduled bandwidth is bandwidth including the VRB 5 to the VRB 11.

When the PRG size is not configured as the wideband, frequency domain resource allocation units may be VRB bundles (when frequency domain interleaving is performed between VRBs and PRBs), y consecutive VRBs, or a measurement subband for channel measurement (where an RB included in the measurement subband is a VRB). Similar to RBGs, frequency domain resource allocation units are also obtained through division based on system bandwidth. For a method for calculating a quantity of frequency domain resource allocation units in the scheduled bandwidth and sizes of the frequency domain resource allocation units, refer to the method for calculating the quantity of frequency domain resource allocation units in the BWP and the sizes of the frequency domain resource allocation units, provided that a value of Q is set to a size of the frequency domain resource allocation unit in this scenario, a quantity of RBs in the BWP is replaced with a quantity of VRBs in the scheduled bandwidth, and the number of the start RB in the BWP in the system bandwidth is replaced with a number of a start VRB in the scheduled bandwidth in the system bandwidth. For example, based on the scheduled bandwidth shown in FIG. 24, referring to FIG. 25, if a size of a frequency domain resource allocation unit is 2, there are four frequency domain resource allocation units in the scheduled bandwidth.

When the PRG size is configured as the wideband, x is $$\left\lceil \frac{W}{M} \right\rceil,$$

and W is a quantity of VRBs included in the scheduled bandwidth of the terminal device. In this case, a frequency domain resource allocation unit may be x consecutive VRBs. In other words, when an RB is a PRB, and the PRG size is the wideband, the M frequency domain resources are determined by using $$\left\lceil \frac{W}{M} \right\rceil$$

PRBs as the frequency domain resource allocation unit.

Specifically, when the PRG size is the wideband, the $m^{th}$ frequency domain resource in the M frequency domain resources includes a $$\left(\left\lceil \frac{W}{M} \right\rceil (m-1) + 1\right)^{th}$$

PRB to a $$\left(\left\lceil \frac{W}{M} \right\rceil m\right)^{th}$$

PRE in the scheduled bandwidth, and an Mt' frequency domain resource in the M frequency domain resources includes a remaining PRB in the scheduled bandwidth, where m is an integer greater than 0 and less than M.

$$\left\lceil \frac{W}{M} \right\rceil (m-1) \text{ is } \left\lceil \frac{W}{M} \right\rceil * (m-1), \text{ and } \left\lceil \frac{W}{M} \right\rceil m$$

refers to $$\left\lceil \frac{W}{M} \right\rceil * m.$$

Figure 26:
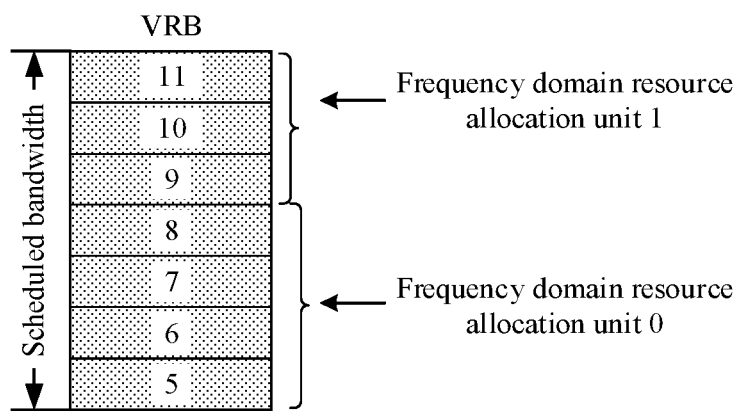

In this case, frequency domain resource allocation units are obtained through division based on the scheduled bandwidth. Starting from a start VRB in the scheduled bandwidth, every x consecutive VRBs are a frequency domain resource allocation unit. Because W is not necessarily an integer multiple of M, a size of the last frequency domain resource allocation unit may be less than x. For example, based on the scheduled bandwidth shown in FIG. 24, if M=2, x=4. Referring to FIG. 26, the scheduled bandwidth may include two frequency domain resource allocation units. A size of a frequency domain resource allocation unit 0 is 4, and a size of a frequency domain resource allocation unit 1 is 3.

In a case 3.2.1, the frequency domain resource allocation method may be as follows: The terminal device determines an $m^{th}$ frequency domain resource in the M frequency domain resources, where the $m^{th}$ frequency domain resource includes an $(Mi+m)^{th}$ frequency domain resource allocation unit in N frequency domain resource allocation units included in the scheduled bandwidth of the terminal device. Correspondingly, the first network device allocates the $(Mi+m)^{th}$ frequency domain resource allocation unit in the N frequency domain resource allocation units included in the scheduled bandwidth of the terminal device to the $m^{th}$ frequency domain resource in the M frequency domain resources. N is a positive integer, m is an integer greater than 0 and less than or equal to M, and i=0, 1, . . . , or $$\left\lceil \frac{N}{M} \right\rceil - 1.$$

In this alternate frequency domain resource allocation method, a plurality of frequency domain resources can be discretely distributed on the scheduled bandwidth as much as possible, to obtain a better frequency domain diversity gain.

Figure 25:
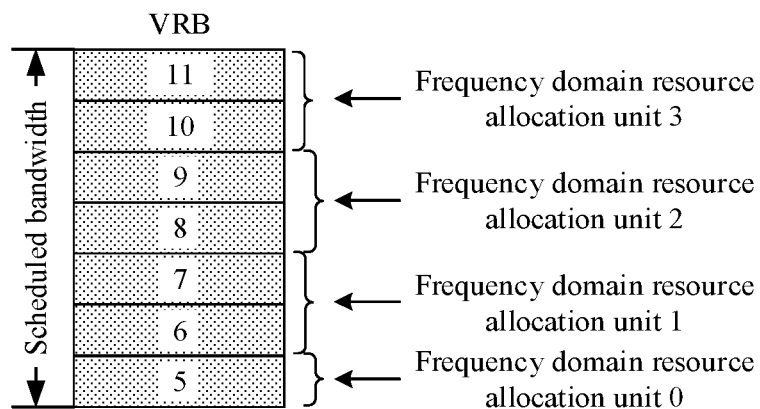
FIG. 25 and FIG. 26 each are a schematic diagram of distribution of frequency domain resource allocation units in scheduled bandwidth when a frequency domain resource allocation type is type 1 according to an embodiment of this application.

For example, based on the scheduled bandwidth shown in FIG. 25, the four frequency domain resource allocation units are included. If M=2, in the four frequency domain resource allocation units, a frequency domain resource allocation unit 0 and a frequency domain resource allocation unit 2 are a first frequency domain resource, and a frequency domain resource allocation unit 1 and a frequency domain resource allocation unit 3 are a second frequency domain resource.

When the PRG size is not configured as the wideband, frequency domain resource allocation units may be VRB bundles (when frequency domain interleaving is performed between VRBs and PRBs), y consecutive VRBs, or a measurement subband for channel measurement (where an RB included in the measurement subband is a VRB). A specific frequency domain resource allocation process is similar to the process of performing frequency domain resource allocation in the VRB domain in the case 1.2.1, and a difference lies only in that the frequency domain resource allocation process herein functions in the scheduled bandwidth, but the frequency domain resource allocation process in the case 1.2.1 functions in the BWP. For details, refer to the case 1.2.1 for understanding. Details are not described again.

When the PRG size is configured as the wideband, a frequency domain resource allocation unit is x consecutive VRBs, and frequency domain resource allocation units are obtained through division based on scheduled bandwidth. A specific frequency domain resource allocation process is similar to the process of performing frequency domain resource allocation in the VRB domain in the case 1.2.2, and a difference lies only in that the frequency domain resource allocation process herein functions in the scheduled bandwidth, but the frequency domain resource allocation process in the case 1.2.2 functions in the BWP. For details, refer to the case 1.2.2 for understanding. Details are not described again.

Case 3.2.2: The scheduled bandwidth is bandwidth including PRBs to which consecutive VRBs indicated by using an RIV are mapped.

In the case 3.2.2, frequency domain interleaving may be performed between VRBs and PRBs, or frequency domain interleaving may not be performed between VRBs and PRBs. When frequency domain interleaving is not performed, a frequency domain resource allocation unit may be a PRG, y consecutive PRBs, or a measurement subband for channel measurement (where an RB included in the measurement subband is a PRB). In this case, a quantity of frequency domain resource allocation units, a size of each frequency domain resource allocation unit, and a frequency domain resource allocation process are similar to the process of performing frequency domain resource allocation in the PRB domain in the case 1.2. A difference lies only in that the frequency domain resource allocation process herein functions in the scheduled bandwidth, but the frequency domain resource allocation process in the case 1.2 functions in the BWP. For details, refer to the case 1.2 for understanding. Specifically, when the PRG size is not configured as the wideband, refer to the case 1.2.1 for understanding. When the PRG size is configured as the wideband, refer to the case 1.2.2 for understanding. Details are not described again.

Figure 27:
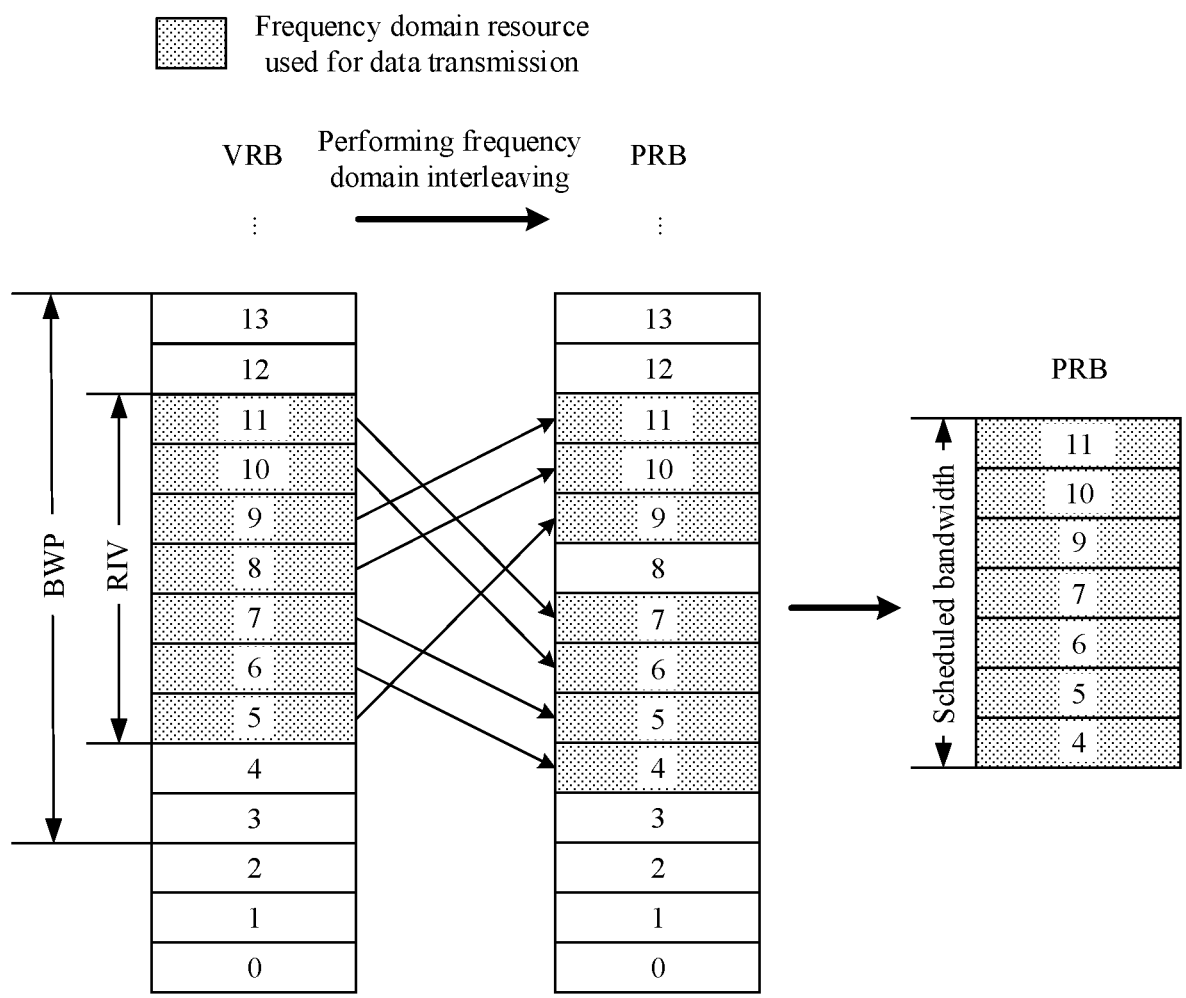
FIG. 27 is another schematic diagram of scheduled bandwidth when a frequency domain resource allocation type is type 1 according to an embodiment of this application.

This part mainly describes a frequency domain resource allocation method used when frequency domain interleaving is performed between VRBs and PRBs. When frequency domain interleaving is performed, for example, referring to FIG. 27, frequency domain resources indicated by using an RIV are a VRB 5 to a VRB 11, and PRBs to which the VRB 5 to the VRB 11 are mapped are respectively a PRB 4, a PRB 5, a PRB 6, a PRB 7, a PRB 9, a PRB 10, and a PRB 11. In this case, the scheduled bandwidth is bandwidth including the PRB 4, the PRB 5, the PRB 6, the PRB 7, the PRB 9, the PRB 10, and the PRB 11.

When the PRG size is not configured as the wideband, a frequency domain resource allocation unit may be a PRG, PRB bundles, y consecutive PRBs, or a measurement subband for channel measurement (where an RB included in the measurement subband is a PRB). In this case, a quantity of frequency domain resource allocation units in the scheduled bandwidth is $$\left\lceil \frac{\text{Quantity of } PRBs \text{ included in scheduled bandwidth}}{\text{Size of a frequency domain resource allocation unit}} \right\rceil.$$

When frequency domain interleaving is performed between VRBs and PRBs, if a quantity of VRBs included in the first VRB bundle is less than a bundle size, for example, bundle size=2, when the first VRB bundle includes only one VRB, a quantity of PRBs included in a frequency domain resource allocation unit including a PRB bundle to which the first VRB bundle is mapped is less than a size of the frequency domain resource allocation unit. The same rule applies to the last VRB bundle. For example, referring to FIG. 28, bundle size=2. The first VRB bundle includes only a VRB 5, and the VRB 5 is mapped to a PRB 9. If a size of a frequency domain resource allocation unit is 2, a frequency domain resource allocation unit 2 includes only one PRB (namely, a PRB 9). Each of other frequency domain resource allocation units includes two PRBs. If a size of a frequency domain resource allocation unit is 4, a frequency domain resource allocation unit 1 includes only three PRBs, and the other frequency domain resource allocation units include four PRBs. If both a quantity of VRBs included in the first VRB bundle and a quantity of VRBs included in the last VRB bundle are equal to the bundle size, a quantity of PRBs included in each frequency domain resource allocation unit is equal to a size of the frequency domain resource allocation unit.

When the PRG size is configured as the wideband, x is $$\left\lceil \frac{W}{M} \right\rceil,$$

and W is a quantity of PRBs included in the scheduled bandwidth of the terminal device. In this case, the frequency domain resource allocation unit may be x consecutive PRBs. In other words, when an RB is a PRB, and the PRG size is the wideband, the M frequency domain resources are determined by using $$\left\lceil \frac{W}{M} \right\rceil$$

PRBs as the frequency domain resource allocation unit.

Specifically, when the PRG size is the wideband, the $m^{th}$ frequency domain resource in the M frequency domain resources includes a $$\left( \left\lceil \frac{W}{M} \right\rceil (m-1) + 1 \right)^{th}$$

PRB to a $$\left( \left\lceil \frac{W}{M} \right\rceil m \right)^{th}$$

PRB in the scheduled bandwidth, and an Mt' frequency domain resource in the M frequency domain resources includes a remaining PRB in the scheduled bandwidth, where m is an integer greater than 0 and less than M.

$$\left\lceil \frac{W}{M} \right\rceil (m-1) \text{ is } \left\lceil \frac{W}{M} \right\rceil * (m-1), \text{ and } \left\lceil \frac{W}{M} \right\rceil m$$

refers to $$\left\lceil \frac{W}{M} \right\rceil * m.$$

In this case, frequency domain resource allocation units are obtained through division based on the scheduled bandwidth. Starting from a start PRB in the scheduled bandwidth, every x consecutive PRBs are a frequency domain resource allocation unit. Because W is not necessarily an integer multiple of M, a size of the last frequency domain resource allocation unit may be less than x. For example, based on the scheduled bandwidth shown in FIG. 28, if M=2, x=4. Referring to FIG. 29, the scheduled bandwidth may include two frequency domain resource allocation units. A size of a frequency domain resource allocation unit 0 is 4, and a size of a frequency domain resource allocation unit 1 is 3.

In a case 3.2.2, the frequency domain resource allocation method may be as follows: The terminal device determines an $m^{th}$ frequency domain resource in the M frequency domain resources, where the $m^{th}$ frequency domain resource includes an $(Mi+m)^{th}$ frequency domain resource allocation unit in N frequency domain resource allocation units included in the scheduled bandwidth of the terminal device. Correspondingly, the first network device allocates the $(Mi+m)^{th}$ frequency domain resource allocation unit in the N frequency domain resource allocation units included in the scheduled bandwidth of the terminal device to the $m^{th}$ frequency domain resource in the M frequency domain resources. N is a positive integer, m is an integer greater than 0 and less than or equal to M, and $i=0, 1, \ldots,$ or $$\left\lceil \frac{N}{M} \right\rceil - 1;$$

In this alternate frequency domain resource allocation method, a plurality of frequency domain resources can be discretely distributed on the scheduled bandwidth as much as possible, to obtain a better frequency domain diversity gain.

Figure 28:
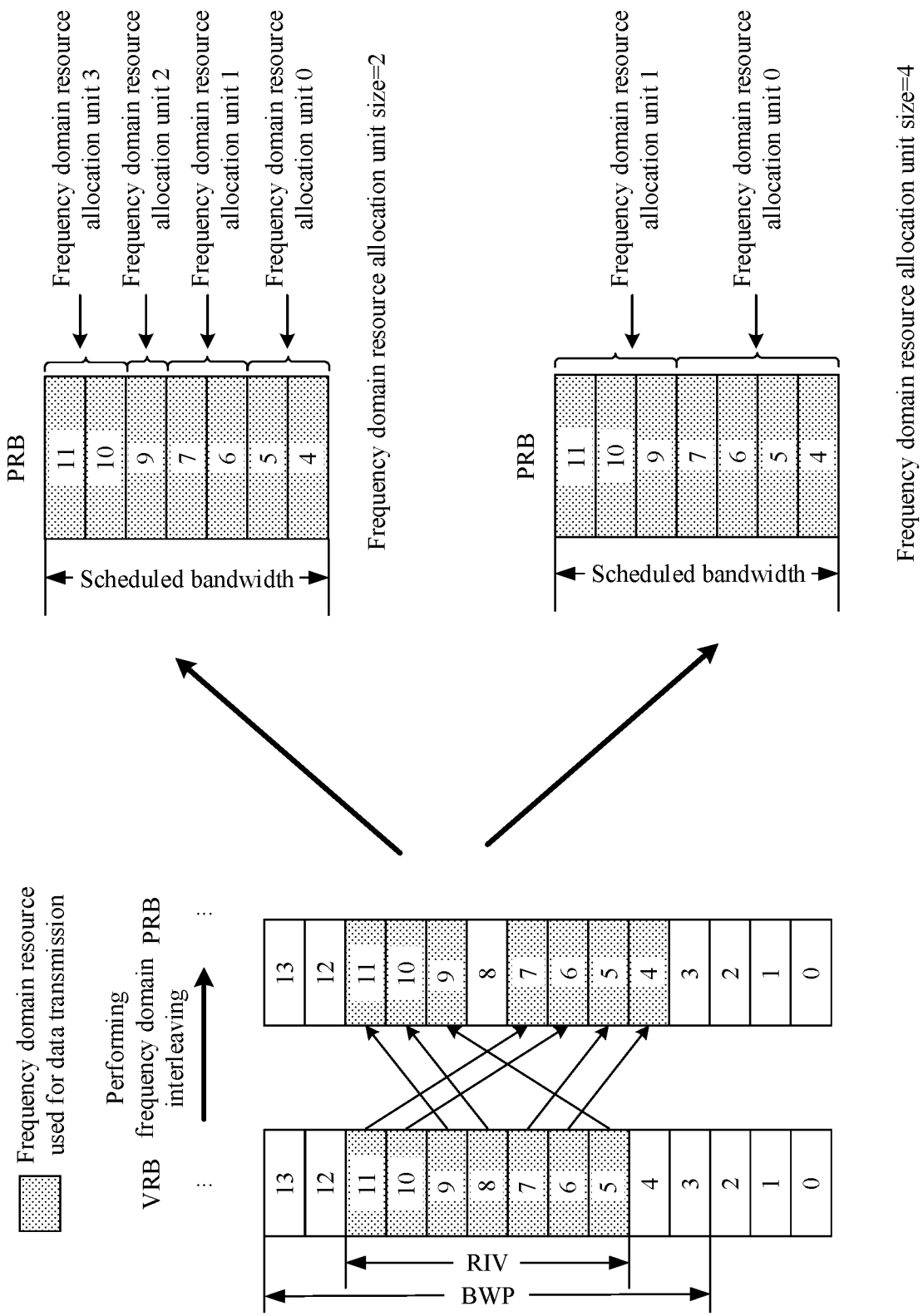
FIG. 28 and FIG. 29 each are another schematic diagram of distribution of frequency domain resource allocation units in scheduled bandwidth when a frequency domain resource allocation type is type 1 according to an embodiment of this application.
Figure 29:
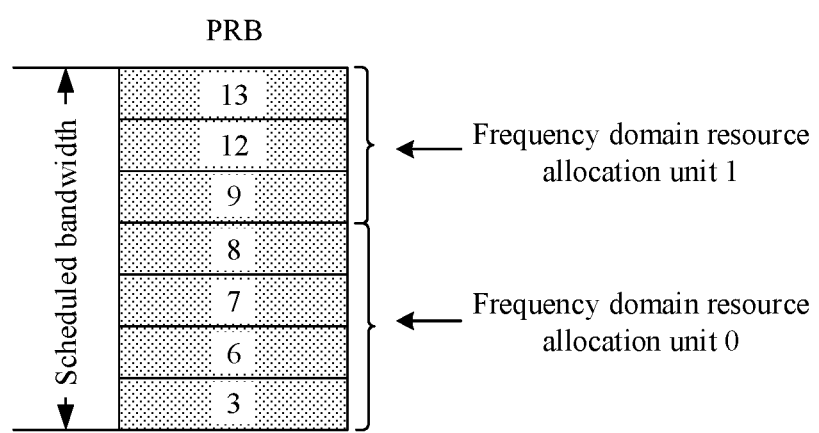

For example, based on the scheduled bandwidth shown in FIG. 28, if the size of the frequency domain resource allocation unit is 2, the scheduled bandwidth includes four frequency domain resource allocation units. If M=2, in the four frequency domain resource allocation units, a frequency domain resource allocation unit 0 and a frequency domain resource allocation unit 2 are a first frequency domain resource, and a frequency domain resource allocation unit 1 and a frequency domain resource allocation unit 3 are a second frequency domain resource.

When the PRG size is not configured as the wideband, a frequency domain resource allocation unit may be a PRG, PRB bundles, y consecutive PRBs, or a measurement subband for channel measurement (where an RB included in the measurement subband is a PRB). A specific frequency domain resource allocation process is similar to the process of performing frequency domain resource allocation in the PRB domain in the case 1.2.1, and a difference lies only in that the frequency domain resource allocation process herein functions in the scheduled bandwidth, but the frequency domain resource allocation process in the case 1.2.1 functions in the BWP. For details, refer to the case 1.2.1 for understanding. Details are not described again.

When the PRG size is configured as the wideband, a frequency domain resource allocation unit is x consecutive PRBs, and frequency domain resource allocation units are obtained through division based on scheduled bandwidth. A specific frequency domain resource allocation process is similar to that in the case 1.2.2, and a difference lies only in that the frequency domain resource allocation process herein functions in the scheduled bandwidth, but the frequency domain resource allocation process in the case 1.2.2 functions in the BWP. For details, refer to the case 1.2.2 for understanding. Details are not described again.

In the case 3, the M frequency domain resources allocated by the first network device or the terminal device are frequency domain resources used for data transmission. In this case, network devices (for example, the M network devices) send data on the M frequency domain resources. Correspondingly, the terminal device receives the data on the M frequency domain resources.

In the foregoing embodiments, when the predetermined bandwidth is the BWP or the system bandwidth, although an implementation process of the resource allocation method in the foregoing case 1 is simple, all frequency domain resources actually used for data transmission may exactly belong to a same frequency domain resource. For example, referring to FIG. 15, if a value of a bitmap is 1010, and that one bit is set to 1 indicates that a corresponding RBG is allocated for data transmission, an RBG 0 and an RBG 2 are allocated for data transmission, and the RBG 0 and the RBG 2 belong to a same frequency domain resource. This means that only one TRP can communicate with the terminal device. When the predetermined bandwidth is the scheduled bandwidth, because in the resource allocation method in the case 3, frequency domain resource allocation is performed by using an alternate allocation rule on a frequency domain resource used for data transmission, frequency domain resources allocated to all TRPs are approximately equal. Therefore, it can be ensured that each TRP that communicates with the terminal device has an available resource.

According to the method provided in this embodiment of this application, PRBs in a same PRG can be prevented from being allocated to different TRPs. That is, it is ensured that data on the PRBs in the same PRG is precoded by using a same transmit precoding matrix, to be consistent with a related stipulation (to be specific, the data on the PRBs in the PRG needs to be precoded by using the same transmit precoding matrix) in a communications protocol. In addition, for the data on the PRBs in the same PRG, the terminal device may demodulate multi-stream data by using a same channel equalization matrix, to ensure signal received quality of the terminal device.

Before the terminal device and the first network device perform frequency domain resource allocation, a frequency domain resource allocation unit needs to be first determined. The frequency domain resource allocation unit may be preset, predefined, or specified in a protocol, or may be determined in the following manner 1 or manner 2.

Manner 1: The frequency domain resource allocation unit is indicated by using signaling.

The signaling may be higher layer signaling (for example, RRC signaling or MAC CE signaling) or dynamic signaling (for example, DCI).

For example, the signaling may be used to indicate, by using a plurality of bits, that the frequency domain resource allocation unit is one of an RBG, a PRG, an interleaving resource unit, or a measurement subband for channel measurement.

For another example, the signaling may be used to indicate, by using one or more bits, whether the frequency domain resource allocation unit is a VRB or a PRB. Further, if a minimum granularity of the frequency domain resource allocation unit is preset by a system, for example, when the system presets that x=2 or when the system presets that the minimum granularity of the frequency domain resource allocation unit is a PRG (where in this case, x=PRG size), one or more bits may be further used to indicate a value of k, to calculate a value of y, where y=k*x.

The manner 1 enables the terminal device to flexibly switch a frequency domain resource allocation unit based on an indication.

Manner 2: A granularity of the frequency domain resource allocation unit corresponds to a transmission scheme.

The transmission scheme may be a first transmission scheme or a second transmission scheme. For descriptions of the first transmission scheme and the second transmission method, refer to the foregoing descriptions. Details are not described herein again. In different transmission schemes, frequency domain resource allocation units may be different. The following separately provides descriptions by using a first case and a second case.

First Case:

In the first transmission scheme, the frequency domain resource allocation unit is the RBG.

In the second transmission scheme, the frequency domain resource allocation unit is the PRG.

Optionally, in the first case, a frequency domain resource allocation type may be type 0, and the predetermined bandwidth is the BWP or the system bandwidth.

Figure 30:
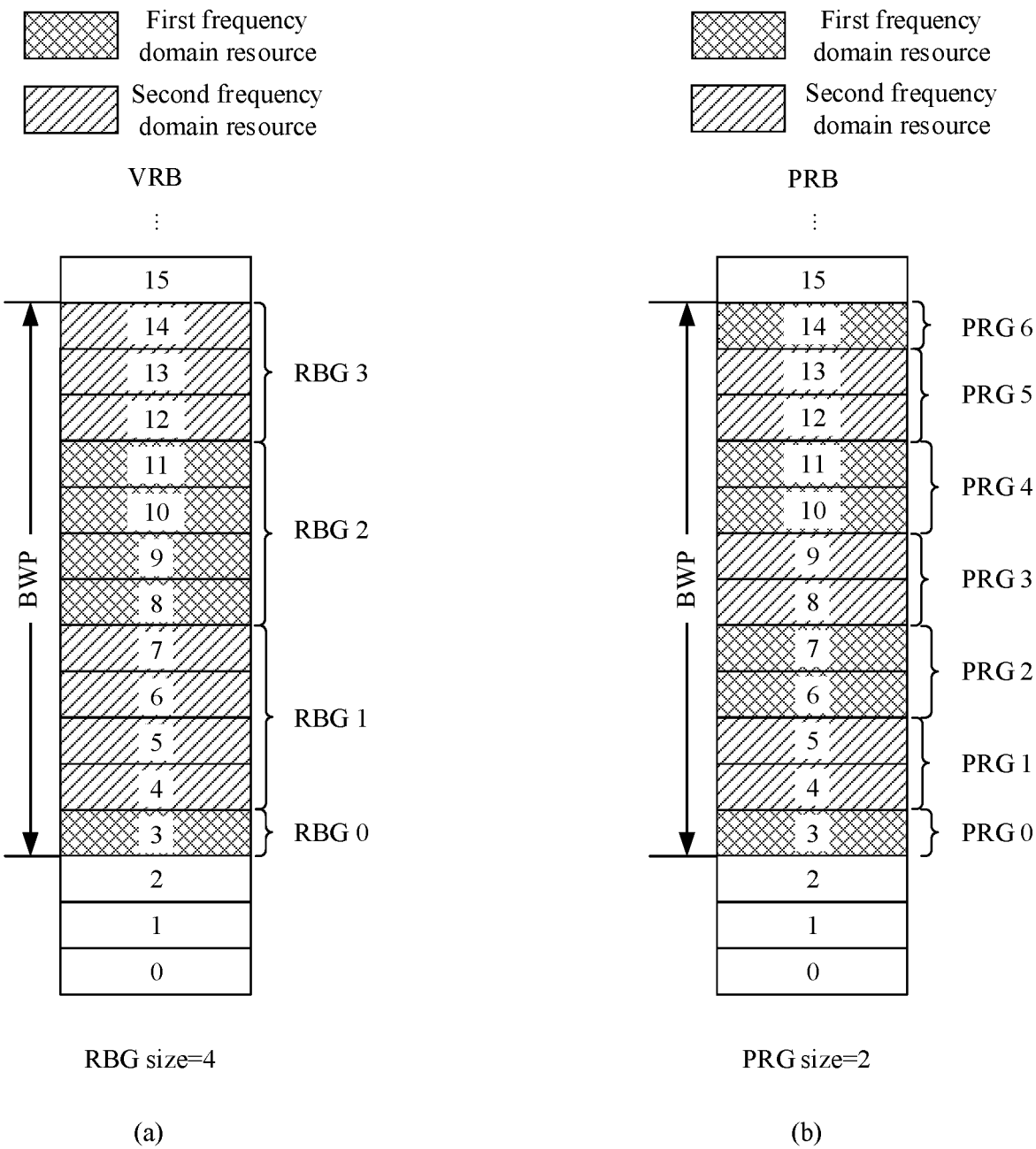
FIG. 30 and FIG. 31 each are a schematic diagram of frequency domain resource allocation according to an embodiment of this application.

Referring to two frequency domain resources shown in (a) in FIG. 30, it is assumed that a first frequency domain resource is allocated to a TRP 1, and a second frequency domain resource is allocated to a TRP 2. If a bitmap includes four bits, the four bits are respectively used to indicate whether four RBGs are allocated for data transmission. If the four bits are 0010, 0 indicates that an RBG is not allocated for data transmission, and 1 indicates that an RBG is allocated for data transmission. In this case, a resource that is of the TRP 1 and that can be used for data transmission includes an RB 8 to an RB 11, and the TRP 2 has no RB that can be used for data transmission. It can be learned that this allocation manner is more flexible, and is more applicable to the first transmission scheme.

Referring to two frequency domain resources shown in (b) in FIG. 30, it is assumed that a first frequency domain resource is allocated to a TRP 1, and a second frequency domain resource is allocated to a TRP 2. If a bitmap includes four bits, the four bits are respectively used to indicate whether four RBGs are allocated for data transmission. If the four bits are 0010, 0 indicates that an RBG is not allocated for data transmission, and 1 indicates that an RBG is allocated for data transmission. In this case, a resource that is of the TRP 1 and that can be used for data transmission includes an RB 10 and an RB 11, and a resource that is of the TRP 2 and that can be used for data transmission includes an RB 8 and an RB 9. It can be learned that this allocation manner is more balanced, and is more applicable to the second transmission scheme.

Second Case:

In the first transmission scheme, consecutive RBs are consecutive PRBs.

In the second transmission scheme, consecutive RBs are consecutive VRBs.

Optionally, in the second case, the frequency domain resource allocation type may be type 1, frequency domain interleaving is performed between VRBs and PRBs, and the predetermined bandwidth is the BWP or the system bandwidth.

Figure 31:
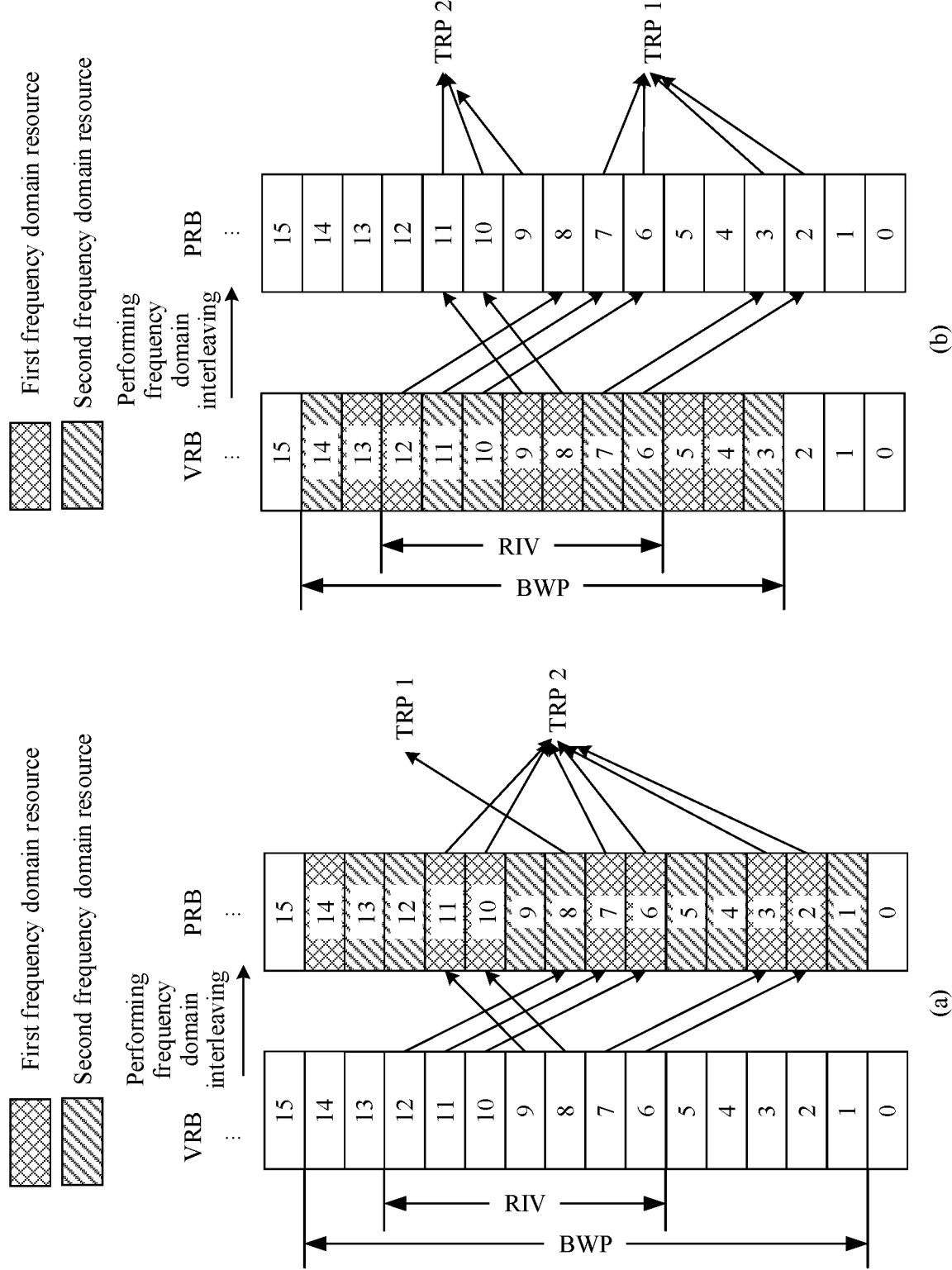

For example, referring to (a) in FIG. 31, when the consecutive RBs are the consecutive PRBs, it is assumed that a first frequency domain resource is allocated to a TRP 1, and a second frequency domain resource is allocated to a TRP 2. VRBs that can be used for data transmission and that are indicated by using an RIV include a VRB 6 to a VRB 12. For PRBs to which the VRB 6 to the VRB 12 are mapped, refer to (a) in FIG. 31. In this case, a PRB that is of the TRP 1 and that can be used for data transmission includes a PRB 8, and PRBs that are of the TRP 2 and that can be used for data transmission include a PRB 2, a PRB 3, a PRB 6, a PRB 7, a PRB 10, and a PRB 11. It can be learned that in this allocation manner, after interleaving, the M frequency domain resources may be unbalanced, and the allocation manner is more applicable to the first transmission scheme.

For example, referring to (b) in FIG. 31, when the consecutive RBs are the consecutive VRBs, it is assumed that a first frequency domain resource is allocated to a TRP 1, and a second frequency domain resource is allocated to a TRP 2. VRBs that can be used for data transmission and that are indicated by using an RIV include a VRB 6 to a VRB 12. For PRBs to which the VRB 6 to the VRB 12 are mapped, refer to (B) in FIG. 31. In this case, PRBs that are of the TRP 1 and that can be used for data transmission include a PRB 2, a PRB 3, a PRB 6, and a PRB 7, and PRBs that are of the TRP 2 and that can be used for data transmission include a PRB 8, a PRB 10, and a PRB 11. It can be learned that this allocation manner is more balanced, and is more applicable to the second transmission scheme.

In the second case, the terminal device may select the frequency domain resource allocation unit based on an actual transmission scheme, thereby improving scheduling flexibility of the terminal device and strengthening support for different transmission schemes.

It should be noted that the first case and the second case are merely examples of a correspondence between the transmission scheme and the granularity of the frequency domain resource allocation unit, and the correspondence between the transmission scheme and the granularity of the frequency domain resource allocation unit is not limited thereto. For example, in the first case or in the first transmission scheme, the frequency domain resource allocation unit may be a PRG, and in the second transmission scheme, the frequency domain resource allocation unit may be an RBG. In the second case or in the first transmission scheme, consecutive RBs are consecutive VRBs, and in the second transmission scheme, consecutive RBs are consecutive PRBs. In addition, the transmission scheme may alternatively correspond to a granularity of another frequency domain resource allocation unit (for example, an interleaving resource unit or a measurement subband for channel measurement), or may not correspond to a granularity of any frequency domain resource allocation unit. This is not limited in this application.

In addition, it should be noted that, it can be learned from the foregoing description that when the predetermined bandwidth is the BWP or the system bandwidth, frequency domain resource allocation may be unbalanced. When the predetermined bandwidth is scheduled bandwidth, frequency domain resource allocation is more balanced. Therefore, the transmission scheme may further correspond to the predetermined bandwidth. For example, the first transmission scheme corresponds to the BWP or the system bandwidth, and the second transmission scheme corresponds to the scheduled bandwidth.

It should be noted that sizes of the RBG, the PRG, the interleaving resource unit, and the measurement subband for channel measurement in the embodiments of this application are described based on a related specification in a protocol. During actual implementation or in a future protocol, the sizes of the RBG, the PRG, the interleaving resource unit, and the measurement subband for channel measurement may also be larger or smaller than those described in this application. In this case, this application is also applicable.

In addition, a main objective of this application is to describe how to allocate a frequency domain resource. Therefore, a time domain resource is not excessively described. However, it may be understood that when sending data, each network device and a terminal device not only need to determine a frequency domain resource, but also need to determine a time domain resource. A method for determining a time domain resource is not limited in this application.

The foregoing mainly describes the solutions in the embodiments of this application from a perspective of the method. It may be understood that, to implement the foregoing functions, the network elements such as the first network device and the terminal device include at least one of corresponding hardware structures and software modules for performing the functions. A person skilled in the art should be easily aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first network device and the terminal device may be divided into function units based on the foregoing method examples. For example, each function unit may be obtained through division based on each corresponding function, or two or more functions may be integrated into one processing unit. The integrated unit may be implemented in a form of hardware, or may be implemented in a form of a software function unit. It should be noted that in the embodiments of this application, division into the units is an example and is merely logical function division, and may be other division in an actual implementation.

Figure 32:
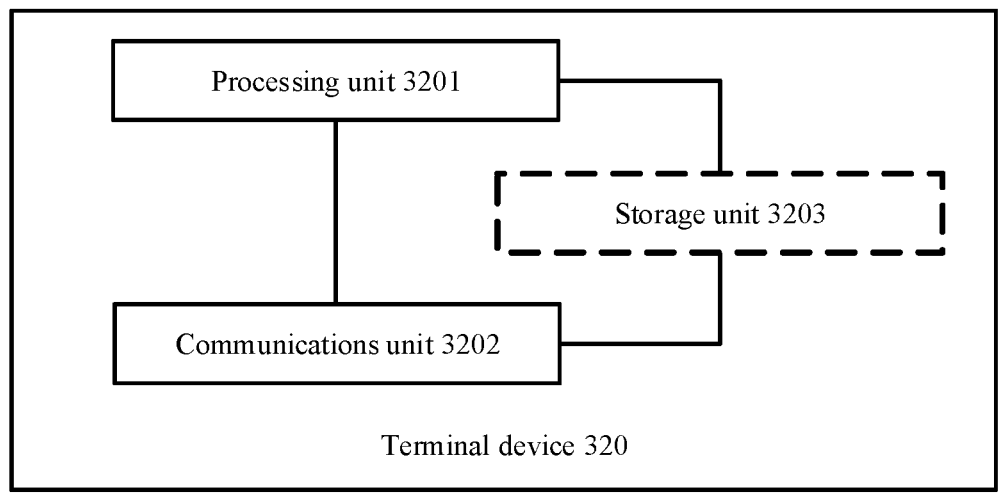
FIG. 32 is a schematic diagram of composition of a terminal device according to an embodiment of this application.

For example, FIG. 32 is a possible schematic structural diagram of the terminal device (denoted as a terminal device 320) in the foregoing embodiments. The terminal device 320 includes a processing unit 3201 and a communications unit 3202. Optionally, the terminal device 320 further includes a storage unit 3203.

The processing unit 3201 is configured to control and manage an action of the terminal device. For example, the processing unit 3201 is configured to perform 901 and 902 in FIG. 9, and/or an action performed by the terminal device in another process described in the embodiments of this application. The processing unit 3201 may communicate with another network entity by using the communications unit 3202. For example, the processing unit 3201 receives data from M network devices by using M frequency domain resources. The storage unit 3203 is configured to store program code and data of the terminal device.

The terminal device 320 may be a device, or may be a chip or a chip system.

When the terminal device 320 is a device, the processing unit may be a processor, and the communications unit may be a communications interface, a transceiver, or an input/output interface. Optionally, the transceiver may be a transceiver circuit. Optionally, the input/output interface may be an input/output circuit.

When the terminal device 320 is a chip or a chip system, the communications unit may be a communications interface, an input/output interface, an interface circuit, an output circuit, an input circuit, a pin, a related circuit, or the like on the chip or the chip system. The processing unit may be a processor, a processing circuit, a logic circuit, or the like.

Figure 33:
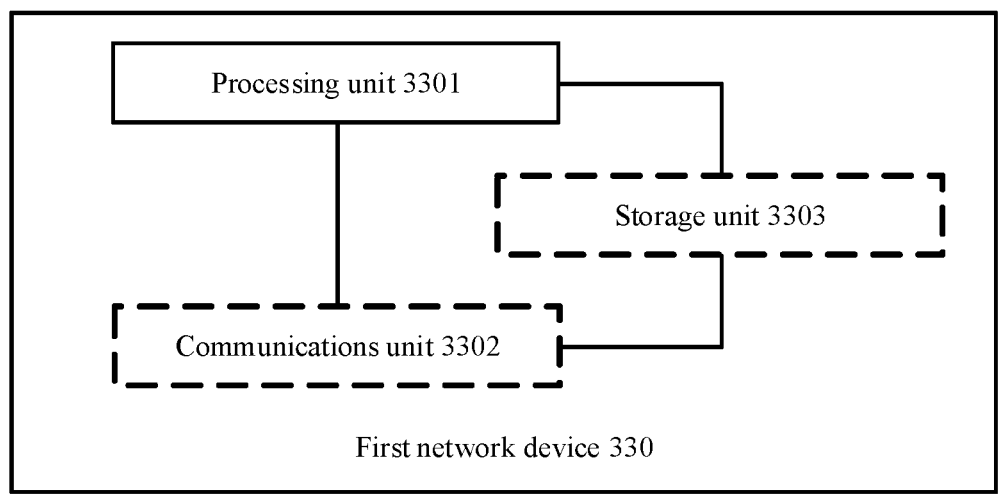
FIG. 33 and FIG. 34 each are a schematic diagram of composition of a first network device according to an embodiment of this application.

For example, FIG. 33 is a possible schematic structural diagram of the first network device (denoted as a first network device 330) in the foregoing embodiments. The first network device 330 includes a processing unit 3301. Optionally, the first network device 330 further includes at least one of a communications unit 3302 or a storage unit 3303.

The processing unit 3301 is configured to control and manage an action of the first network device. For example, the processing unit 3301 is configured to perform 1001 and 1002 in FIG. 10, and/or an action performed by the first network device in another process described in the embodiments of this application. The processing unit 3301 may communicate with another network entity by using the communications unit 3302. For example, the processing unit 3301 sends information about an allocated frequency domain resource to one or more of M network devices. The storage unit 3303 is configured to store program code and data of the first network device.

The first network device 330 may be a device, or may be a chip or a chip system.

When the first network device 330 is a device, the processing unit may be a processor, and the communications unit may be a communications interface, a transceiver, or an input/output interface. Optionally, the transceiver may be a transceiver circuit. Optionally, the input/output interface may be an input/output circuit.

When the first network device 330 is a chip or a chip system, the communications unit may be a communications interface, an input/output interface, an interface circuit, an output circuit, an input circuit, a pin, a related circuit, or the like on the chip or the chip system. The processing unit may be a processor, a processing circuit, a logic circuit, or the like.

In FIG. 32 and FIG. 33, the processing unit may be a processor or a controller, and the communications unit may be a communications interface, a transceiver, a transceiver, a transceiver circuit, a transceiver apparatus, an input/output interface, a pin, a circuit, or the like. The communications interface is a collective term, and may include one or more interfaces. The storage unit may be a memory, a register, a cache, a read-only memory (read-only memory, ROM), a random access memory (random access memory, RAM), or the like.

In FIG. 32 and FIG. 33, the communications unit may also be referred to as a transceiver unit. In the terminal device and the first network device, an antenna and a control circuit that have a transceiver function may be considered as a communications unit, and a processor having a processing function may be considered as a processing unit. Optionally, a component that is in the communications unit and that is configured to implement a receiving function may be considered as a receiving unit. The receiving unit is configured to perform a receiving step in the embodiments of this application. The receiving unit may be a receiver, a receiver, a receiver circuit, or the like. A component that is in the communications unit and that is configured to implement a sending function may be considered as a sending unit. The sending unit is configured to perform a sending step in the embodiments of this application. The sending unit may be a transmitter, a transmitter, a transmitter circuit, or the like.

When integrated units in FIG. 32 and FIG. 33 each are implemented in a form of a software function module and sold or used as an independent product, the integrated unit may be stored in a computer-readable storage medium. Based on such an understanding, the technical solutions in the embodiments of this application essentially, the part contributing to the prior art, or all or some of the technical solutions may be implemented in a form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The storage medium for storing the computer software product includes: any medium that can store program code, for example, a USB flash drive, a removable hard disk, a ROM, a RAM, a magnetic disk, or an optical disc.

Figure 34:
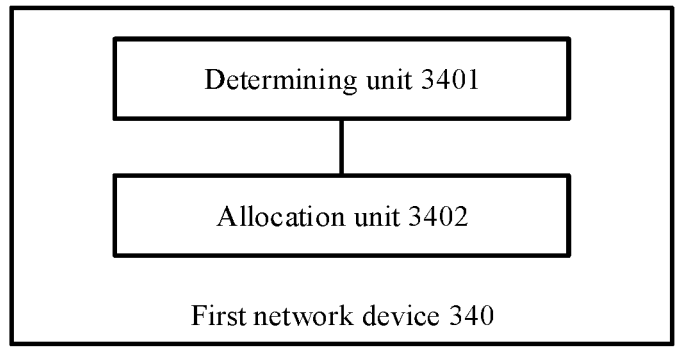

For example, further, FIG. 34 is a possible schematic structural diagram of the first network device (denoted as a first network device 340) in the foregoing embodiments. The first network device 340 includes a determining unit 3401 and an allocation unit 3402. The determining unit 3401 is configured to perform 1001 in FIG. 10, and the allocation unit 3402 is configured to perform 1002 in FIG. 10.

Units in FIG. 32 to FIG. 34 may also be referred to as modules. For example, the processing unit may be referred to as a processing module, and the determining unit may be referred to as a determining module.

Figure 35:
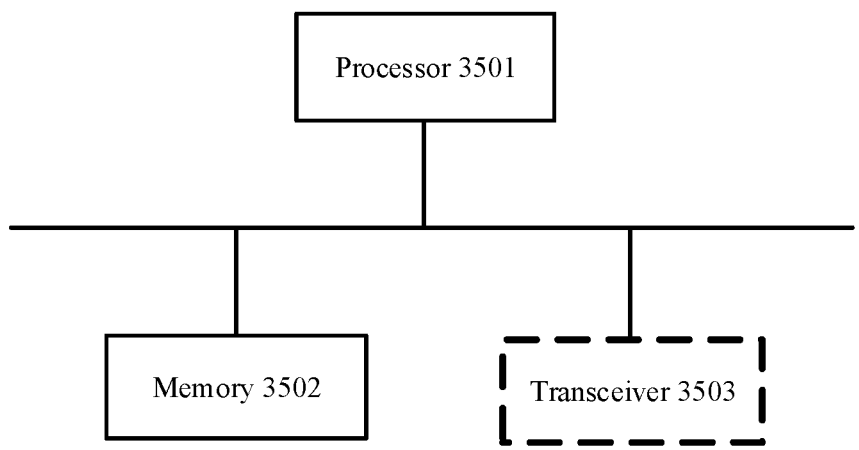
FIG. 35 and FIG. 36 each are a schematic diagram of a hardware structure of a communications apparatus according to an embodiment of this application.
Figure 36:
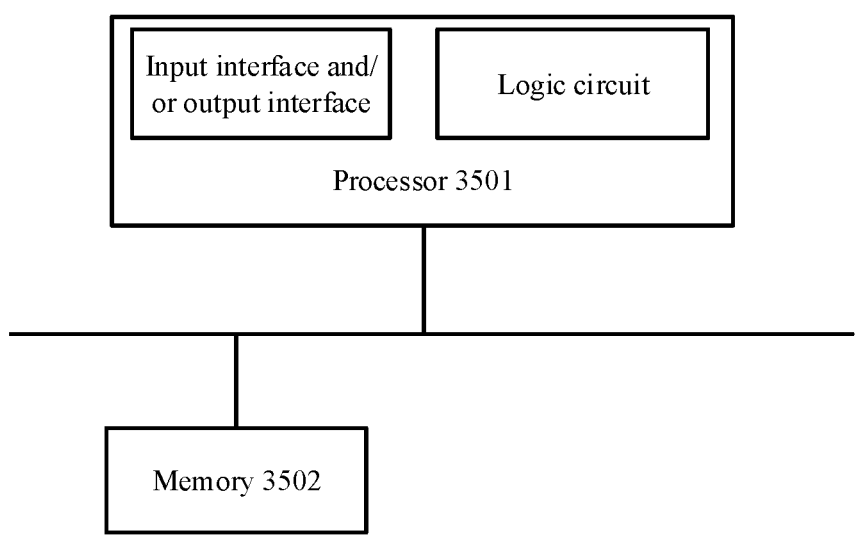

An embodiment of this application further provides a schematic diagram of a hardware structure of a communications apparatus (denoted as a communications apparatus 350). Referring to FIG. 35 or FIG. 36, the communications apparatus 350 includes a processor 3501, and optionally, further includes a memory 3502 connected to the processor 3501.

The processor 3501 may be a general-purpose central processing unit (central processing unit, CPU), a microprocessor, an application-specific integrated circuit (application-specific integrated circuit, ASIC), or one or more integrated circuits configured to control program execution of the solutions in this application. The processor 3501 may alternatively include a plurality of CPUs, and the processor 3501 may be a single-core (single-CPU) processor, or may be a multi-core (multi-CPU) processor. The processor herein may refer to one or more devices, circuits, or processing cores configured to process data (for example, a computer program instruction).

The memory 3502 may be a ROM or another type of static storage device that can store static information and instructions, or a RAM or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage device, an optical disc storage device (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. This is not limited in the embodiments of this application. The memory 3502 may exist independently (where in this case, the processor may be located outside the communications apparatus, or may be located inside the communications apparatus), or may be integrated with the processor 3501. The memory 3502 may include computer program code. The processor 3501 is configured to execute the computer program code stored in the memory 3502, to implement the method provided in the embodiments of this application.

In a first possible implementation, referring to FIG. 35, the communications apparatus 350 further includes a transceiver 3503. The processor 3501, the memory 3502, and the transceiver 3503 are connected by using a bus. The transceiver 3503 is configured to communicate with another device or a communications network. Optionally, the transceiver 3503 may include a transmitter and a receiver. A component that is in the transceiver 3503 and that is configured to implement a receiving function may be considered as a receiver, and the receiver is configured to perform a receiving step in the embodiments of this application. A component that is in the transceiver 3503 and that is configured to implement a sending function may be considered as a transmitter, and the transmitter is configured to perform a sending step in the embodiments of this application.

Based on the first possible implementation, the schematic structural diagram shown in FIG. 35 may be used to show a structure of the first network device or the terminal device in the foregoing embodiments.

When the schematic structural diagram shown in FIG. 35 is used to show the structure of the terminal device in the foregoing embodiments, the processor 3501 is configured to control and manage an action of the terminal device. For example, the processor 3501 is configured to support the terminal device in performing 901 and 902 in FIG. 9 and/or an action performed by the terminal device in another process described in the embodiments of this application. The processor 3501 may communicate with another network entity by using the transceiver 3503. For example, the processor 3501 communicates with the M network devices. The memory 3502 is configured to store program code and data of the terminal device.

When the schematic structural diagram shown in FIG. 35 is used to show the structure of the first network device in the foregoing embodiments, the processor 3501 is configured to control and manage an action of the first network device. For example, the processor 3501 is configured to support the first network device in performing 1001 and 1002 in FIG. 10 and/or an action performed by the first network device in another process described in the embodiments of this application. The processor 3501 may communicate with another network entity by using the transceiver 3503. For example, the processor 3501 communicates with one or more of the M network devices. The memory 3502 is configured to store program code and data of the first network device.

In a second possible implementation, the processor 3501 includes a logic circuit and at least one of an input interface and an output interface. The output interface is configured to perform a sending action in a corresponding method, and the input interface is configured to perform a receiving action in a corresponding method.

Based on the second possible implementation, referring to FIG. 36, the schematic structural diagram shown in FIG. 36 may be used to show a structure of the first network device or the terminal device in the foregoing embodiments.

When the schematic structural diagram shown in FIG. 36 is used to show the structure of the terminal device in the foregoing embodiments, the processor 3501 is configured to control and manage an action of the terminal device. For example, the processor 3501 is configured to support the terminal device in performing 901 and 902 in FIG. 9 and/or an action performed by the terminal device in another process described in the embodiments of this application. The processor 3501 may communicate with another network entity by using at least one of the input interface and the output interface. For example, the processor 3501 communicates with the M network devices. The memory 3502 is configured to store program code and data of the terminal device.

When the schematic structural diagram shown in FIG. 36 is used to show the structure of the first network device in the foregoing embodiments, the processor 3501 is configured to control and manage an action of the first network device. For example, the processor 3501 is configured to support the first network device in performing 1001 and 1002 in FIG. 10 and/or an action performed by the first network device in another process described in the embodiments of this application. The processor 3501 may communicate with another network entity by using at least one of the input interface and the output interface. For example, the processor 3501 communicates with one or more of the M network devices. The memory 3502 is configured to store program code and data of the first network device.

In addition, embodiments of this application further provide a schematic diagram of a hardware structure of a terminal device (denoted as a terminal device 370) and a schematic diagram of a hardware structure of a first network device (denoted as a first network device 380). For details, refer to FIG. 37 and FIG. 38 respectively.

Figure 37:
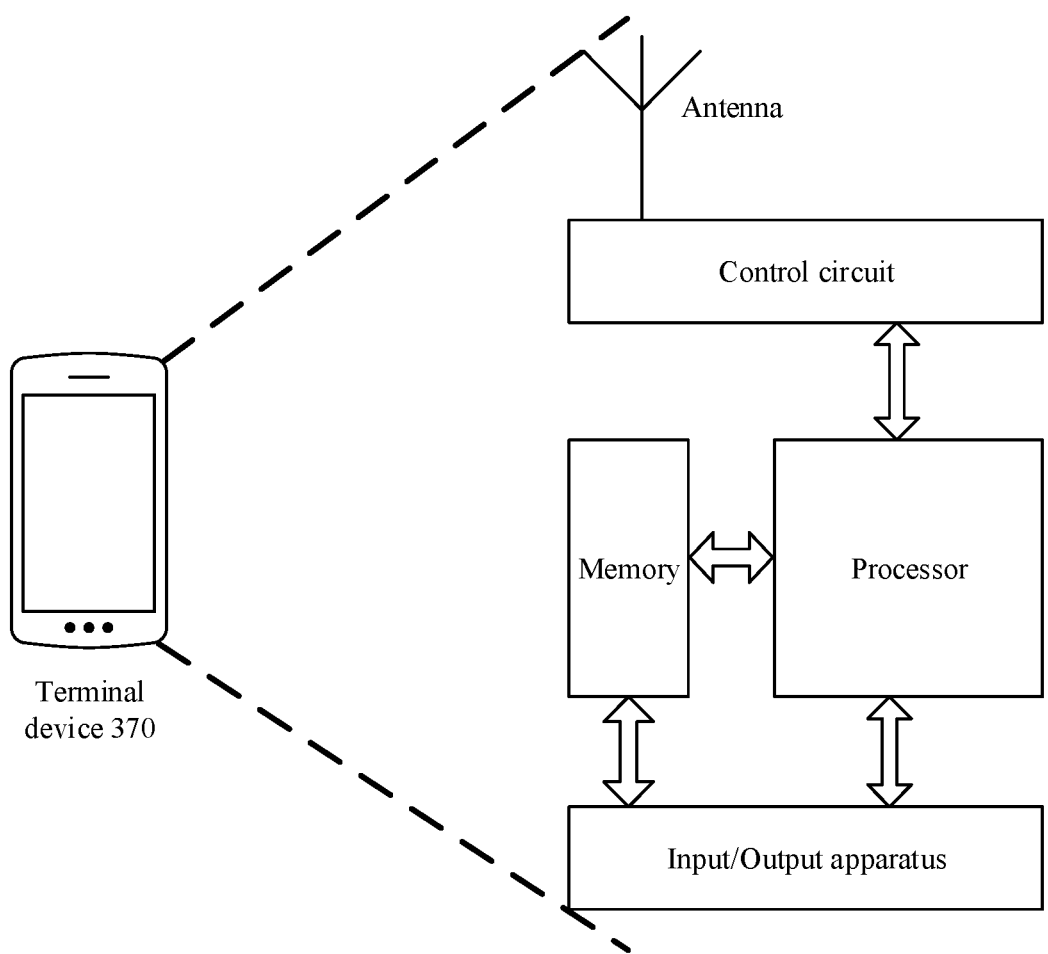
FIG. 37 is a schematic diagram of a hardware structure of a terminal device according to an embodiment of this application.

FIG. 37 is the schematic diagram of the hardware structure of the terminal device 370. For ease of description, FIG. 37 shows only main components of the terminal device. As shown in FIG. 37, the terminal device 370 includes a processor, a memory, a control circuit, an antenna, and an input/output apparatus.

The processor is mainly configured to: process a communications protocol and communication data, control the entire terminal device, execute a software program, and process data of the software program. For example, the processor is configured to control the terminal device to perform 901 and 902 in FIG. 9, and/or an action performed by the terminal device in another process described in the embodiments of this application. The memory is mainly configured to store the software program and data. The control circuit (which may also be referred to as a radio frequency circuit) is mainly configured to: perform conversion between a baseband signal and a radio frequency signal, and process the radio frequency signal. A combination of the control circuit and the antenna may also be referred to as a transceiver that is mainly configured to send and receive a radio frequency signal in a form of an electromagnetic wave. The input/output apparatus, such as a touchscreen, a display, or a keyboard, is mainly configured to receive data input by a user and data output to the user.

After the terminal device is powered on, the processor may read the software program in the memory, explain and execute an instruction of the software program, and process the data of the software program. When data needs to be sent by using the antenna, after performing baseband processing on the to-be-sent data, the processor outputs a baseband signal to a control circuit in a radio frequency circuit. After performing radio frequency processing on the baseband signal, the control circuit sends a radio frequency signal to the outside through the antenna in a form of an electromagnetic wave. When data is to be sent to the terminal device, the control circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 37 shows only one memory and one processor. An actual terminal device may have a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communications protocol and the communication data. The central processing unit is mainly configured to control the entire terminal device, execute the software program, and process the data of the software program. The processor in FIG. 37 integrates functions of the baseband processor and the central processing unit. A person skilled in the art may understand that, alternatively, the baseband processor and the central processing unit may be independent processors, and interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the memory in a form of a software program. The processor executes the software program to implement a baseband processing function.

Figure 38:
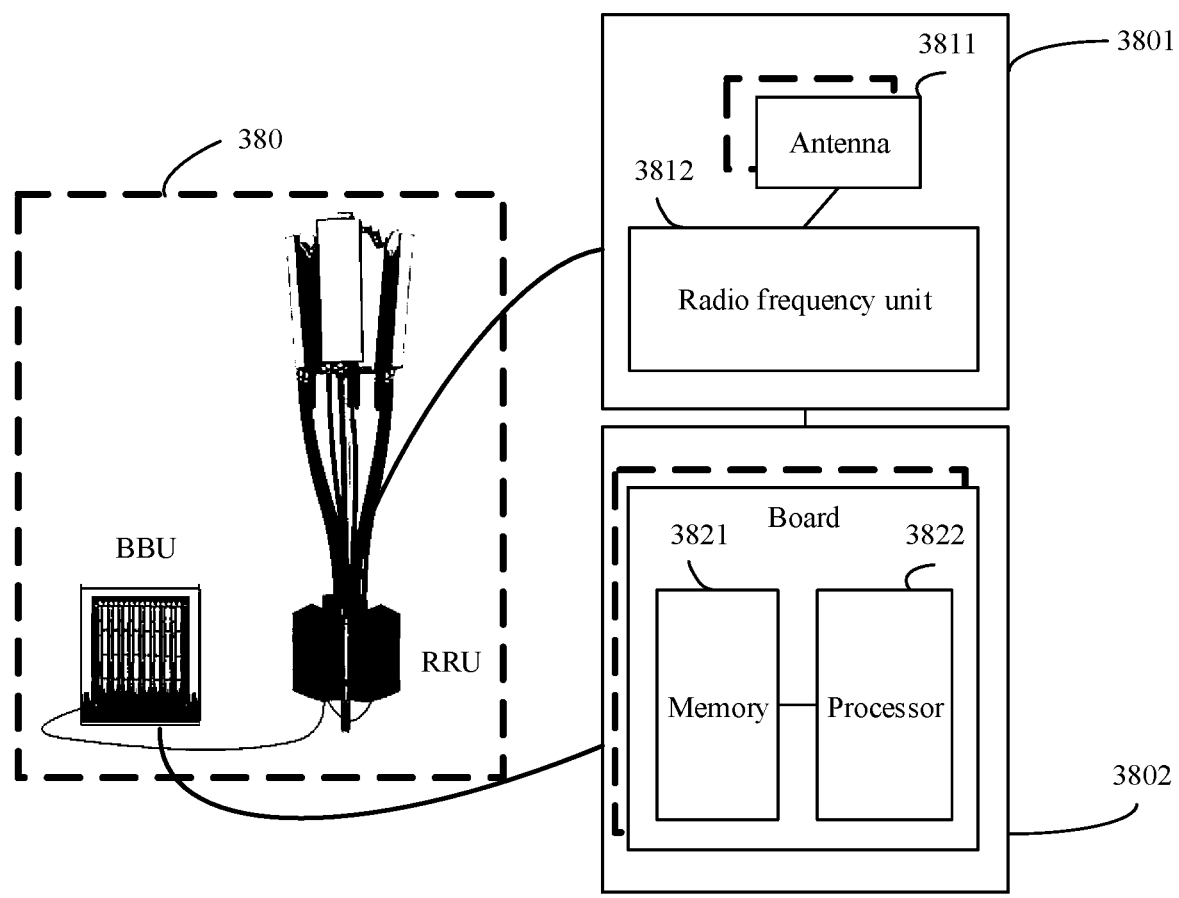
FIG. 38 is a schematic diagram of a hardware structure of a first network device according to an embodiment of this application.

FIG. 38 is the schematic diagram of the hardware structure of the first network device 380. The first network device 380 may include one or more radio frequency units such as a remote radio unit (remote radio unit, RRU) 3801 and one or more baseband units (baseband unit, BBU) (which may also be referred to as a digital unit (digital unit, DU)) 3802.

The RRU 3801 may be referred to as a transceiver unit, a transceiver, a transceiver circuit, a transceiver, or the like, and may include at least one antenna 3811 and a radio frequency unit 3812. The RRU 3801 is mainly configured to: send and receive a radio frequency signal and perform conversion between a radio frequency signal and a baseband signal. The RRU 3801 and the BBU 3802 may be physically disposed together, or may be physically disposed separately. For example, the base station is a distributed base station.

The BBU 3802 is a control center of the first network device, may be referred to as a processing unit, and is mainly configured to complete baseband processing functions such as channel coding, multiplexing, modulation, and spectrum spreading.

In an embodiment, the BBU 3802 may include one or more boards. A plurality of boards may jointly support a radio access network (such as an LTE network) of a single access standard, or may separately support radio access networks (such as an LTE network, a 5G network, or another network) of different access standards. The BBU 3802 further includes a memory 3821 and a processor 3822. The memory 3821 is configured to store a necessary instruction and necessary data. The processor 3822 is configured to control the first network device to perform a necessary action. The memory 3821 and the processor 3822 may serve one or more boards. That is, a memory and a processor may be separately disposed on each board. A plurality of boards may share a same memory and a same processor. In addition, a necessary circuit may further be disposed on each board.

It should be understood that the first network device 380 shown in FIG. 38 can perform 1001 and 1002 in FIG. 10, and/or an action performed by the first network device in another process described in the embodiments of this application. Operations or functions or operations and functions of the modules in the first network device 380 are separately set to implement corresponding procedures in the foregoing method embodiments. For details, refer to the descriptions in the foregoing method embodiments. To avoid repetition, detailed descriptions are properly omitted herein.

In an implementation process, the steps of the methods in the embodiments may be completed by using a hardware integrated logical circuit in the processor or by using instructions in a form of software. The steps of the method disclosed with reference to the embodiments of this application may be directly performed and completed by a hardware processor, or may be performed and completed by a combination of hardware and a software module in the processor. For other descriptions about the processor in FIG. 37 and FIG. 38, refer to the descriptions related to the processor in FIG. 35 and FIG. 36. Details are not described again.

An embodiment of this application further provides a computer-readable storage medium, including an instruction. When the instruction is run on a computer, the computer is enabled to perform any one of the foregoing methods.

An embodiment of this application further provides a computer program product including an instruction. When the computer program product runs on a computer, the computer is enabled to perform any one of the foregoing methods.

An embodiment of this application further provides a communications system, including the first network device and/or the terminal device.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprise" (comprising) does not exclude another component or another step, and "a" or "one" does not exclude a case of "a plurality of". A single processor or another unit may implement several functions enumerated in the claims. Some measures are recorded in dependent claims that are different from each other, but this does not mean that the measures cannot be combined to produce a good effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the spirit and scope of this application. This application is intended to cover the modifications and variations of this application provided that they fall within the scope of the claims of this application and their equivalent technologies.

What is claimed is:

1. A frequency domain resource allocation method, comprising:

determining M frequency domain resources, wherein M is an integer greater than 1, any two of the M frequency domain resources do not overlap, each of the M frequency domain resources is associated with one piece of quasi-colocation (QCL) information, and any two of the M frequency domain resources are associated with different QCL information; and sending or receiving data on one or more of the M frequency domain resources, wherein:

when a precoding resource group (PRG) size is 2 or 4, the M frequency domain resources are determined by using a PRG as a frequency domain resource allocation unit, wherein determining the M frequency domain resources comprises determining an $m^{th}$ frequency domain resource in the M frequency domain resources, wherein the $m^{th}$ frequency domain resource comprises an $(M*i+m)^{th}$ frequency domain resource allocation unit in N frequency domain resource allocation units comprised in scheduled bandwidth of a terminal device, the scheduled bandwidth is bandwidth comprising at least one PRB used for data transmission, N is a positive integer, m is an integer greater than 0 and less than or equal to M, and i=0, 1, . . . , $$\left\lceil \frac{N}{M} \right\rceil - 1.$$

or when a PRG size is wideband, the M frequency domain resources are determined by using $$\left\lceil \frac{W}{M} \right\rceil$$

physical resource blocks (PRBs) as a frequency domain resource allocation unit, wherein W is a quantity of PRBs comprised in scheduled bandwidth of a terminal device, and W is an integer greater than 1.

2. The method according to claim 1, wherein when the PRG size is 2 or 4, M=2, a first frequency domain resource in the M frequency domain resources comprises a PRG whose index is an even number, and a second frequency domain resource in the M frequency domain resources comprises a PRG whose index is an odd number.

3. The method according to claim 1, wherein when the PRG size is the wideband, an $m^{th}$ frequency domain resource in the M frequency domain resources comprises one or more PRBs ranging from a $$\left(\left\lceil \frac{W}{M} \right\rceil (m-1) + 1\right)^{th}$$

PRB to a $$\left(\left\lceil \frac{W}{M} \right\rceil m\right)^{th}$$

PRB in the scheduled bandwidth, an $M^{th}$ frequency domain resource in the M frequency domain resources comprises a remaining PRB in the scheduled bandwidth, and m is an integer greater than 0 and less than M.

4. The method according to claim 1, wherein M=2, a first frequency domain resource in the M frequency domain resources comprises first $$\left\lceil \frac{W}{M} \right\rceil$$

PRBs in the scheduled bandwidth, and a second frequency domain resource in the M frequency domain resources comprises last $$a\frac{W}{M}a$$

PRBs in the scheduled bandwidth.

5. The method according to claim 1, wherein
when the PRG size is 2 or 4, the M frequency domain resources are determined according to a predetermined frequency domain resource allocation rule by using the PRG as the frequency domain resource allocation unit; or
when the PRG size is the wideband, the M frequency domain resources are determined based on the W PRBs comprised in the scheduled bandwidth and according to a predetermined frequency domain resource allocation rule.

6. A frequency domain resource allocation apparatus, comprising:
at least one processor configured with processor-executable instructions to perform operations comprising:
determining M frequency domain resources, wherein M is an integer greater than 1, any two of the M frequency domain resources do not overlap, each of the M frequency domain resources is associated with one piece of quasi-colocation (QCL) information, and any two of the M frequency domain resources are associated with different QCL information; and
sending or receiving data on one or more of the M frequency domain resources, wherein:
when a precoding resource group (PRG) size is 2 or 4, the M frequency domain resources are determined by using a PRG as a frequency domain resource allocation unit, wherein determining the M frequency domain resources comprises determining an $m^{th}$ frequency domain resource in the M frequency domain resources, wherein the $m^{th}$ frequency domain resource comprises an $(M*i+m)^{th}$ frequency domain resource allocation unit in N frequency domain resource allocation units comprised in scheduled bandwidth of a terminal device, the scheduled bandwidth is bandwidth comprising at least one PRB used for data transmission, N is a positive integer, m is an integer greater than 0 and less than or equal to M, and i=0, 1, ... , $$\left\lceil \frac{N}{M} \right\rceil - 1;$$

or
when a PRG size is wideband, the M frequency domain resources are determined by using $$\left\lceil \frac{W}{M} \right\rceil$$

physical resource blocks (PRBs) as a frequency domain resource allocation unit, wherein W is a quantity of PRBs comprised in scheduled bandwidth of a terminal device, and W is an integer greater than 1.

7. The apparatus according to claim 6, wherein when the PRG size is 2 or 4, M=2, a first frequency domain resource in the M frequency domain resources comprises a PRG whose index is an even number, and a second frequency domain resource in the M frequency domain resources comprises a PRG whose index is an odd number.

8. The apparatus according to claim 6, wherein when the PRG size is the wideband, an $m^{th}$ frequency domain resource in the M frequency domain resources comprises one or more PRBs ranging from a $$\left(\left\lceil \frac{W}{M} \right\rceil (m-1) + 1\right)^{th}$$

PRB to a $$\left(\left\lceil \frac{W}{M} \right\rceil m\right)^{th}$$

PRB in the scheduled bandwidth, an $M^{th}$ frequency domain resource in the M frequency domain resources comprises a remaining PRB in the scheduled bandwidth, and m is an integer greater than 0 and less than M.

9. The apparatus according to claim 6, wherein M=2, a first frequency domain resource in the M frequency domain resources comprises first $$\left\lceil \frac{W}{M} \right\rceil$$

PRBs in the scheduled bandwidth, and a second frequency domain resource in the M frequency domain resources comprises last $$a\frac{W}{M}a$$

PRBs in the scheduled bandwidth.

10. The apparatus according to claim 6, wherein
when the PRG size is 2 or 4, the M frequency domain resources are determined according to a predetermined frequency domain resource allocation rule by using the PRG as the frequency domain resource allocation unit; or
when the PRG size is the wideband, the M frequency domain resources are determined based on the W PRBs comprised in the scheduled bandwidth and according to a predetermined frequency domain resource allocation rule.

11. The apparatus according to claim 6, wherein:
the frequency domain resource allocation apparatus is a terminal device; and
the operations comprise: receiving the data on the one or more of the M frequency domain resources.

12. The apparatus according to claim 6, wherein:
the frequency domain resource allocation apparatus is a network device; and
the operations comprise: sending the data on the one or more of the M frequency domain resources.

13. A non-transitory computer-readable storage medium, wherein the non-transitory computer-readable storage medium stores program instructions for execution by at least one processor to perform:
determining M frequency domain resources, wherein M is an integer greater than 1, any two of the M frequency domain resources do not overlap, each of the M frequency domain resources is associated with one piece of quasi-colocation (QCL) information, and any two of the M frequency domain resources are associated with different QCL information; and
sending or receiving data on one or more of the M frequency domain resources, wherein:
when a precoding resource group (PRG) size is 2 or 4, the M frequency domain resources are determined by using a PRG as a frequency domain resource allocation unit, wherein determining the M frequency domain resources comprises determining an $m^{th}$ frequency domain resource in the M frequency domain resources, wherein the $m^{th}$ frequency domain resource comprises an $(M*i+m)^{th}$ frequency domain resource allocation unit in N frequency domain resource allocation units comprised in scheduled bandwidth of a terminal device, the scheduled bandwidth is bandwidth comprising at least one PRB used for data transmission, N is a positive integer, m is an integer greater than 0 and less than or equal to M, and i=0, 1, . . . , $$\left\lceil \frac{N}{M} \right\rceil - 1.$$

or when a PRG size is wideband, the M frequency domain resources are determined by using $$\left\lceil \frac{W}{M} \right\rceil$$

physical resource blocks (PRBs) as a frequency domain resource allocation unit, wherein W is a quantity of PRBs comprised in scheduled bandwidth of a terminal device, and W is an integer greater than 1.

14. The non-transitory computer-readable storage medium according to claim 13, wherein when the PRG size is 2 or 4, M=2, a first frequency domain resource in the M frequency domain resources comprises a PRG whose index is an even number, and a second frequency domain resource in the M frequency domain resources comprises a PRG whose index is an odd number.

15. The non-transitory computer-readable storage medium according to claim 13, wherein when the PRG size is the wideband, an $m^{th}$ frequency domain resource in the M frequency domain resources comprises one or more PRBs ranging from a $$\left(\left\lceil \frac{W}{M} \right\rceil (m-1) + 1\right)^{th}$$

PRB to a $$\left(\left\lceil \frac{W}{M} \right\rceil m\right)^{th}$$

PRB in the scheduled bandwidth, an $M^{th}$ frequency domain resource in the M frequency domain resources comprises a remaining PRB in the scheduled bandwidth, and m is an integer greater than 0 and less than M.

16. The non-transitory computer-readable storage medium according to claim 13, wherein M=2, a first frequency domain resource in the M frequency domain resources comprises first $$\left\lceil \frac{W}{M} \right\rceil$$

PRBs in the scheduled bandwidth, and a second frequency domain resource in the M frequency domain resources comprises last $$a\frac{W}{M}a$$

PRBs in the scheduled bandwidth.

17. The non-transitory computer-readable storage medium according to claim 13, wherein
when the PRG size is 2 or 4, the M frequency domain resources are determined according to a predetermined frequency domain resource allocation rule by using the PRG as the frequency domain resource allocation unit; or
when the PRG size is the wideband, the M frequency domain resources are determined based on the W PRBs comprised in the scheduled bandwidth and according to a predetermined frequency domain resource allocation rule.

* * * * *